(12) United States Patent
Osswald et al.

(10) Patent No.: US 9,308,939 B2
(45) Date of Patent: Apr. 12, 2016

(54) EXTENDABLE FRAME WORK VEHICLE

(71) Applicants: Chris Osswald, Rothschild, WI (US); Walter A. Osswald, Mosinee, WI (US); Marcus F. Dack, Schofield, WI (US); Kenneth Buelt, Wausau, WI (US); Thomas E. Price, Jr., Hartland, WI (US); Alan Severns, Mukwonago, WI (US); Jeffrey A. Wierschke, Sheboygan Falls, WI (US); Joe A. Racz, Waukesha, WI (US); David R. Bauer, Delafield, WI (US); Justin D. Gasal, Random Lake, WI (US)

(72) Inventors: Chris Osswald, Rothschild, WI (US); Walter A. Osswald, Mosinee, WI (US); Marcus F. Dack, Schofield, WI (US); Kenneth Buelt, Wausau, WI (US); Thomas E. Price, Jr., Hartland, WI (US); Alan Severns, Mukwonago, WI (US); Jeffrey A. Wierschke, Sheboygan Falls, WI (US); Joe A. Racz, Waukesha, WI (US); David R. Bauer, Delafield, WI (US); Justin D. Gasal, Random Lake, WI (US)

(73) Assignee: Extendedquip, LLC, Schofield, WI (US)

( * ) Notice: Subject to any disclaimer, the term of this patent is extended or adjusted under 35 U.S.C. 154(b) by 69 days.

(21) Appl. No.: 14/088,856

(22) Filed: Nov. 25, 2013

(65) Prior Publication Data
US 2014/0076643 A1  Mar. 20, 2014

Related U.S. Application Data

(62) Division of application No. 11/890,332, filed on Aug. 6, 2007, now Pat. No. 8,602,153.

(51) Int. Cl.
*A01B 59/06* (2006.01)
*B62D 21/14* (2006.01)
(Continued)

(52) U.S. Cl.
CPC ............... *B62D 21/14* (2013.01); *B60K 25/06* (2013.01); *B62D 37/04* (2013.01);
(Continued)

(58) Field of Classification Search
CPC .. A01B 59/066; A01B 59/067; A01B 59/068; B60D 1/54; B60D 2001/548; B62D 49/0678; B62D 49/08; B62D 49/085; B62D 21/14; B60G 2300/40
See application file for complete search history.

(56) References Cited

U.S. PATENT DOCUMENTS

| 1,877,373 A | 9/1932 | Cohen-Venezian |
| 2,119,800 A | 6/1938 | Tull |

(Continued)

FOREIGN PATENT DOCUMENTS

| AU | 48947/90 A | 8/1990 |
| BE | 888406 A | 7/1981 |

(Continued)

OTHER PUBLICATIONS

International Preliminary Examination Report from International Application No. PCT/AU95/00557, dated Jul. 18, 1996, 6 pages.

*Primary Examiner* — Katy M Ebner
(74) *Attorney, Agent, or Firm* — Nikolai & Mersereau, PA; C. G. Mersereau

(57) ABSTRACT

An extendable frame work vehicle offering enhanced versatility, safety and effectiveness. The vehicle includes an adjustable frame with front and rear portions that extend or retract with respect to each other. The front portion is supported by a first pair of wheels and said rear portion is supported by a second pair of wheels. Each wheel is independently driven and steered. The vehicle also includes an engine mounted on the rear portion of the frame. Incorporated into the vehicle is an electro-hydraulic assembly which enables extension and retraction of the adjustable frame. The assembly includes a sensor-responsive microprocessor controller, at least one hydraulic pump, at least one hydraulic drive motor, and at least one valve network.

10 Claims, 72 Drawing Sheets

(51) Int. Cl.

| | | |
|---|---|---|
| *B62D 37/04* | (2006.01) | |
| *B62D 49/06* | (2006.01) | |
| *B62D 49/08* | (2006.01) | |
| *B66F 9/065* | (2006.01) | |
| *B66F 11/04* | (2006.01) | |
| *B66F 17/00* | (2006.01) | |
| *E02F 3/34* | (2006.01) | |
| *E02F 3/96* | (2006.01) | |
| *E02F 9/02* | (2006.01) | |
| *E02F 9/18* | (2006.01) | |
| *E02F 9/20* | (2006.01) | |
| *E02F 9/22* | (2006.01) | |
| *B60K 25/06* | (2006.01) | |
| *B62D 55/065* | (2006.01) | |

(52) U.S. Cl.
CPC ......... *B62D 49/0678* (2013.01); *B62D 49/085* (2013.01); *B62D 55/0655* (2013.01); *B66F 9/0655* (2013.01); *B66F 11/044* (2013.01); *B66F 17/003* (2013.01); *E02F 3/3414* (2013.01); *E02F 3/96* (2013.01); *E02F 9/02* (2013.01); *E02F 9/024* (2013.01); *E02F 9/028* (2013.01); *E02F 9/18* (2013.01); *E02F 9/2004* (2013.01); *E02F 9/225* (2013.01); *E02F 9/2253* (2013.01)

(56) References Cited

U.S. PATENT DOCUMENTS

| | | | | |
|---|---|---|---|---|
| 2,734,438 | A * | 2/1956 | Todd | 172/272 |
| 3,053,552 | A * | 9/1962 | Horney | 172/448 |
| 3,133,651 | A | 5/1964 | Cripe | |
| 3,207,044 | A | 9/1965 | Hall | |
| 3,565,273 | A | 2/1971 | Hanh | |
| 3,633,702 | A | 1/1972 | Shaw | |
| 3,670,910 | A | 6/1972 | Shaw | |
| 3,690,395 | A | 9/1972 | Spiller et al. | |
| 3,791,540 | A | 2/1974 | Breitfuss | |
| 3,856,149 | A | 12/1974 | Shaw | |
| 3,999,779 | A | 12/1976 | Bishop | |
| 4,030,560 | A | 6/1977 | Parquet et al. | |
| 4,049,138 | A | 9/1977 | Soyland | |
| 4,135,731 | A * | 1/1979 | Lorenz et al. | 172/439 |
| 4,204,697 | A | 5/1980 | Santerre | |
| 4,222,583 | A * | 9/1980 | Schillings | 172/439 |
| 4,355,946 | A | 10/1982 | Wykhuis et al. | |
| 4,381,900 | A | 5/1983 | Schlottman | |
| 4,659,102 | A * | 4/1987 | Stuhrmann et al. | 280/481 |
| 4,664,404 | A * | 5/1987 | Schultz | 280/461.1 |
| 4,685,695 | A | 8/1987 | LeVee | |
| 4,715,770 | A * | 12/1987 | Kryscyk | 414/680 |
| 4,763,800 | A | 8/1988 | Engler et al. | |
| 4,840,437 | A | 6/1989 | Henry et al. | |
| 5,031,704 | A | 7/1991 | Fleischer et al. | |
| 5,368,121 | A | 11/1994 | Priefert | |
| 5,423,394 | A * | 6/1995 | Kendle | 180/53.3 |
| 5,537,818 | A | 7/1996 | Hosseini et al. | |
| 5,638,387 | A | 6/1997 | Palleggi et al. | |
| 5,899,292 | A | 5/1999 | Paul et al. | |
| 6,062,321 | A * | 5/2000 | Defrancq | 172/448 |
| 6,065,556 | A * | 5/2000 | Andrews | 180/209 |
| 6,089,328 | A * | 7/2000 | Moore et al. | 172/447 |
| 6,148,928 | A * | 11/2000 | Spears | 172/439 |
| 6,149,180 | A * | 11/2000 | Haws | 280/479.1 |
| 6,296,436 | B1 * | 10/2001 | Ramun | 414/719 |
| 6,315,374 | B1 | 11/2001 | Johansson | |
| 6,321,851 | B1 * | 11/2001 | Weiss et al. | 172/444 |
| 6,390,764 | B1 * | 5/2002 | Merlo et al. | 414/680 |
| 6,405,806 | B1 * | 6/2002 | Bernhardt et al. | 172/272 |
| 6,409,457 | B1 | 6/2002 | Korycan et al. | |
| 6,434,437 | B1 | 8/2002 | Brandt et al. | |
| 6,619,693 | B1 | 9/2003 | Sproatt et al. | |
| 6,764,270 | B1 * | 7/2004 | Bernhardt et al. | 414/718 |
| 6,796,762 | B2 | 9/2004 | Vicars, III et al. | |
| 7,174,967 | B2 * | 2/2007 | Raimondo et al. | 172/439 |
| 7,204,506 | B2 * | 4/2007 | McJunkin | 280/491.1 |
| 7,686,097 | B2 * | 3/2010 | Mozingo et al. | 172/450 |
| 7,686,720 | B2 * | 3/2010 | Nikolai | 474/135 |
| 7,828,071 | B2 * | 11/2010 | Breneur et al. | 172/439 |
| 7,861,794 | B2 * | 1/2011 | Tarasinski et al. | 172/439 |
| 7,874,391 | B2 * | 1/2011 | Dahl et al. | 180/89.12 |
| 7,938,206 | B2 * | 5/2011 | Buhrke et al. | 180/53.1 |
| 2004/0148822 | A1 | 8/2004 | Albright et al. | |
| 2006/0245896 | A1 | 11/2006 | Alshaer et al. | |

FOREIGN PATENT DOCUMENTS

| | | |
|---|---|---|
| DE | 34 47 052 A1 | 6/1986 |
| GB | 1063980 A | 4/1967 |
| GB | 1369649 | 10/1974 |
| GB | 1465891 | 3/1977 |

* cited by examiner

EXTENDABLE FRAME WORK VEHICLE

CROSS-REFERENCED TO RELATED APPLICATIONS

This application is a divisional of application Ser. No. 11/890,332, filed Aug. 6, 2007, and claims priority from that application, which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

This invention relates generally to extendable frame vehicles, and more particularly to extendable frame work vehicles capable of enhanced performance of a variety of construction, landscaping, residential, agriculture and industrial tasks.

II. Related Art

In recent decades, construction equipment capabilities have increased dramatically as have the variety of specialized machines and vehicles that are useful to persons performing jobs at various worksites. To complete many projects, a variety of such specialized vehicles must be delivered to a specific worksite on large trucks or trailers. These vehicles may include skid steer loaders, front end loaders, backhoes, rough terrain forklifts, or any of a large number of trucks and similar devices. Acquiring and transporting such a variety of equipment can be difficult and costly. Further, mastering operation of the many steering and control systems for these different vehicles is known to be an arduous task. It has been frequently recognized, for example, that reducing the number of machines necessary for a particular job would be advantageous. This is especially true when such reduction can be done without sacrificing capabilities of the various machines. A vehicle then, which combines selected useful features of several former vehicles and makes these features even more useful and versatile, would be highly desired and valued by persons in this industry.

Highly maneuverable work vehicles with short wheelbases, such as skid steer vehicles, have proven to be extremely useful for a wide range of agriculture, construction and industrial projects and are considered to be among the most versatile work vehicles available. Such vehicles typically include a rigid frame, independently driven sets of right and left wheels, an operator cab, an engine, a hydraulic system, and lift arms to which a variety of attachments can be joined (e.g. buckets, trenchers, etc.). The overwhelming success of these skid steer vehicles can be traced to a large extent to the maneuverability of steering and control, speed, suitability to a variety of environments, interchangeability of attachments, and generally rugged design.

Despite the many advantages offered by these vehicles, they also have limitations because of configuration or design. There are also problematic safety considerations. For example, when a skid steer vehicle lifts an item with a boom, bucket, or other attachment, the size of the load that can be safely moved may be compromised by the relatively short wheelbase of the conventional skid steer vehicle. The short wheelbase often does not provide a sufficiently stable structure or counterweight to prevent tipping or other unwanted movement. Similarly, traversing steep terrain in a vehicle with such a short wheelbase, particularly when carrying a load, can present problems. Although various trucks and vehicles with wider wheelbases have been used for various tasks in the past, these vehicles generally have greatly diminished maneuverability and agility of operation. Trucks and construction vehicles have been proposed with extendable wheelbases or body members. However, these vehicles generally have a longer steering radius than a skid steer and are less maneuverable. This limits the usefulness of such machines.

Traditional skid steer steering systems also have drawbacks related to the wear and tear they can cause on a work site. Standard operation may cause the vehicle wheels to dig into the ground, particularly if the ground is soft turf. A steering system and design that takes into account and adjusts to a diversity of operating environments and which is compatible with the surface on which it is operated is desired.

Because of the many potential circumstances in which work vehicles must perform, and because of the hazards inherently present in certain construction environments, a vehicle which overcomes such hazards is highly desired. For example, operators of work vehicles of the class are known to attempt to traverse inclines which may be too steep, lift loads that may be too heavy for the circumstances, drive vehicles with unfamiliar controls that are hard to manage, or operate in areas where visibility is limited or impaired and may contribute to a situation that is unsafe. The capability to sense and avoid marginal or unsafe situations is clearly important to work vehicle operators. Generally, current designs are not able to cope with these hazards and most present work vehicles provide little ability to adapt or adjust the vehicle to address such dangers. For example, if a front end loader were to become unstable because a load lifted was too heavy, an operator would have little choice but to rely on his or her quick reflexes to rapidly release the load to prevent the vehicle from tipping.

Therefore, it remains desirable to offer a work vehicle which provides greater versatility, effectiveness and safety. An improved work vehicle is needed which overcomes the problems and limitations experienced in past methods and devices.

SUMMARY OF THE INVENTION

The present invention provides extendable frame work vehicles offering enhanced versatility, safety and effectiveness. The vehicles include an adjustable wheelbase, a plurality of steering modes, and independently driven wheels. The work vehicles also have variable weight distribution system which can be employed to compensate for different weights lifted by the vehicle to different heights and angles dictated by a variety of work attached implements and terrain conditions. Finally, an electro-hydraulic system is provided including a sensor-responsive microprocessor controller, a plurality of sensors, at least one hydraulic pump, at least one hydraulic drive motor, and a valve network. The electro-hydraulic system enables variable extension and retraction of the wheelbase, drive and, steering of the wheels in various modes, and use of a variety of frontward and rearward attachments, all with an eye toward improved safety.

The invention further contemplates a variety of work vehicle embodiments and vehicle and attached implement combinations which are able to safely allow greater lift load capacities and offer safe operation in terrain conditions involving slopes and other undesirable variations. Embodiments include those equipped with adjustable boom arms, GPS systems with attachments for monitoring and determining work locations.

It will be recognized that important aspects of the present development enable a variety of tasks requiring different implements to be accomplished with a single vehicle by changing attached implements or auxiliary systems. Additionally, as indicated, the present development expands the safe capacity of vehicles with respect to many of the tasks.

DETAILED DESCRIPTION

The present invention can be readily understood from the aforementioned figures, the following detailed description and certain embodiments of the present invention. It will be appreciated that the detailed embodiments are meant only as examples and are not intended to limit the scope of the concepts in any manner.

Figure 1:
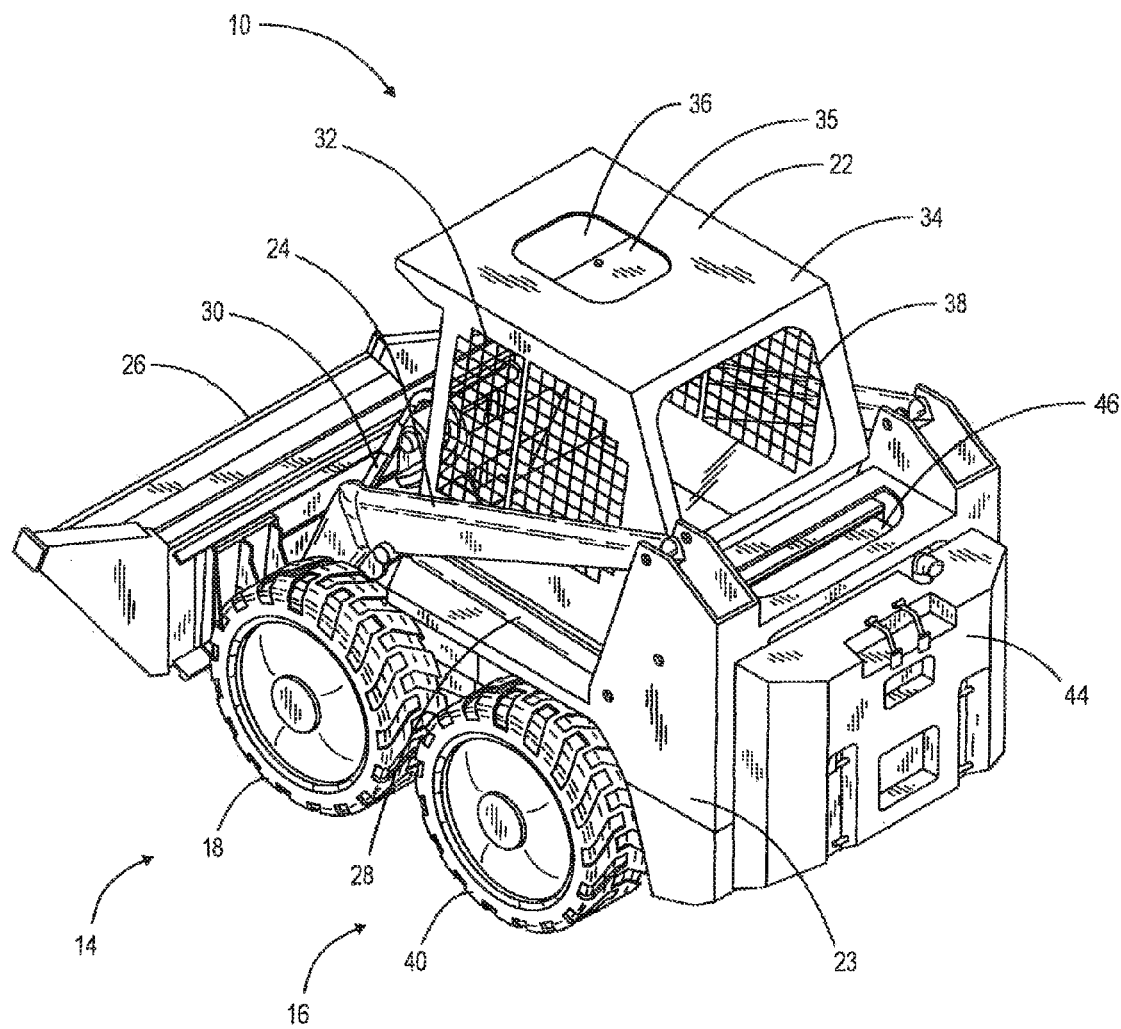
FIG. 1 is a perspective view of a work vehicle embodiment in accordance with the present invention shown in a compact or fully retracted configuration.

FIG. 1 sets forth the basic assembly of the work vehicle in its retracted configuration. In general, the overall appearance of the vehicle may resemble a typical skid steer design when in a retracted state. Although many of the vehicle's features are concealed in this contracted disposition, some of the work vehicle's basic structure can be appreciated from the perspective view of FIG. 1 and the side view of FIG. 2.

The work vehicle 10 generally, as will become apparent, includes a frame having a front portion 14 and a rear portion 16. Front portion 14 of the frame supports a lift arm assembly 21 (FIG. 2), an operator's cab 22, side housing members 23, and much of the physical structure of the front section of the vehicle. A set of wheels comprising wheels 18 and 20 (FIG. 6) support the front portion of the frame. As used throughout this specification, a "set of wheels" may also refer to any suitable number of wheels, e.g. one or more.

Figure 10:
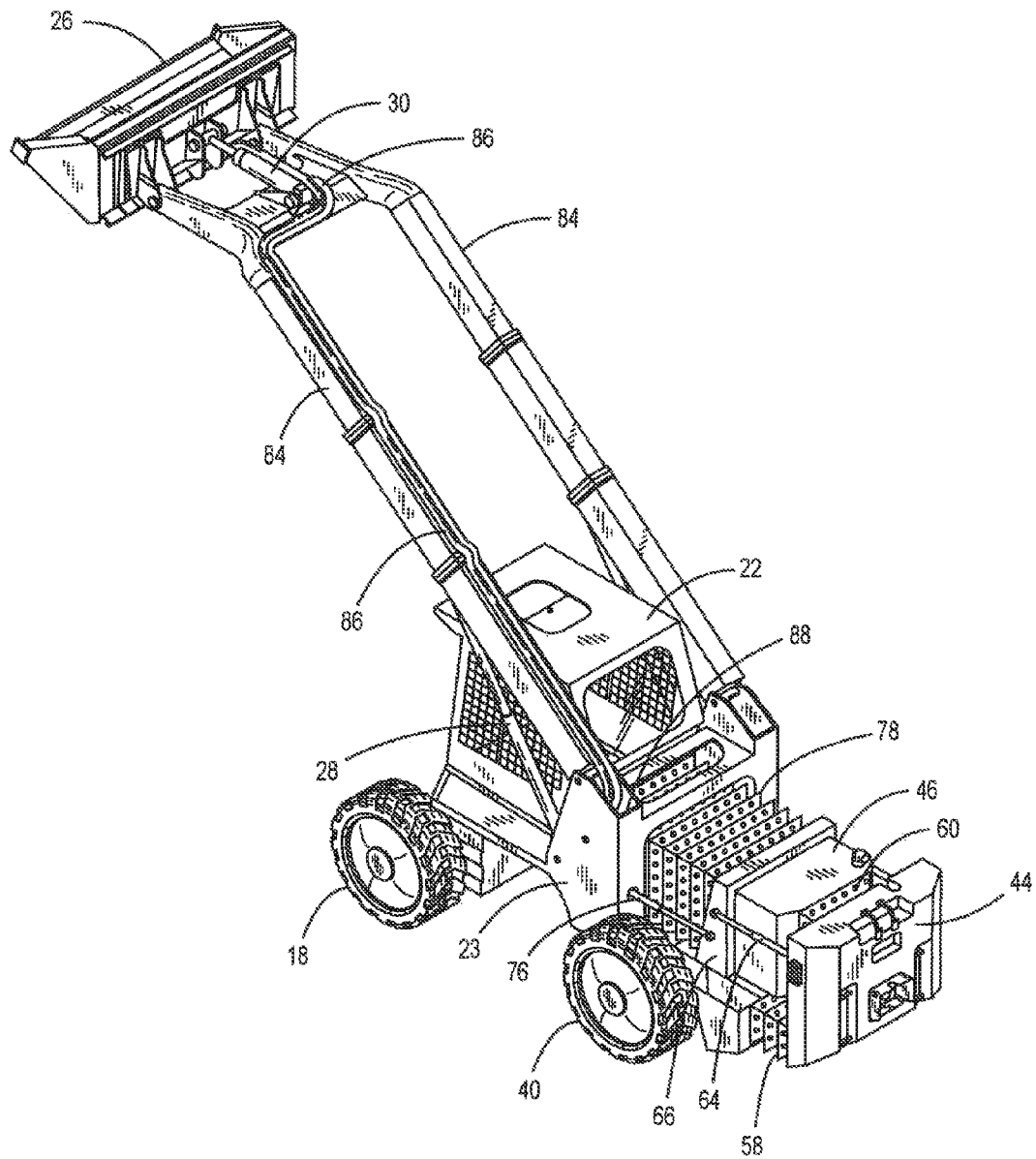
FIG. 10 is a perspective view of the work vehicle with both the primary and secondary extensions deployed and including an extended multi-section boom lift arms.

The lift arm assembly 21 includes a pair of lift arms 24 and an attached bucket 26. Although a pair of lift arms is the primary type of lift mechanism shown in the examples of this application, it will be appreciated that other well-known lift members including booms, cranes, or other like members, may be used as well. Likewise, when the lift mechanism used includes a pair of lift arms 24, it will be appreciated that a vast array of industry standard implements (other than the bucket 26 shown) can be attached to the lift arms 24 and used with the vehicle. The lift arms 24 pivot at their base in a well known manner to lift implements using a pair of actuators such as hydraulic cylinders 28. These cylinders 28 may be found on the right and left sides of the work vehicle. An implement such as bucket 26 may likewise be rotated through an angle at the end of lift arms 24 through use of another actuator such as hydraulic cylinder 30. This type of angular adjustment is useful for dumping material from bucket 26 or leveling its contents. In some designs, it is also possible to extend the lift arms 24 themselves in a telescoping manner as shown in FIG. 10, for example. Extendable lift arms with a plurality of telescoping segments can be used to enable the device to reach greater heights. The extendable lift arms will be discussed later in greater detail.

The work vehicle 10 is equipped with a reinforced operator's cab 22 which is constructed to maximize the safety of an individual using the vehicle. The cab 22 includes a rollover protection cage 32 including both right and left side supports and a roof 34 with a retractable cover 35 for the sunroof opening 36. A sunroof opening 36 provides greater visibility while the cover 35 helps shield the operator from falling debris. A screen may also be provided across the opening for safety reasons. Large front and rear windows 38 also provide good visibility in the forward and rearward direction and aid the user's ability to spot potential dangers. These windows 38 are designed to remain unobstructed by vehicle components in most circumstances.

Side housing members 23 provide rigid structural supports on both the right and left sides of the work vehicle. These members are found at the rear of cab 22 and provide support locations for pivotal engagement of the lift arms 24 and the lift arm cylinders 28. The side housing members 23 are fixed to the front portion 14 of the frame and so do not move in relation to the front portion 14 during expansion/retraction operation.

Figure 2:
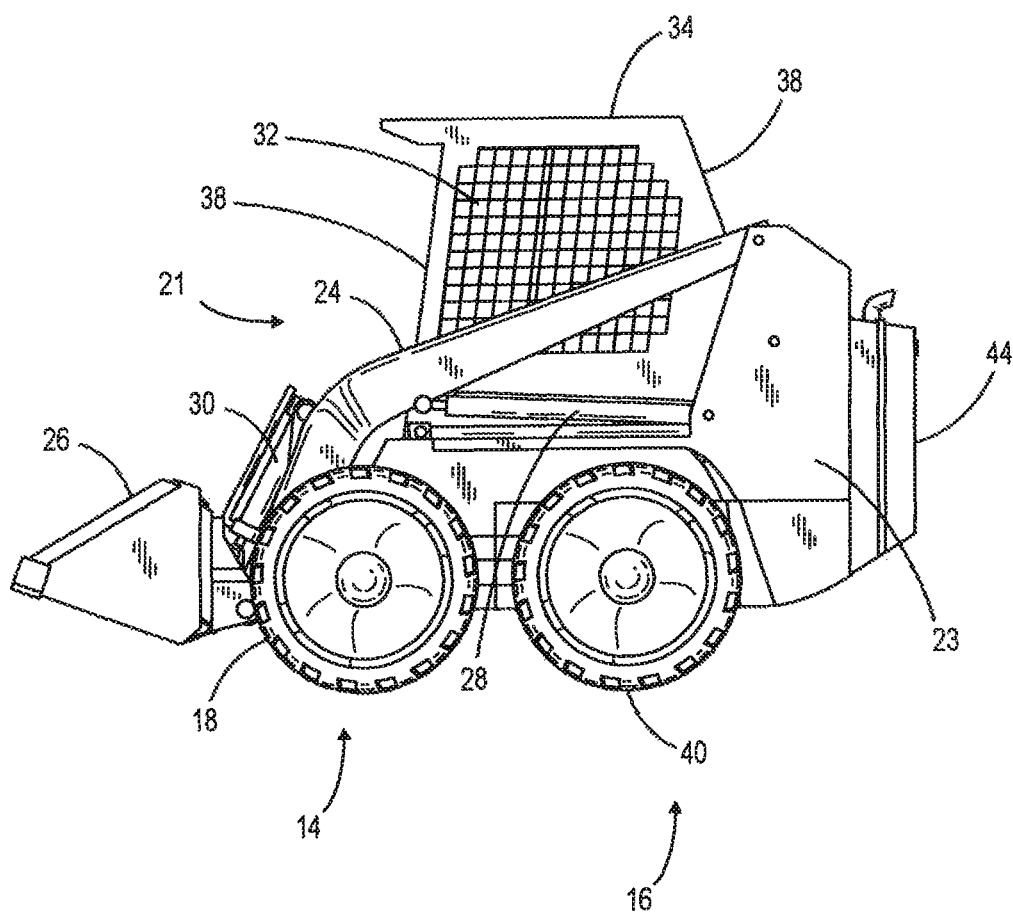
FIG. 2 is a side view of the work vehicle as in FIG. 1.

Other components, including internal components and lower housing members not readily viewable in FIGS. 1 and 2, are also housed on the front portion 14 of the vehicle frame. These will be discussed later in greater detail in connection with other drawing figures.

Figure 6:
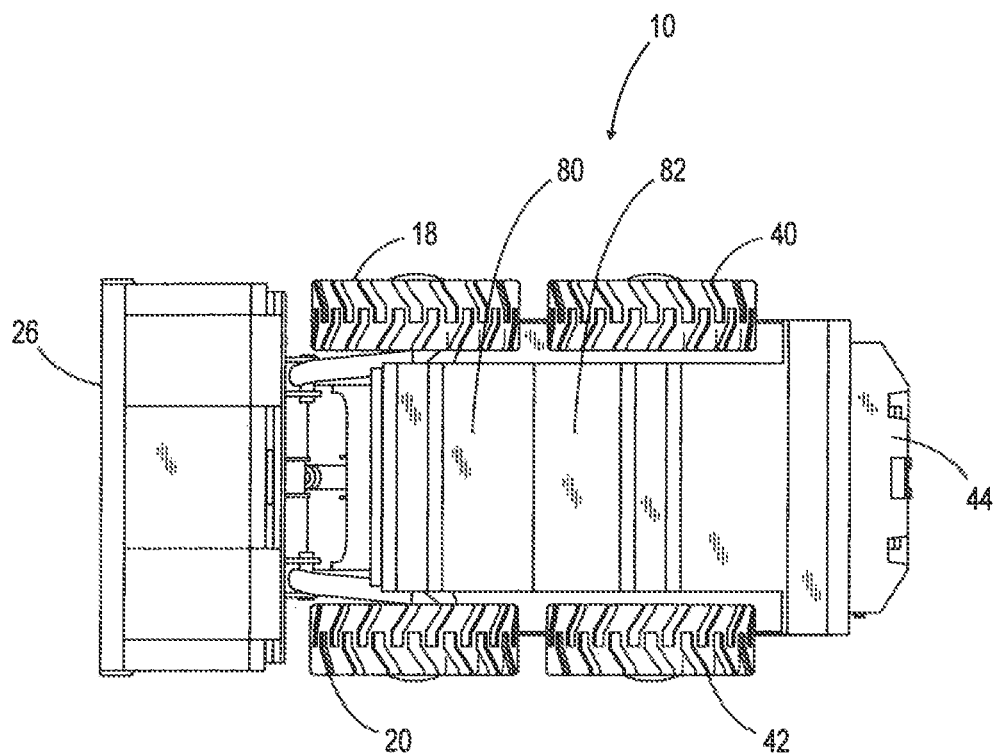
FIG. 6 is a bottom view of the work vehicle of FIG. 1 in a fully retracted configuration.

The rear portion 16 of the frame is supported by a set of wheels comprising wheels 40 and 42 (FIG. 6). The rear portion 16 includes a rear multifaced housing 44, an interior assembly 46 constituting the central rear structure of the work vehicle, and a number of other housing and working features.

As can be seen in the figures, the rear multifaced housing 44 is the rearmost feature of the work vehicle. The multifaced housing's outward protrusion narrows in width and provides a condensed tail section that has largely inwardly grooved features, rather than outwardly projecting components that might interfere with operation. One will understand that the rear multifaced housing 44 will provide for a certain amount of air flow for proper ventilation of the radiator. The compartments and grooved features found within the rear face of housing 44 are shaped to accept a unique three-point hitch and power take-off shown, for example, in FIG. 26 which can optionally be provided. The three-point hitch and power take-off can be added at the time of manufacture or retrofit at a later time. Embodiments that utilize the compartments and grooved features of the rear multifaced housing 44 to incorporate a three-point hitch and power take-off are later described in this application.

As will become apparent, the interior assembly 46 of the rear portion 16 includes many of the internal features that enable the drive, steering, and other electro-hydraulic systems to function. These features may include an engine 48 (not shown), hydraulic pumps, and other hydraulic componentry. As carried by the rear portion 16, the weight of the components of the interior assembly 46 enable it to be effectively utilized as a counterweight to loads experienced by the vehicle's lift arms 24.

The front portion 14 and rear portion 16 of the frame are engaged with one another in moveable relation. More specifically, the two portions are generally moved with respect to one another via a centrally-mounted hydraulic actuator referred to as telescoping device 50.

The present invention has the ability to extend its frame in a variety of configurations. The basic three extended configurations can be more fully understood with reference to FIGS. 3-5. Often an operator of the work vehicle will desire to lift a load or traverse an incline which might cause the vehicle to become unstable in its short wheelbase retracted state. The present invention therefore, allows an operator to rapidly extend or deploy a counterweight load from the back of the vehicle in one configuration, to extend the wheelbase in another configuration or combine them in a third configuration to counteract potential instability. Such extension is able to be performed by either operator or automated control.

Figure 3:
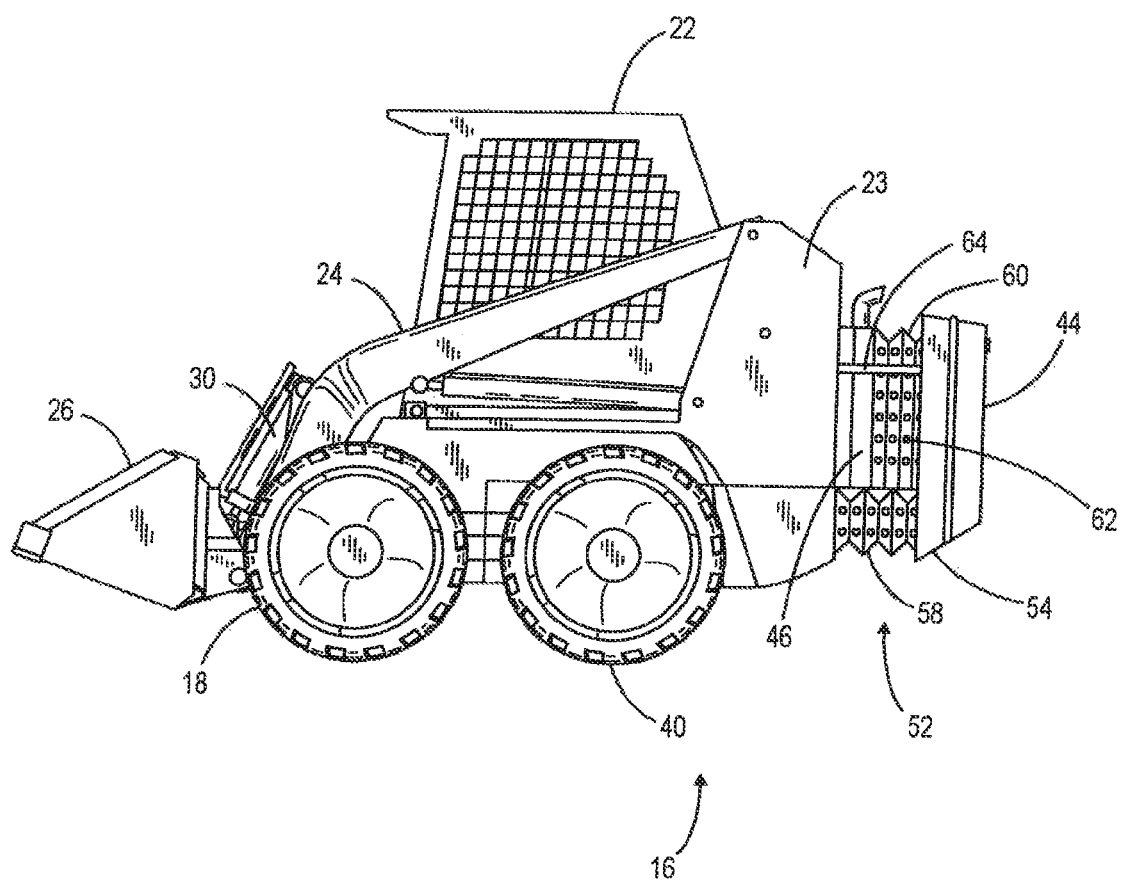
FIG. 3 is a side view of the work vehicle of FIG. 1 with a secondary extension deployed.

FIG. 3 discloses the work vehicle of the present invention where the vehicle's secondary extension assembly or secondary counterweight 52 has been deployed in a rearward manner. The secondary extension assembly or secondary counterweight 52 may be referred to as a separate portion of the frame in some embodiments. The secondary counterweight 52 includes features found at the back end of the rear portion 16. The most significant feature being the rear multifaced housing 44 and its lower counterweight bumper 54 which is contained within the confines of housing 44. The bumper 54 may account for a substantial amount of the weight of the secondary counterweight 52.

When it is extended, the secondary counterweight protrudes from the rear interior housing assembly 46. Interior housing assembly 46 remains stationary and does not move with the secondary extension assembly 52 in this configuration or mode. The secondary counterweight 52 is able to perform such movement by actuation of a pair of lower hydraulically extendable actuator support members 56 located at the bottom sides of the back of the device and the upper extendable actuator. See FIG. 53, for example. The support members 56 cannot be readily viewed from the exterior of the vehicle as they are concealed by a corrugated shroud member 58. This corrugated member 58 has a width slightly less than the base for the vehicle and a height that matches the interior housing 46. Contained within the corrugated member is primarily the set of extendable actuator support members 56. (See FIGS. 11 and 36) While two actuator members are generally shown in the figures of this application, such a set of actuator support members 56 may include any number of one or more such members as desired to carry out this extension. Above shroud member 58, a narrower, centrally located corrugated shroud member 60 extends across the expanse between the work vehicle interior assembly 46 and rear multifaced housing 44. Both shroud members 58 and 60 are extendable, retractable, and contain a plurality of holes 62 which allow considerable airflow around the covered components.

In addition to actuator support members 56, the rear multifaced housing 44 is also supported by a set of connecting cylinders 64. These connecting cylinders 64 are each double-acting multistage cylinders extending between side supports 66 of the interior assembly 46 and the multifaced housing 44. Such a set may comprise one or more such cylinders. A set of connecting cylinders as at 64 shown in the figures of this application generally includes a pair of connecting cylinders on both right and left sides of the vehicle. These extra supports 64 help support the weight of the secondary counterweight 52. Also, the connecting cylinders 64 utilize oval swivel end connectors 68 at their ends. (See FIG. 4) Those connectors 68, together with a sensor system, can cause the connectors to lock in position when the system senses that the load and/or implement on the lift arms is too heavy or that excessive upward and collapsing force is being applied to the connectors. If necessary, the rear extension counterweight will then be locked in place to maximize that counterbalance or to maintain its position.

In general, the secondary extension counterweight 52 is somewhat heavy primarily due to the lower bumper member 54. When extended, the rearward movement of the secondary extension assembly causes an increased rearward counterbalancing force to a load lifted at the front of the vehicle. Therefore, when an operator causes a load to be lifted or maneuvers over terrain requiring more substantial force at the rear of the vehicle, the operator may simply activate the actuator members 56 from within the cab to deploy the secondary counterweight 52 from within the cab 22. Actuation of these actuator members may likewise be carried out in an automated fashion based upon sensors and an extension control system later discussed.

Figure 4:
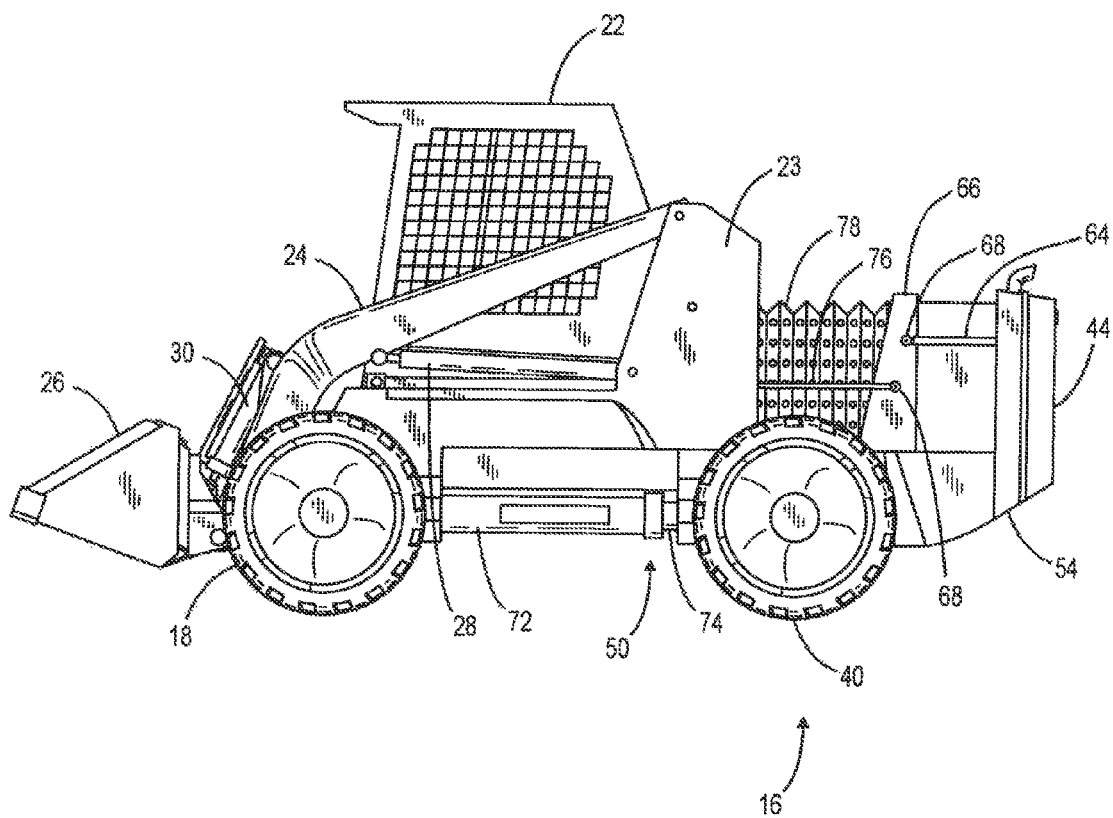
FIG. 4 is a side view of the work vehicle of FIG. 1 with a primary extension deployed.

Another configuration of the work vehicle of the present invention occurs when the primary extension member 70 (FIG. 5) is deployed, as seen in FIG. 4. In this mode the entire rear portion 16, including the wheels 40 and 42, the interior housing 46, and rear multifaced housing 44 have been shifted rearward together. The rear portion 16 moves to this position based upon actuation of the telescoping device 50 centrally disposed on the bottom of the assembly. As seen in FIG. 4, the telescoping device 50 includes a first hydraulic member cylinder or barrel 72 that is mounted to the front portion 14 of the housing. The telescoping device 50 also includes a moveable stage member 74 that is connected to the rear portion 16. The primary extension mode may be achieved when the operator utilizes the vehicle's electro-hydraulic assembly including a hydraulic pump and valve network within the assembly to cause the member 74 to extend outwardly from cylinder 72. When the member 74 is fully deployed, a vehicle with entirely different structure and properties results.

The vehicle's extension of the rear portion 16 is aided by a set of connecting cylinders 76. One of these connecting cylinders is located on the right side of the vehicle and one connecting cylinder is located on the left side of the vehicle. These connecting cylinders, like connecting cylinders 64, are double-acting cylinders that generally extend and retract as the respective vehicle extends or retracts. The connecting cylinders 76 are attached to a location within the side housing members 23 and to the side supports 66 of the interior assembly 46. The connecting cylinders 76 may have more extension length than the lower telescoping device 50 which allows the rear end of the device to become free floating in most applications. The double-acting connecting cylinders 76 are enabled to make adjustments so that the frame portions can be properly maintained. Generally when a load is experienced on the back of the vehicle, as on the three-point hitch for example, a sensor is used to detect that load and to cause the connecting cylinders 76 to retract or extend based on that sensor data. By performing in this way, the connecting cylinders help to maintain the structural integrity of the vehicle, especially when the wheelbase is extended.

Also seen in FIG. 4, is a corrugated shroud member 78. This corrugated shroud conceals the expanse and internal components between the cab 22 and the side supports 66 of the interior assembly 46. This shroud, like the shroud members 58 and 60, is extendable, retractable, and contains a plurality of holes 62. When the vehicle is extended, the combination of both the stability gained from the longer wheelbase and larger load handling ability due to counterweight relocation provides a vehicle configuration which has greatly increased effectiveness.

Figure 5:
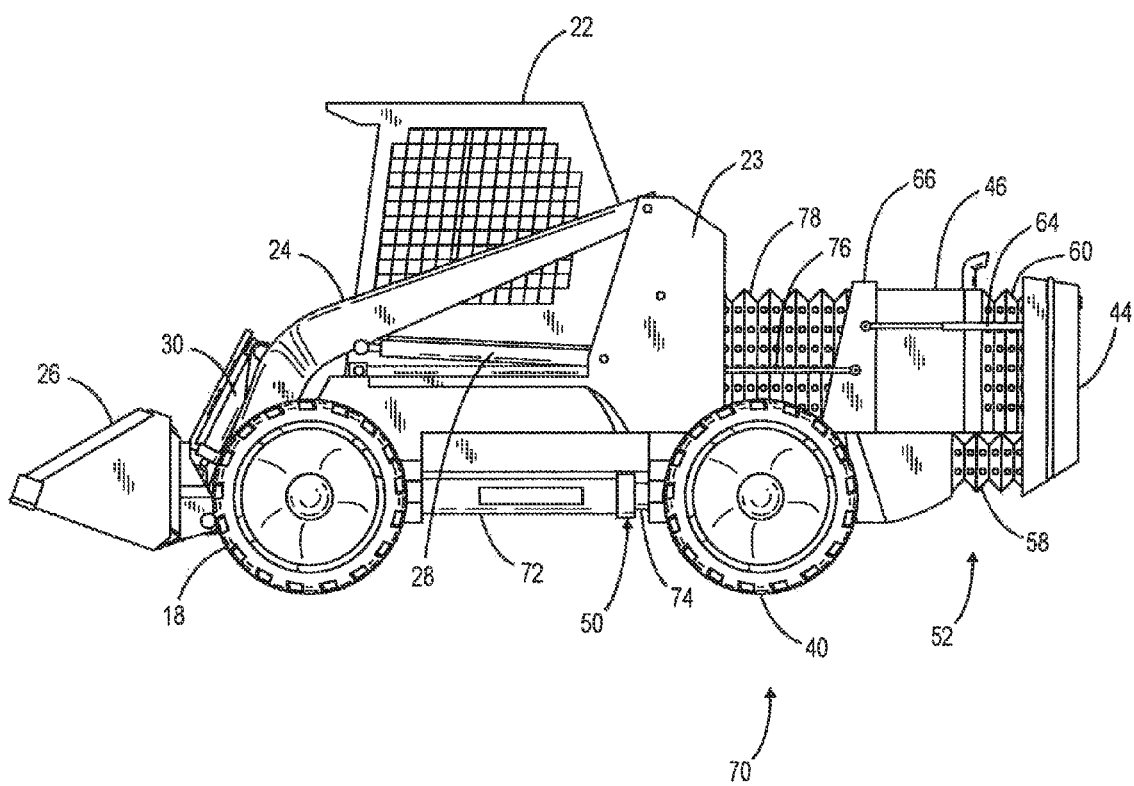
FIG. 5 is a side view of the work vehicle of FIG. 1 showing both a primary and secondary extensions deployed.

The vehicle configuration shown in FIG. 5 discloses both the primary extension 70 and secondary extension 52 deployed from the vehicle. By lengthening the vehicle and its wheelbase with both extensions, the stability of the vehicle is further maximized as an even greater load may be handled by the lift arms 24 and bucket 26 at the front of the vehicle. Deployment of each of these extensions may be controlled entirely from within the cab 22 of the work vehicle by the operator. Automated deployment of one or more of these extensions may be enabled as well.

FIGS. 6-9 set forth a bottom view of the work vehicle in four modes of configuration. These include the vehicle's retracted mode, secondary extension mode, primary extension mode, and combined primary and secondary extension mode, respectively. These figures allow operation of the vehicle frame to be readily understood.

In the perspective view of FIG. 6, the work vehicle's front lower body member 80 and rear lower body member 82 are situated directly adjacent one another. Front wheels 18 and 20 extend from opposing sides of the front body member 80 and rear wheels 40 and 42 extend from opposing sides of the rear body member 82. The bucket implement 26 is located at the front of the work vehicle and the multifaced housing 44 is located at the rear of the vehicle. The short wheelbase of the retracted mode shown here allows a highly maneuverable vehicle which may operate in skid steer mode.

Figure 7:
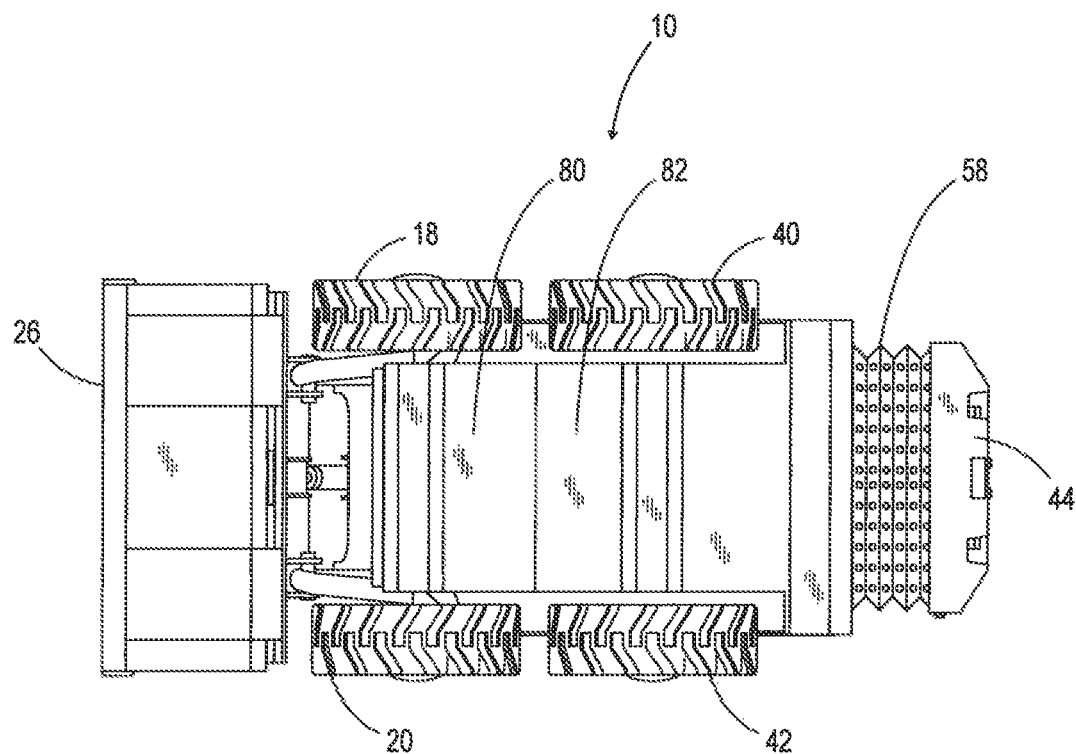
FIG. 7 is a bottom view of the work vehicle of FIG. 1 with the secondary extension deployed.

The secondary extension assembly or counterweight 52 is deployed in the bottom view of FIG. 7. As discussed previously, beneath the corrugated shroud 58 the lower hydraulically extendable support members 56 (not shown) have been extended to move the multifaced housing 44 and rear bumper 54 away from the rear body of the vehicle. The wheelbase of the work vehicle is not extended in this mode and the body members 80 and 82 remain adjacent one another.

Figure 8:
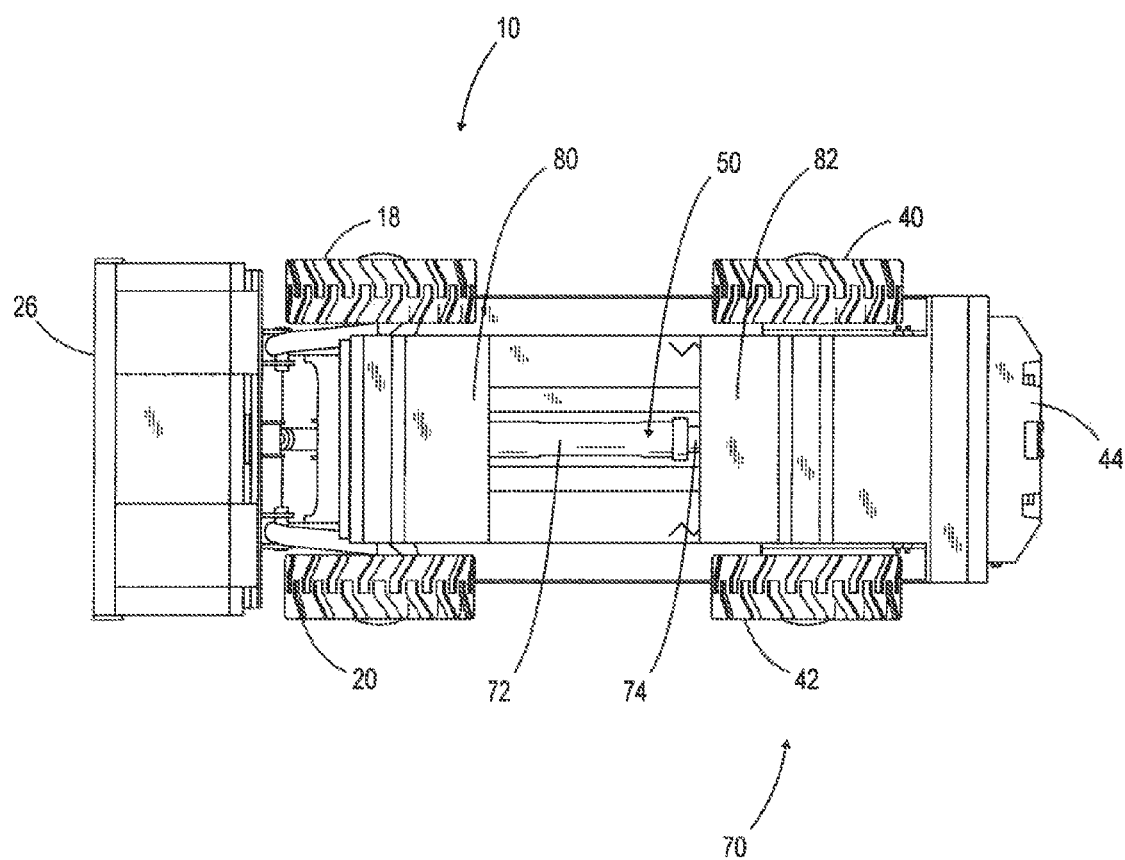
FIG. 8 is a bottom view of the work vehicle of FIG. 1 with the primary extension deployed.

In FIG. 8, the primary extension 70 has been deployed. Front body member 80 is separated from the rear body member 82 via the telescopic actuator 50. The primary extension may be deployed either manually or in an automated fashion.

Figure 9:
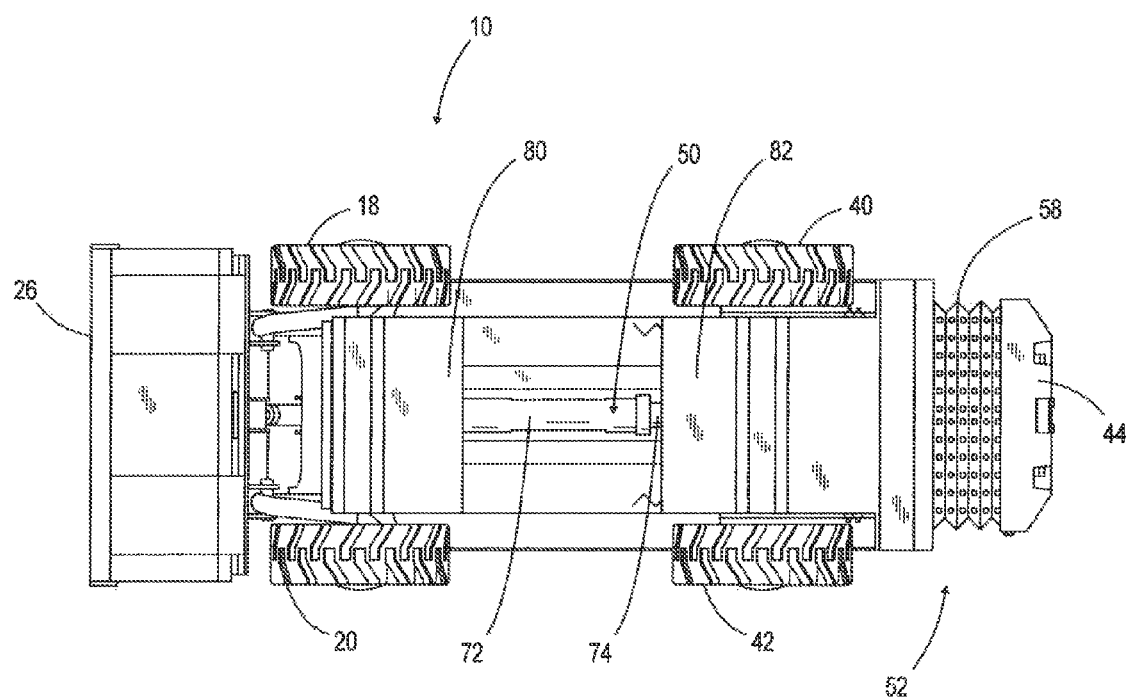
FIG. 9 is a bottom view of the work vehicle of FIG. 1 with both the primary and secondary extensions deployed.

FIG. 9 simply shows a bottom view where both the primary extension 70 and the secondary extension assembly 52 are fully extended. Both an expanded wheelbase and extended counterbalancing load are present. This mode provides a maximum amount of stability and rear counterbalancing force for loads lifted by an implement at the front of the work vehicle.

Figure 11:
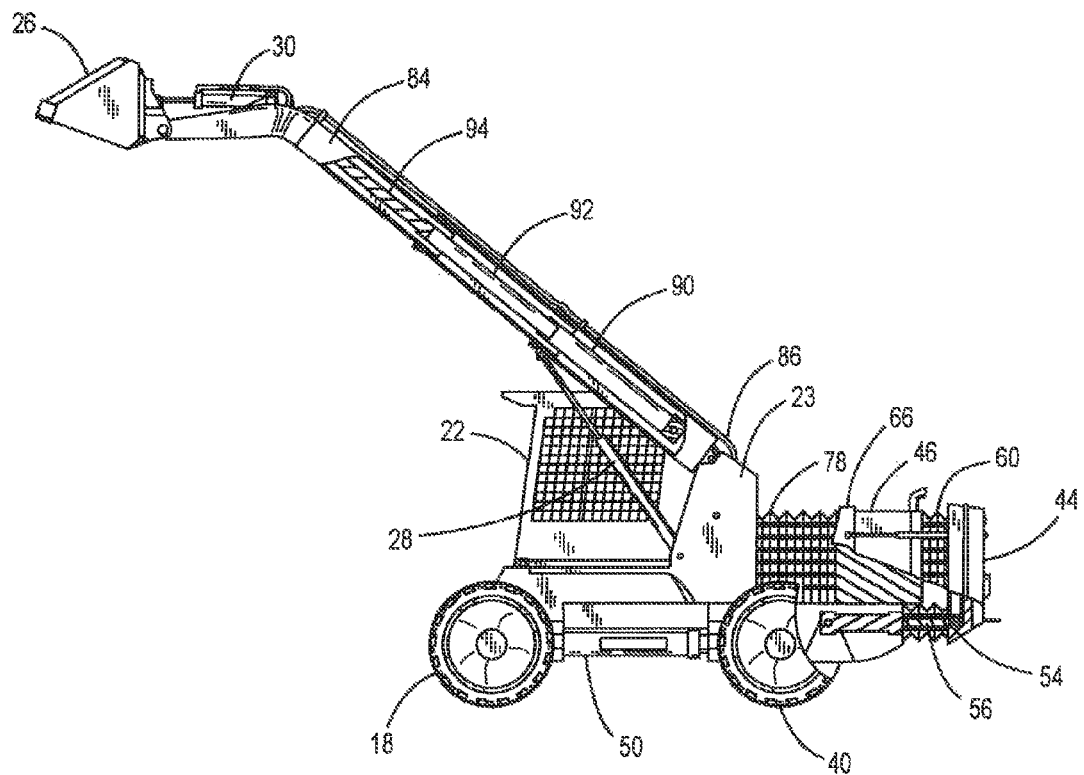
FIG. 11 is a side view of the embodiment of FIG. 10 with partial cutaway sections of the work vehicle with extended boom lift arms.

FIGS. 10 and 11 disclose the use of telescoping lift arms 84 to reach objects a greater distance from the vehicle and to reach greater heights. As seen here, the vehicle is operating with extensions fully deployed. The telescoping design of these lift arms 84 enables significant heights to be reached and only a minimum amount of space to be occupied when stored in the retracted mode. Although a pair of triple segment or stage arms is disclosed here, a set of single stage or double stage lift arms are contemplated as well. In either case, these boom designs must be rigid enough for push/pull digging operations and have synchronized side to side hydraulic movement.

The telescoping arms 84, like the standard loader arms 24, are able to be pivotally raised and lowered using hydraulic actuators 28. Also, implements mounted at the outstretched end of the arms 84 have their tilt governed by hydraulic actuator 30. The actuator 30 allows for functions such as self-leveling of a bucket or implement. Hydraulic pulsing of this actuator supplies bucket shaking functions as well.

The lift arms 84 are enabled to extend in a telescoping manner. These extendable arms have a rectangular cross section and are built to support a significant load. Hydraulic lines 86 are secured along at least one of the work vehicle's lift arms to provide power to the hydraulic actuator 30. The hydraulic lines 86 are held down so that they may be extended and retracted as the triple length lift arms 84 are extended and retracted. This process is aided by a mechanism 88 found within one of the side housing members 23. The mechanism 88 winds up or lets out hydraulic lines 86 from a grooved drum member when necessary. This mechanism can be seen in greater detail in the view shown in FIG. 37.

FIG. 11 discloses a partial cut away view of the triple lift arm 84 to provide further insight as to its structure. More specifically, a partial cross-section is shown of the triple extension member 84 as well as a partial cross-section of the lower back end of the work vehicle. The three part telescoping member contains cylinders 90, 92, and 94 inside the larger outer triple extension 84. These hydraulic cylinders allow for precise, smooth, and detailed movements and operations by the lift arms 84.

FIG. 11 also provides a partial cut away view of the lower back end of the work vehicle where both the primary and secondary extensions are extended. One of the actuator support members 56 and the counterweight bumper 54 can be seen as well. The second actuator support member 56 of this embodiment is not shown, however that support member is identical to the member 56 shown and is located in parallel relation to that member.

Figure 12:
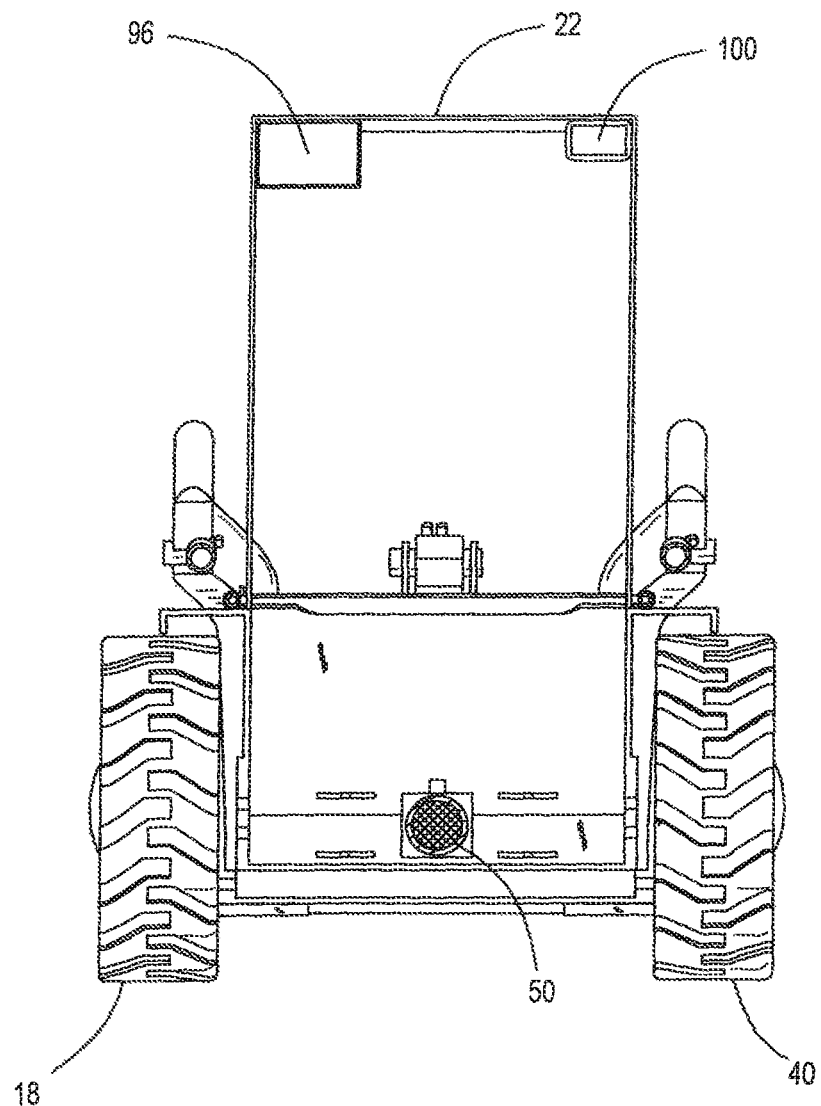
FIG. 12 is a view, partly in section, of the cab of the work vehicle of FIG. 1 disclosing a rear view LCD screen and a GPS screen.
Figure 13:
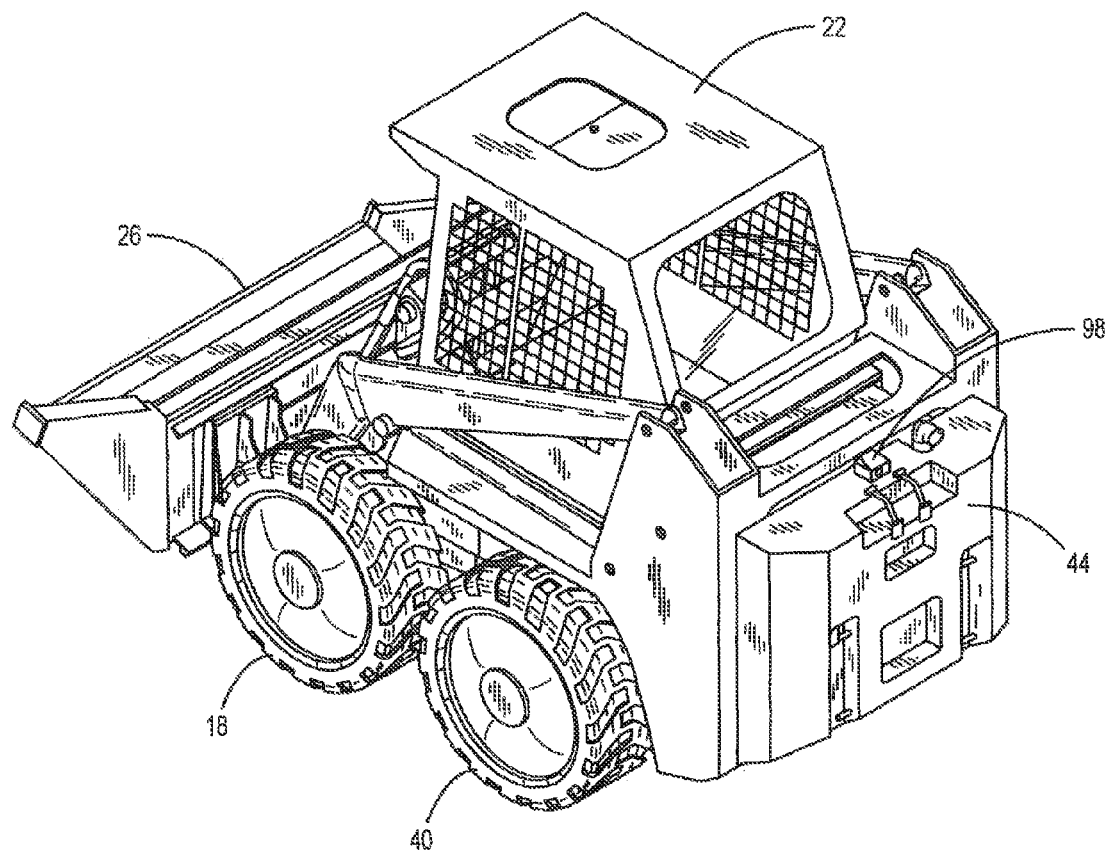
FIG. 13 is a perspective view of the work vehicle of FIG. 1 disclosing a rear view camera location.

FIGS. 12 and 13 disclose use of a GPS system and a rearview camera in the present invention. In FIG. 12, a cross section of the cab and vehicle shows a rear view LCD screen 96 in the upper left corner of the operator's cab 22. This screen is able to be easily viewed by the operator of the work vehicle to observe the area directly behind the vehicle. Images displayed on the LCD screen 96 are supplied by the camera 98 mounted on the rear of the work vehicle, as seen in FIG. 13. This screen 96 is especially useful to an operator when backing up the work vehicle or when visibility is limited behind the operator.

A global positioning satellite (GPS) screen 100 is also seen in FIG. 12. This screen 100 may be located in an operator's upper right corner of cab 22 in an easily viewable location for an operator. GPS screen 100 and information displayed therein allows the operator to precisely pinpoint vehicle location. This is, as is well known, accomplished through use of a receiver mounted in the vehicle which picks up a signal sent out by a plurality of satellites broadcasting location information. Of course, GPS information is useful in a broad range of applications. For example, positioning information would be useful in agricultural or turf applications where an operator wishes to know whether a particular agricultural product, such as fertilizer, has been or needs to be applied to that location.

Another application for the GPS system might include using the location information in conjunction with topography and terrain information. Such an application might be used to ensure that a work vehicle burying cable into the ground is able to do so at a constant depth. It is possible to make such an operation possible by utilizing a secondary transducer to relay depth information. These and similar applications may also make use of a Geographic Information System (GIS) for mapping easements, property lines, and other geographic data. By using such a system an operator can have certainty of location information when performing a construction task without leaving the cab of the vehicle or otherwise delaying a task to ensure work is being done at an appropriate location.

Use of a GPS system, as set forth in FIG. 12, has numerous other applications as well, including acting as a location mechanism for lost, stolen or disabled vehicles. In more general application, information received by the GPS components will be supplied to the vehicle sensor-responsive microprocessor controller for governing the movement of the work vehicle including its steering system, drive system, and lift arm system. The software run on the controller enables the vehicle to utilize geographic information to make operation "smart".

Figure 14:
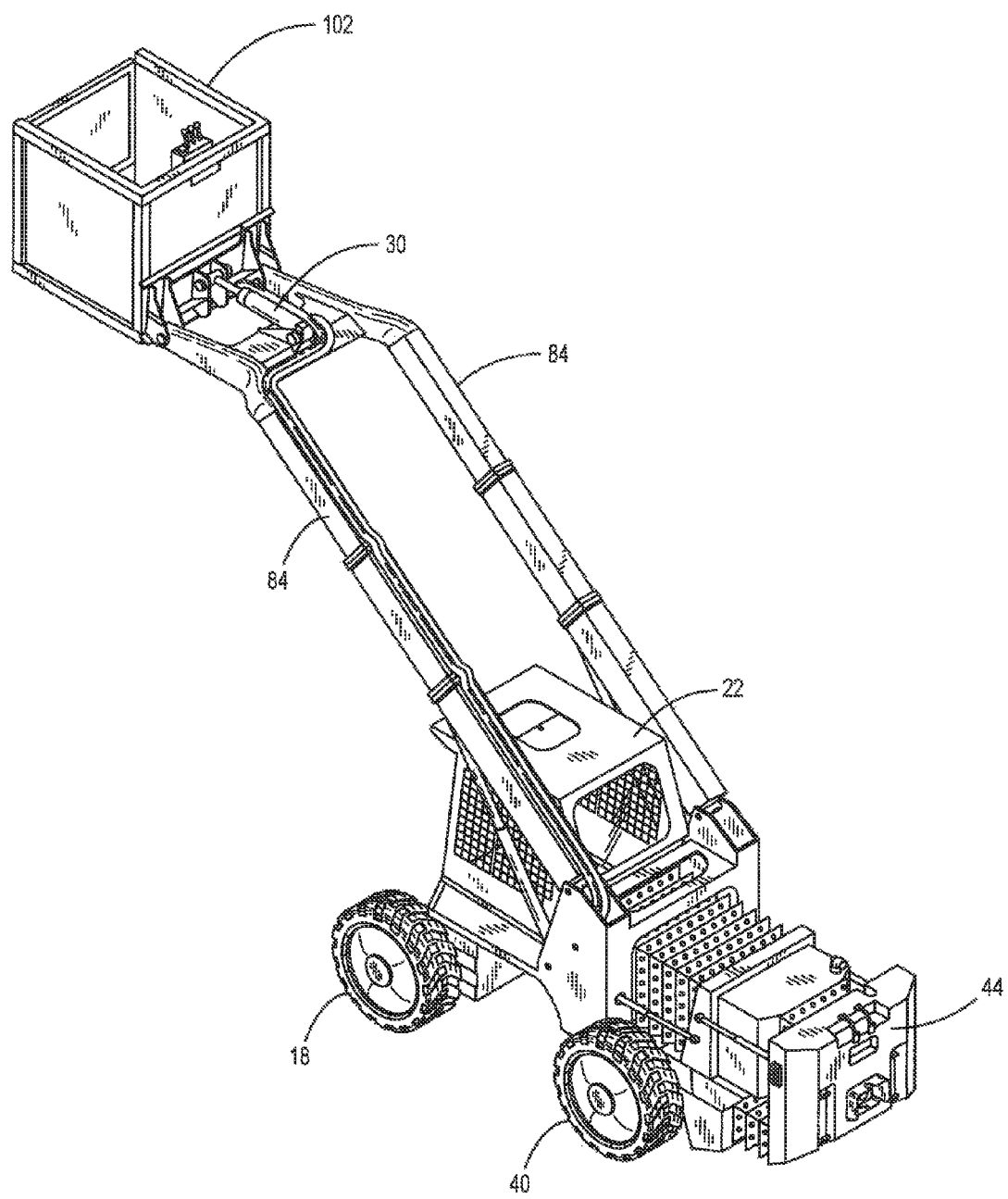
FIG. 14 is a perspective view of the work vehicle as in FIG. 10 including a manlift control box attachment in an extended configuration.

FIG. 14 sets forth a work vehicle having a manlift control box 102 attached to lift arms 84. This manlift 102 can be used to elevate a worker to perform any of a wide range of construction, maintenance, industrial, or general tasks. The controls found in the manlift 102 allow the vehicle to be operated from within the manlift 102 rather than the operator's cab 22. The manlift 102 will typically only be utilized when the primary extension 70 is extended. Such a configuration is recommended because the expanded wheelbase will help ensure that sufficient stability is present for an operator and that there will be little danger of vehicle tipping.

Figure 15:
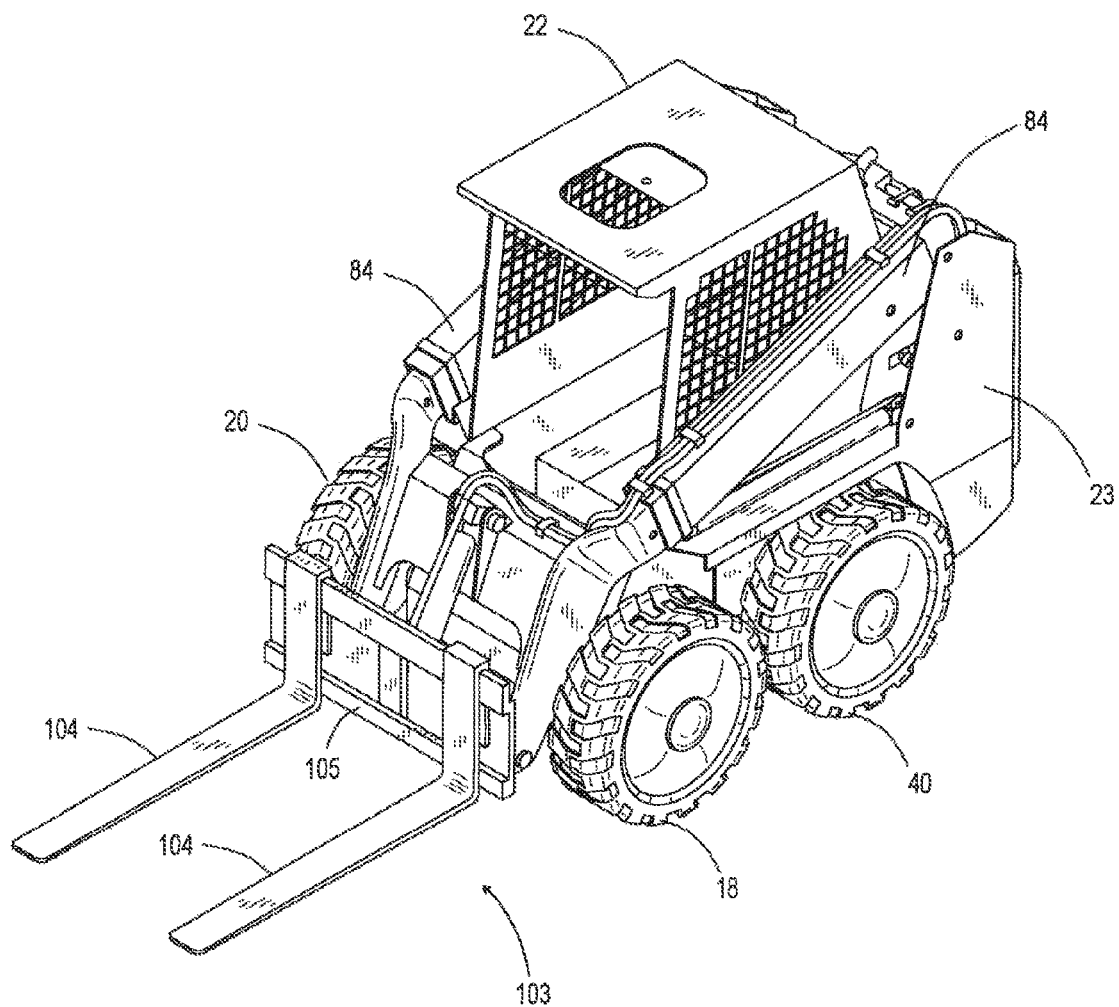
FIG. 15 is a perspective view of the work vehicle showing a retracted configuration with a forklift attachment.
Figure 16:
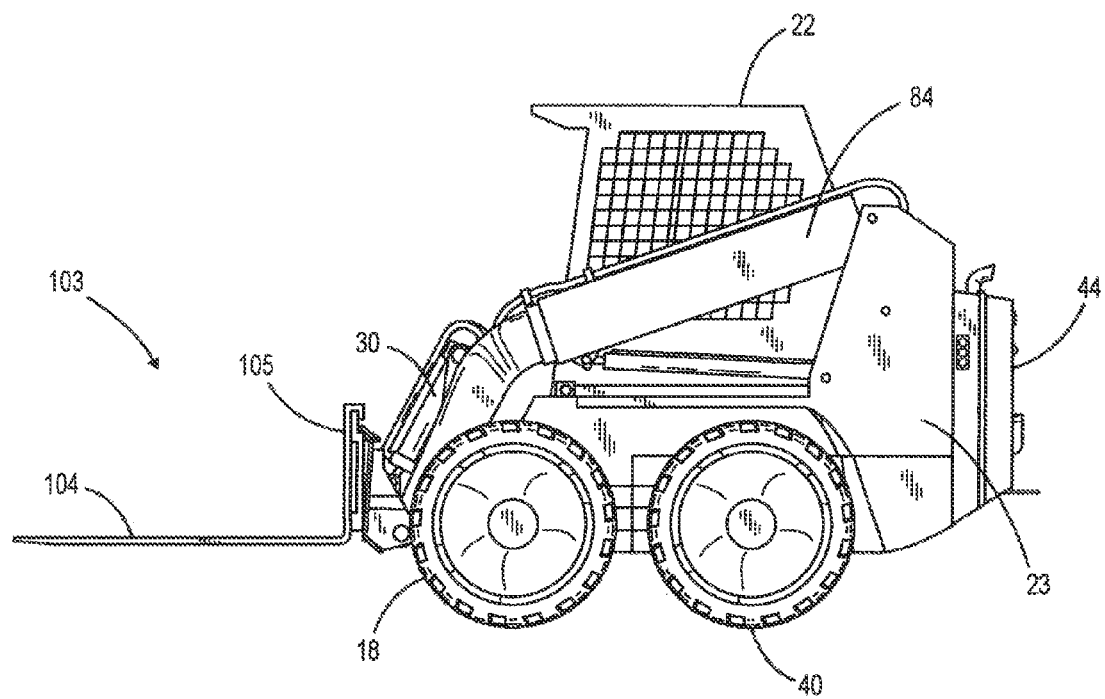
FIG. 16 is a side view of the work vehicle configuration of FIG. 15 in a retracted position with a forklift.
Figure 17:
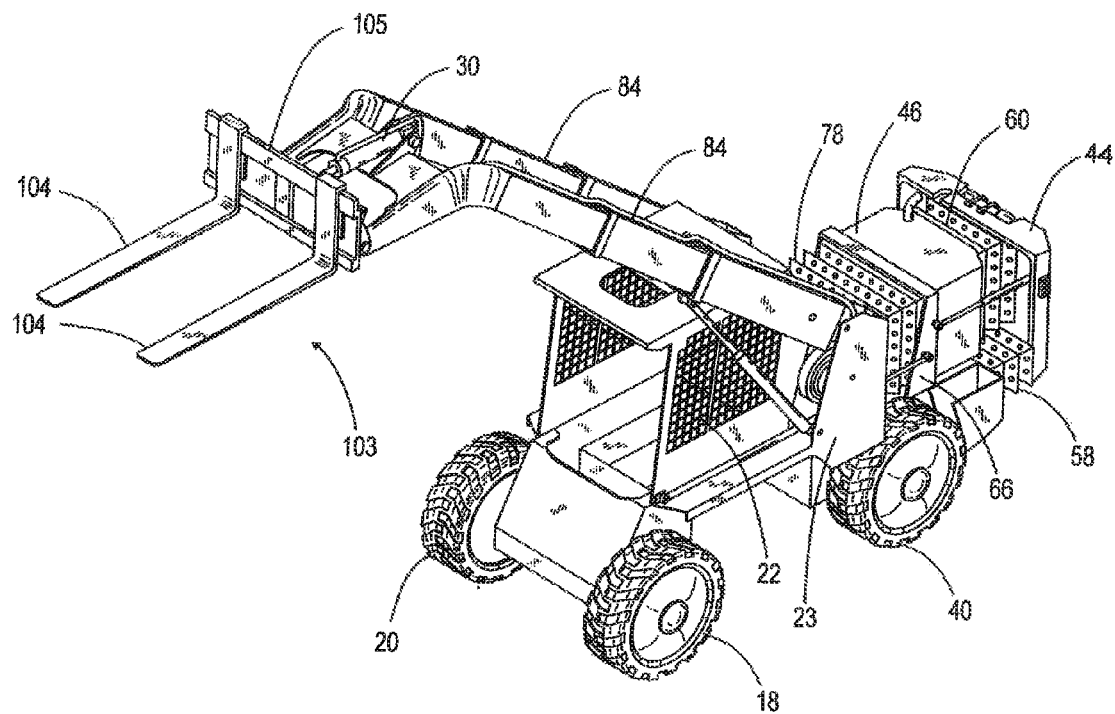
FIG. 17 is a perspective view of the work vehicle of FIG. 15 shown in an extended lifting position.

The present concept may be used with a standard forklift configuration where forklift members 104 are mounted as part of an implement attachment 103 at the end of vehicle lift arms 84. That configuration is shown in the side and perspective views in FIGS. 15-17. The implement attachment 103 generally consists of two standard forklift members 104 projecting outward from a vertical implement panel 105. Such an implement attachment is extremely useful in well-known industrial applications for lifting pallets and packages of goods and materials. Specifically, the arrangement seen in these figures is attached to a vehicle having telescoping lift arms 84.

Figure 18:
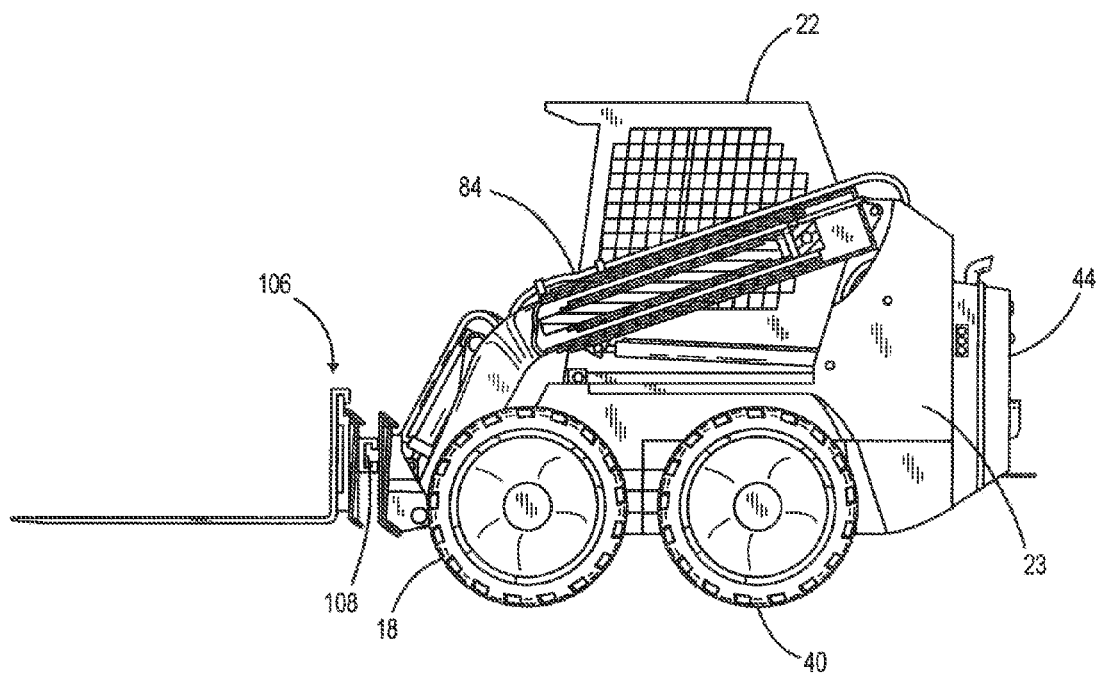
FIG. 18 is a side view with parts cut away section of the work vehicle in a retracted configuration with a slideable forklift attachment.
Figure 19:
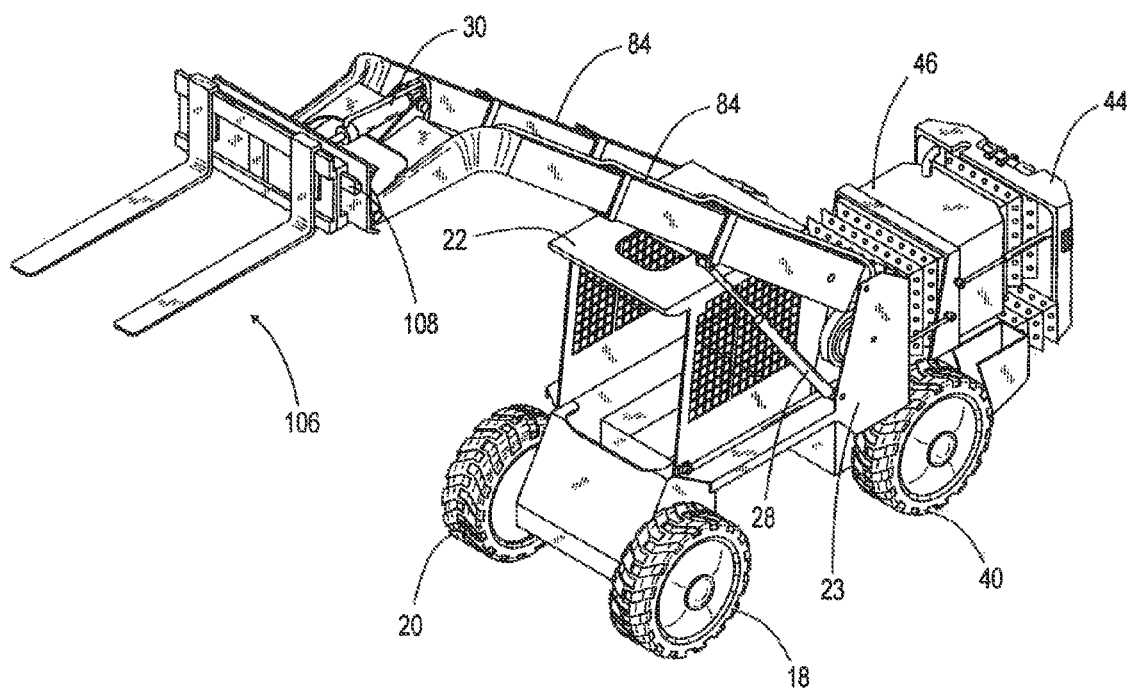
FIG. 19 is a perspective view of the work vehicle in an extended configuration with a slideable forklift attachment in a raised position.

FIGS. 18 and 19 set forth an alternate design to the standard forklift configuration. Here, an adaptable fork lift member 106 is slideable from side to side on a grooved implement attachment 108. Such lateral movement is extremely useful to a vehicle seeking to align its forks with holes in a pallet for example. Typically, a conventional work vehicle would need to maneuver its entire body to realign the forks and pallet openings. However, when the attachment 108 is used, all an operator must do is activate lateral implement movement using an electrical or hydraulic motor switch. The ability to use such implement attachments is an example of the enhanced versatility of this device. An operator is therefore also able to quickly and easily shift loads from side to side and provide precise and delicate placement of lifted materials. Also, seen in FIG. 18 is a partial cross-section of the lift arms 84 showing retracted telescoping cylinders in greater detail. This telescoping design provides substantial space savings over vehicles which do not have this feature.

Figure 20:
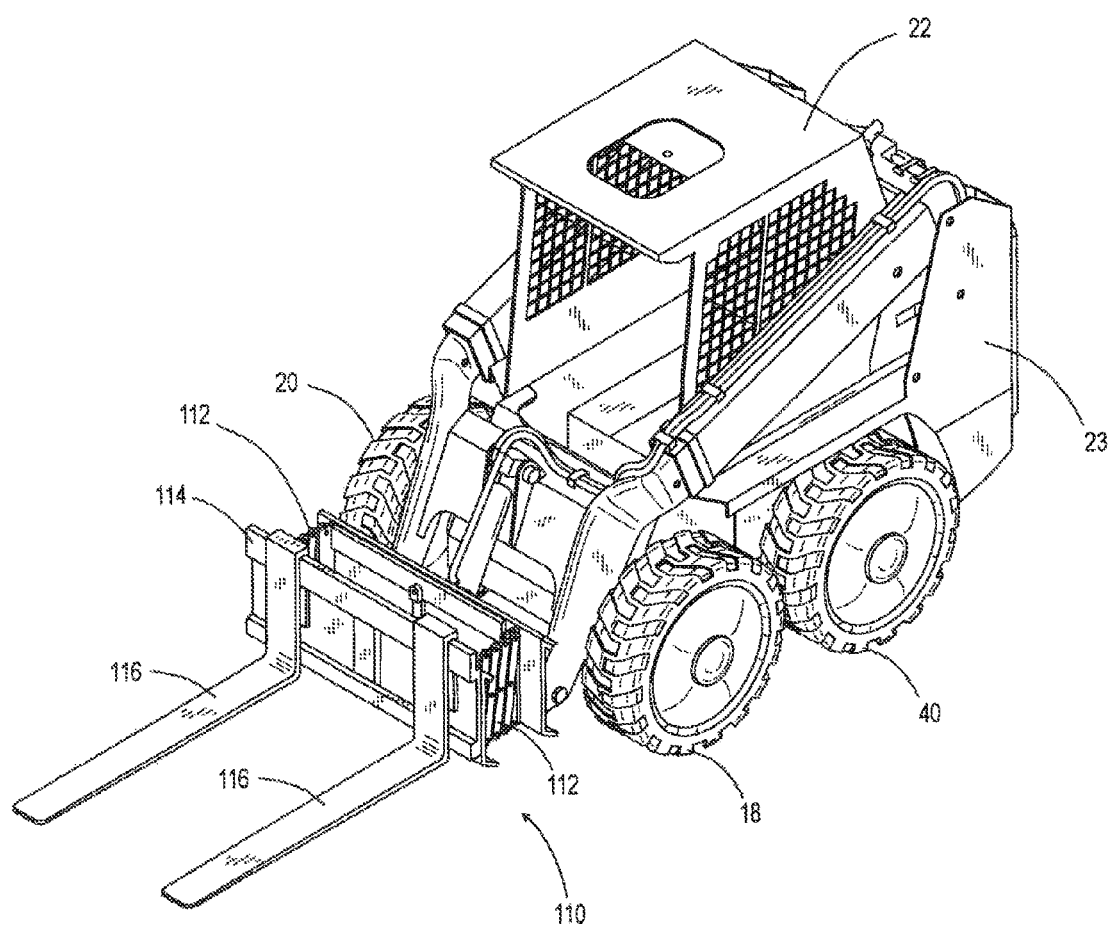
FIG. 20 is a perspective view of the work vehicle fully retracted with an extendable forklift attachment lowered.
Figure 21:
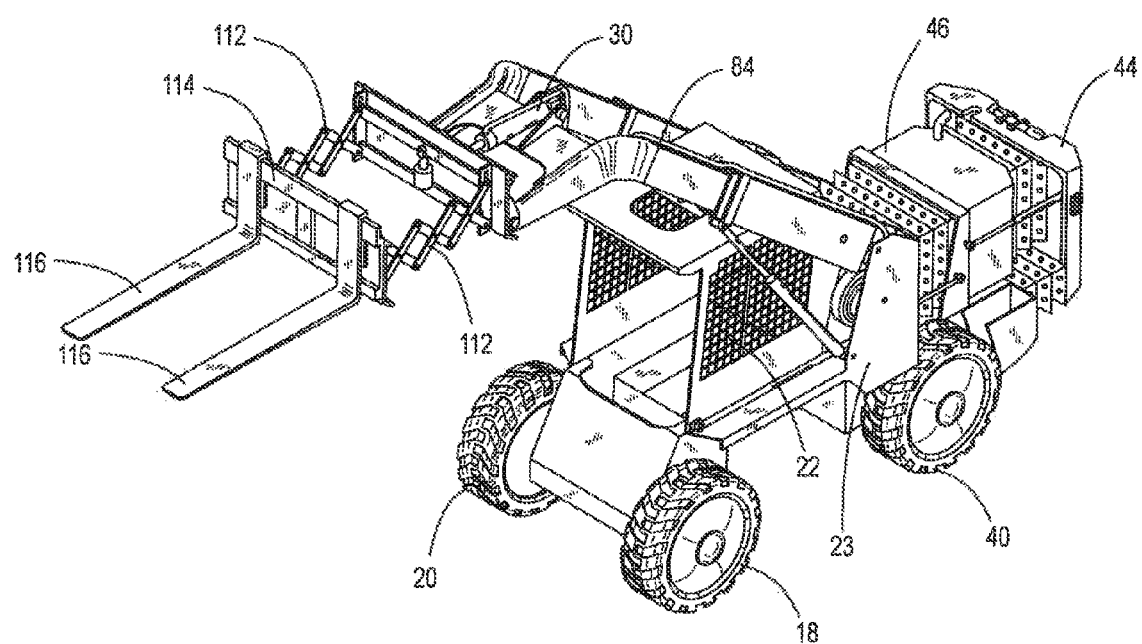
FIG. 21 is a perspective view of the work vehicle in an extended position with an extendable forklift attachment in an extended, raised configuration.

FIGS. 20 and 21 set forth yet another attachment mechanism in the form of an extendable forklift assembly 110. This device utilizes expanding support members 112 of crisscrossed shape on the right and left sides of the implement attachment to extend and retract the forklift implement attachment plate 114 and fork members 116. The support members 112 are able to lengthen their reach by pivoting crossed link members at the centers and ends of each link of the member 112. Therefore, expanded extension and retraction is possible. Having such an adjustable and maneuverable fork member enables increased ease of alignment as well as additional extension of lifted objects when placing these objects in difficult to reach areas.

Figure 22:
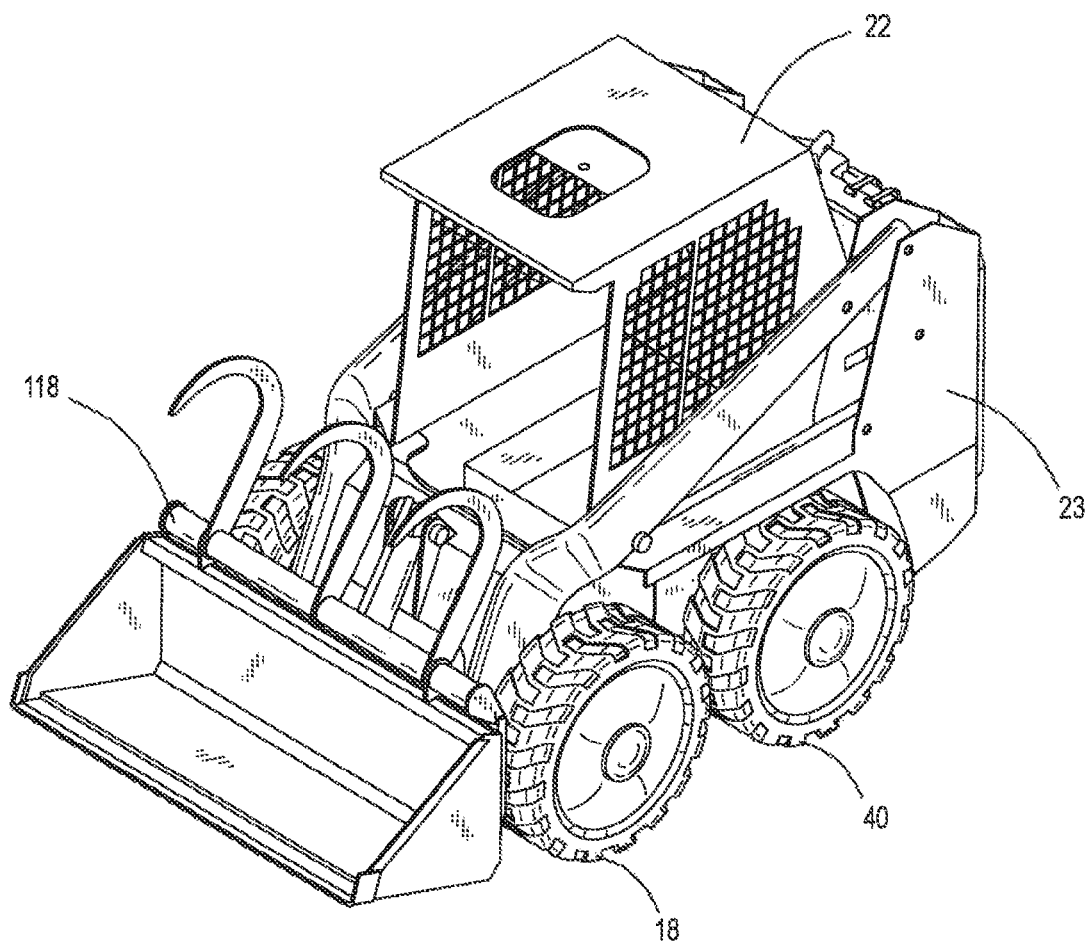
FIGS. 22-26 depict various alternate implement attachment arrangements for the work vehicle.

FIGS. 22-26 disclose a variety of implement attachment arrangements for the work vehicle. FIG. 22 shows a grapple bucket attachment 118. The grapple bucket 118 allows a user to take advantage of the leveling and loading capabilities of a skid steer type bucket while also enabling a plurality of hydraulic grapples to assist in grabbing material. Collection and manipulation of all sizes and types of scrap, trash, objects, and debris are possible.

Figure 23:
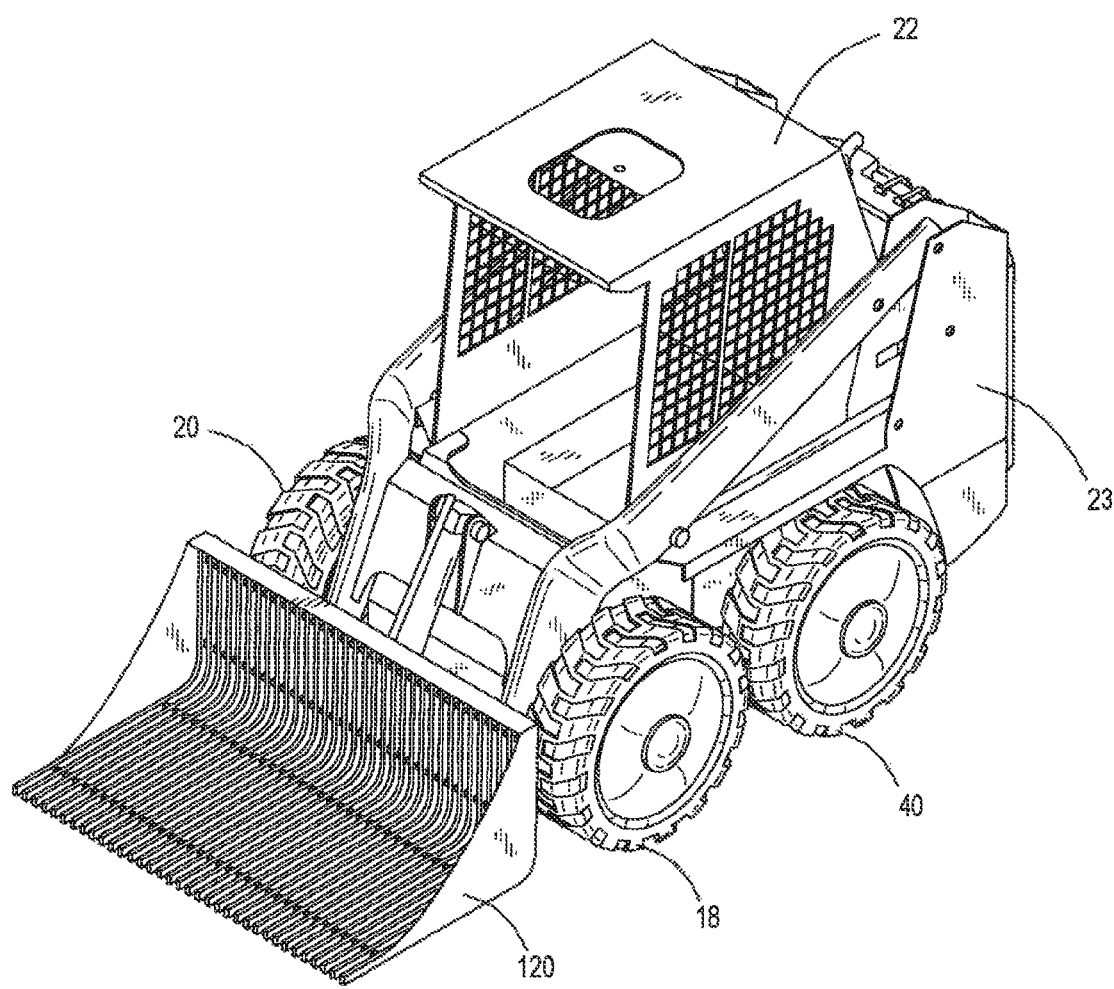

FIG. 23 shows a rock picker attachment 120. The rock picker attachment 120 is highly useful for a variety of commercial, industrial, agricultural, and landscaping jobs. It is specially designed to pick up rocks, bricks, debris, logs, and similar materials. Further, the rock picker 120 allows for quick and safe dumping of material directly into trucks or desired areas.

Figure 24:
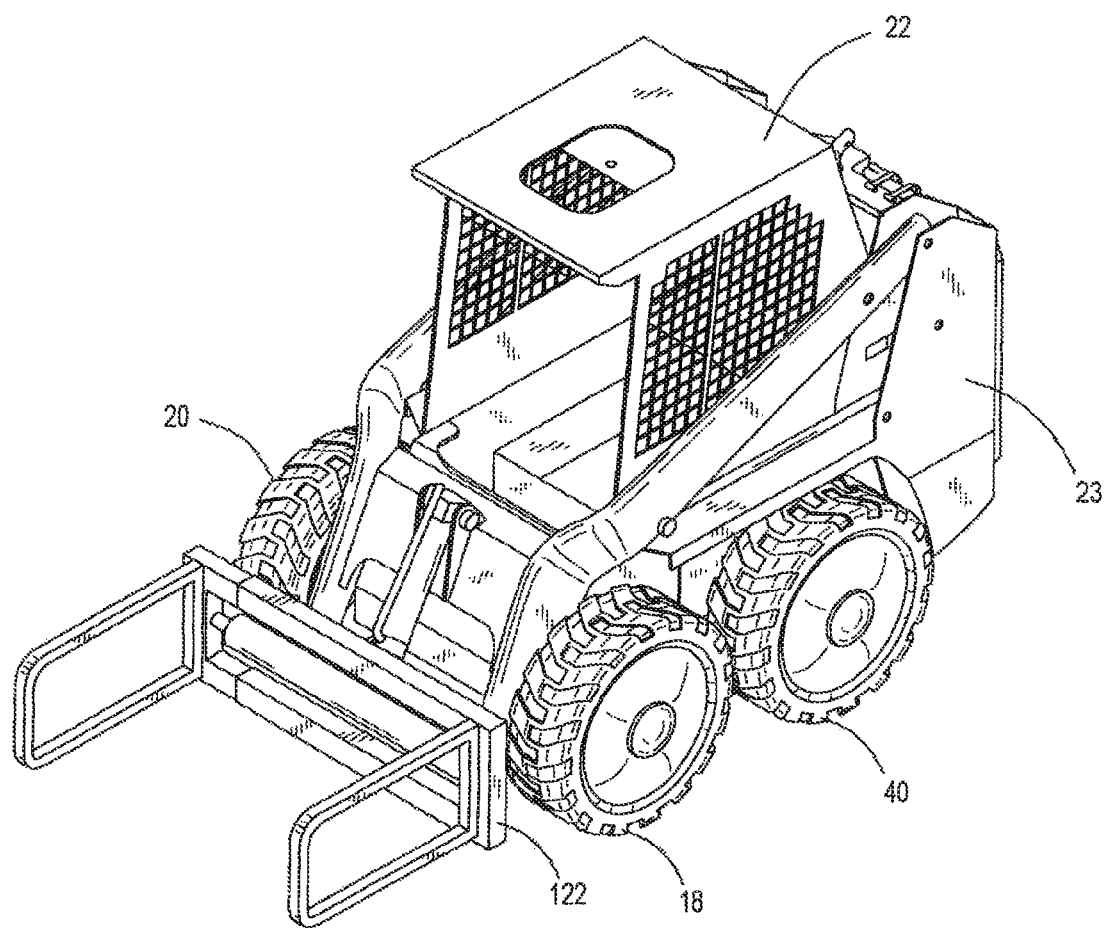

FIG. 24 shows a bale handler implement attachment 122. The bale handler of FIG. 24 is mounted to the front end of the work vehicle. This attachment is intended to carefully handle dry bales, round bales, and wrapped square or round bales. The implement's movement is effectuated by one or more hydraulic cylinders.

Figure 25:
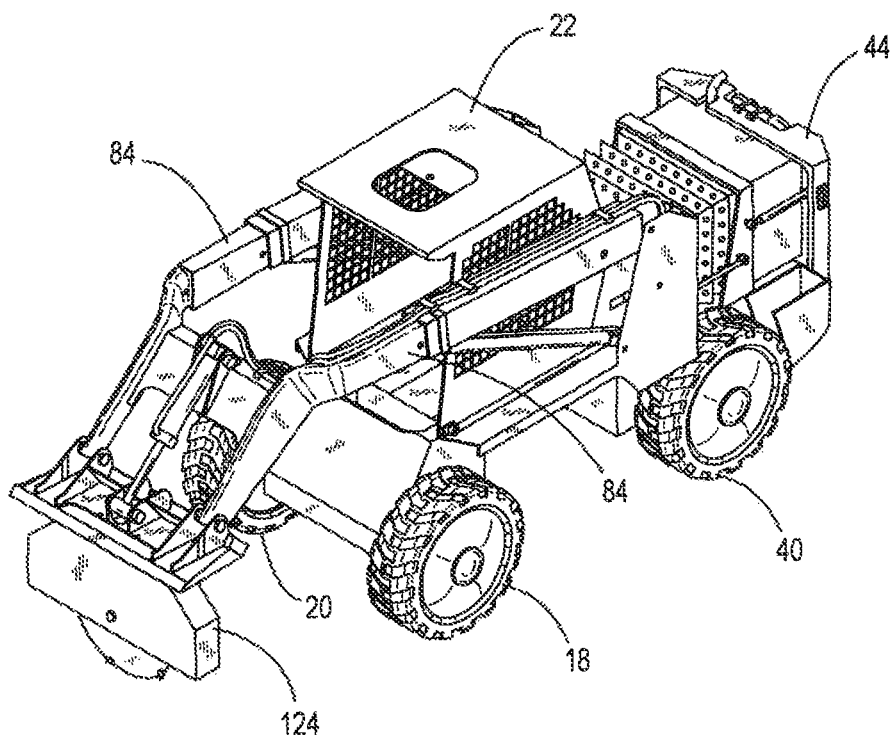

FIG. 25 shows a stump grinder attachment 124. The stump grinder 124 allows for fast and efficient removal of tree stumps and the like. Extended wheelbase configurations and extendable arms 84 are particularly useful for utilizing this attachment arrangement as even difficult to access stumps can be located, reached, and removed. Because of the extended disposition of the lift arms, a significant distance is present between the operator and the cutting surface of the implement. Having such an arrangement provides additional safety to the operator compared to may past designs.

Figure 26:
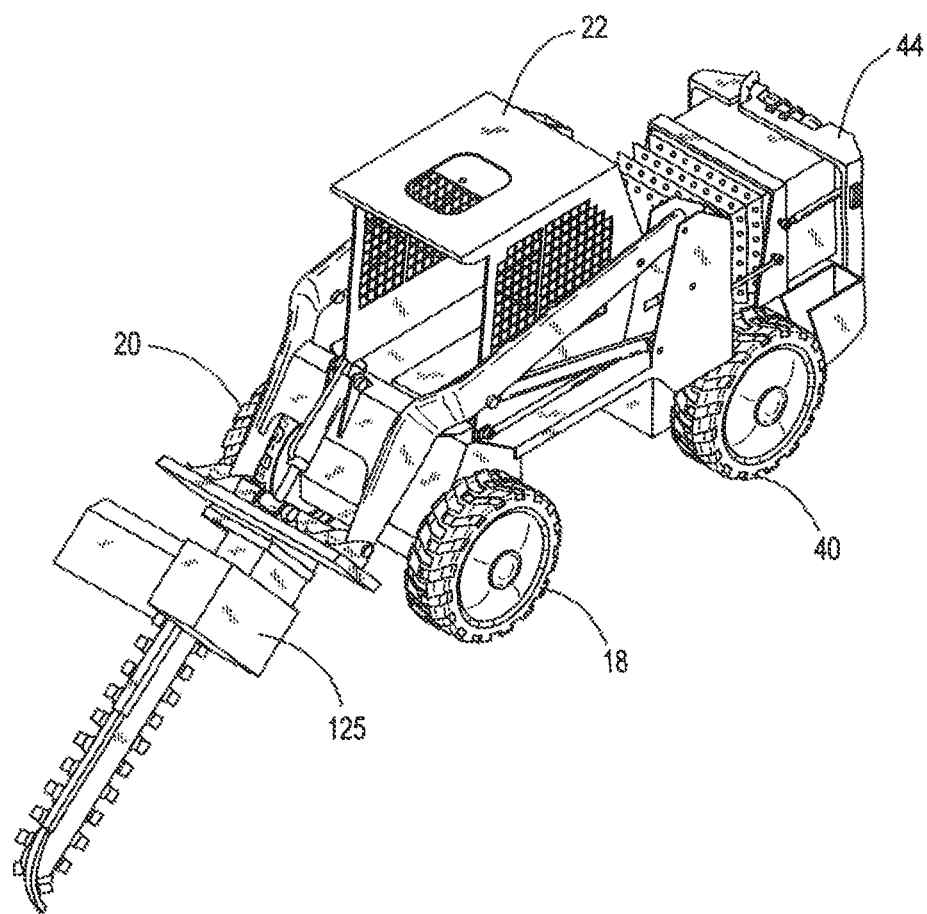
Figure 27:
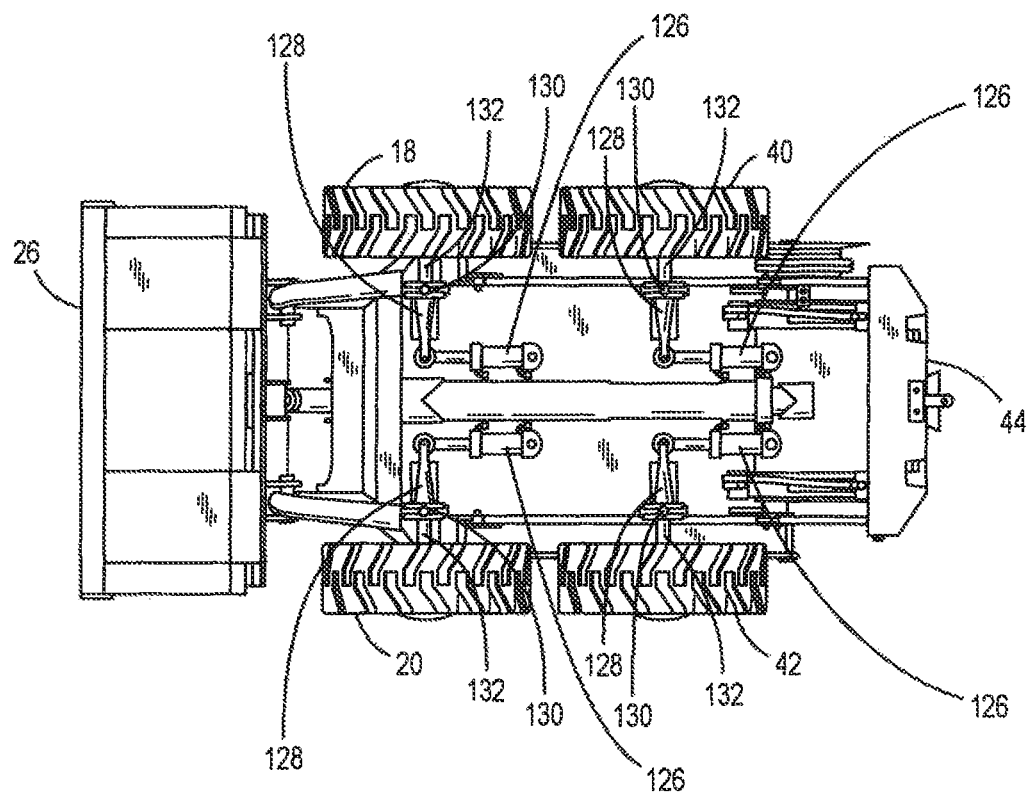
FIG. 27 is a bottom view showing the one method of the steering system layout of the work vehicle in a retracted position.

FIG. 26 shows a trencher attachment 126. The trencher attachment 126 provides an enhanced tool for trench digging. This trencher providing a large amount of control and stability to trench close to buildings, curbs, or other objects, particularly when the expanded wheelbase features are utilized. Here, the trencher arrangement provides the user with additional safety due to the operator location far from the potentially dangerous trenching portion of the implement FIGS. 27-31 discloses one of the steering components methods for the work vehicle in five different steering modes from a bottom view. Obstructing housing features and other components have been largely removed for clarity. In FIG. 27, the work vehicle is shown in its retracted configuration in which a skid steer mode of steering is typically most appropriate. This steering mode may be utilized in the same way a standard skid steer vehicle would operate. Here, the wheels do not themselves turn, but the vehicle is capable of being steered by changing the amount of power applied to the drive member associated with each particular wheel. This causes the wheels on either the right or left side of the vehicle to be turned more quickly or slowly than the opposing wheels. Therefore, the actuators 126 shown in FIG. 27 are locked in place and do not permit the wheels themselves to pivot. There are many benefits to using this skid steer mode and design. Specifically, this mode in some applications is extremely useful when enhanced speed, control, and maneuverability is desired. The narrow wheelbase and ability to turn in its own tracks using this type of steering allows the vehicle to rapidly maneuver around work sites.

In some cases, it may also be desirable to utilize steering modes other than the skid steer mode even when the vehicle is in the retracted configuration. While the following discussion does not specifically mention using additional steering modes when in the retracted configuration, the teachings of the other modes of steering may be applied to the retracted configuration in some cases as well.

Generally, deployment of the primary extension necessitates additional steering beyond the typical skid steer controls to achieve the maneuverability desired. FIGS. 28-31 all show alternative steering modes for the work vehicle when the primary extension is deployed with an extended wheelbase. A steering mode other than a typical skid steer steering mode is typically desired because once the vehicle is extended, a longer wheelbase will not allow for tight turns if the wheels are locked in place.

Figure 28:
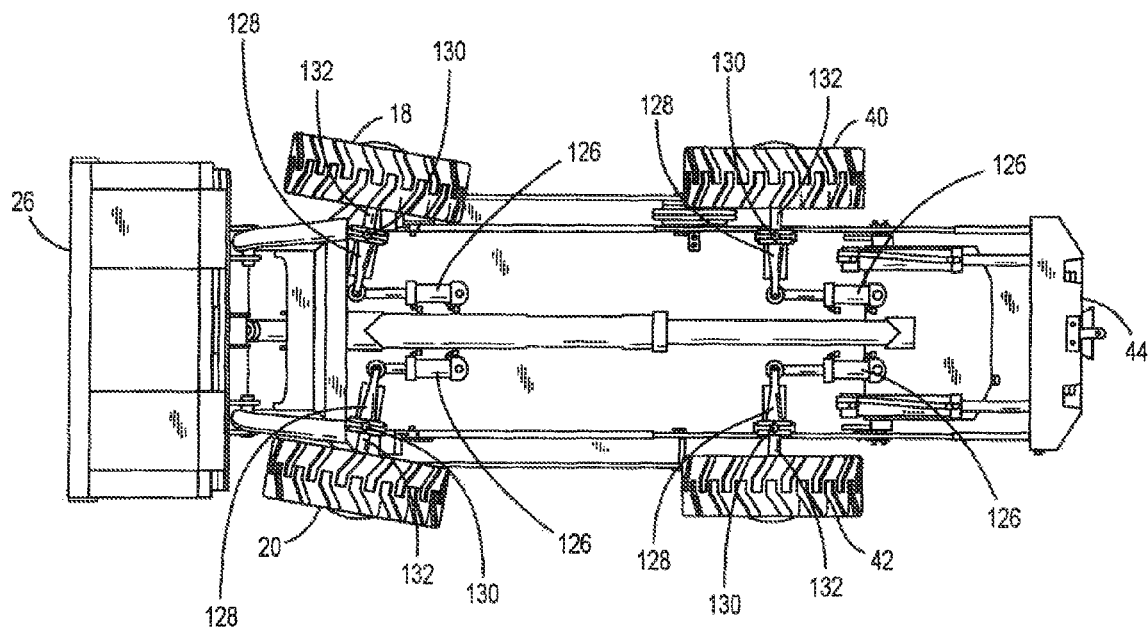
FIG. 28 is a bottom view of the one method of the steering system layout of the work vehicle depicting front wheel steering and the wheelbase extended.

In FIG. 28, a front steering mode is disclosed. In front wheel steering the rear set of wheels 40 and 42 do not turn, rather the front set of wheels 18 and 20 turn to guide the vehicle as desired. The steering components include four hydraulic actuators 126. Each actuator 126 corresponds to one of the four wheels 18, 20, 40, or 42. The movement of these actuators is governed by a vehicle controller 142 and a valve network which regulates the hydraulic pressure provided to each individual actuator. In front wheel steering, the hydraulic actuators 126 are pivotally coupled to steering arms 128. Each of the steering arms 128 pivots on a lynch pin 130 and controls the rotation of the wheel axle 132 for each individual wheel. Therefore, because each hydraulic actuator 126 is independently controlled, each wheel may be independently controlled with the steering linkages described. In the front steering linkage shown in FIG. 28, the actuators 126 governing movement of the wheels 18 and 20 are supplied hydraulic power to direct steering and the rear wheels 40 and 42 are held in placed by their corresponding actuators 126.

The front wheel steering mode may be selected on a control panel in cab 22 by an operator. In this mode, the front wheel axles may be turned in response to a command from a joystick in the operator's cab 22. In front wheel steering mode, the position of the rear axles is monitored continually and fine adjustments are made by the system to ensure the wheels are kept straight. An operator may switch to this position at any time in the field and the rear set of wheels will straighten up automatically regardless of the position of the front set of wheels.

Front wheel drive steering has numerous advantages for a variety of work related tasks. This steering mode might typically be used in landscaping type projects or when the vehicle is being used to haul a trailer. For example, one can connect a rake to the front of the vehicle and a seeder to the back of the vehicle so that as the vehicle moves, the rake prepares the soil for seeding and the seeder lays down the seed.

Figure 29:
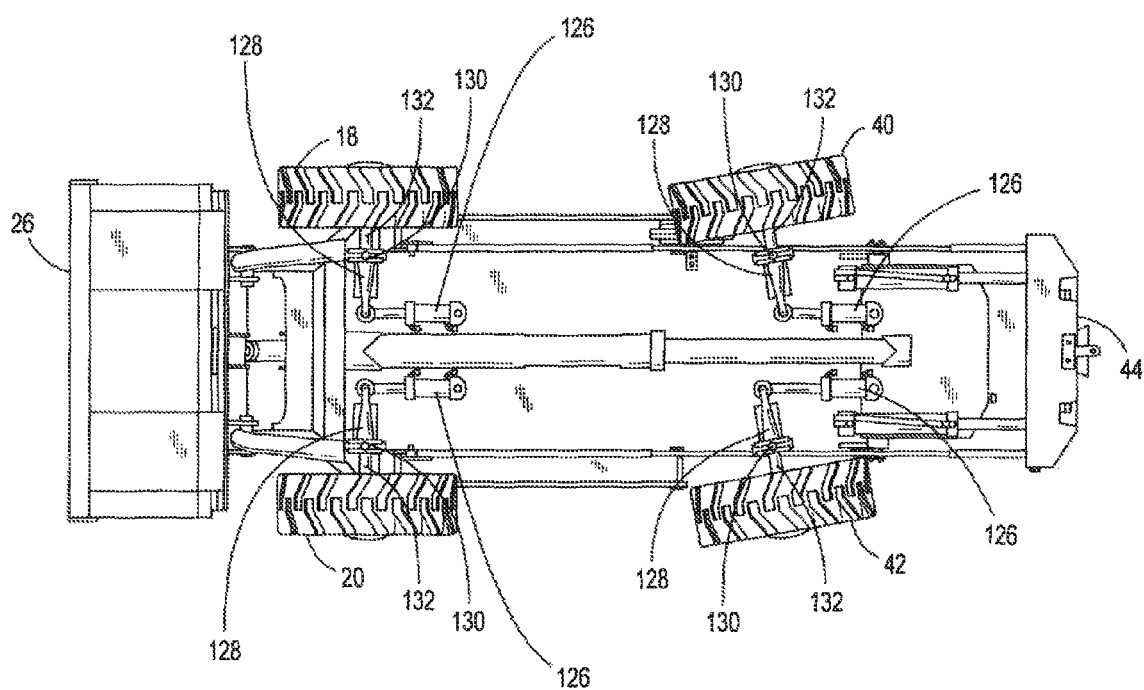
FIG. 29 is a bottom view of the steering system layout of the work vehicle showing rear wheel steering and the wheelbase extended.

In FIG. 29, the work vehicle is seen in a rear vehicle steer mode. In rear wheel steering, the front wheels 18 and 20 do not turn but the rear wheels 40 and 42 do turn to permit steering of the vehicle. In this case, the actuators 126 corresponding to rear wheels 40 and 42 are utilized. Operator or sensor controls utilize the system controller and corresponding valves to direct hydraulic fluid to be supplied for the desired movement of the wheel actuators. These controls also prevent movement of the actuators 126 corresponding to wheels 18 and 20. In rear wheel steering mode, the rear wheels 40 and 42 can be steered manually and independently of the front ones. When the work vehicle is in this mode, a manual steering control can be utilized to steer the rear wheels. This is useful for maneuvering in tight corners and may also be useful to offset the rear wheels slightly when working on steep side banks to help prevent the work vehicle from slipping downhill. One example where rear wheel steering might typically be used is where the vehicle is used to load or unload pallets from a truck or trailer.

Figure 30:
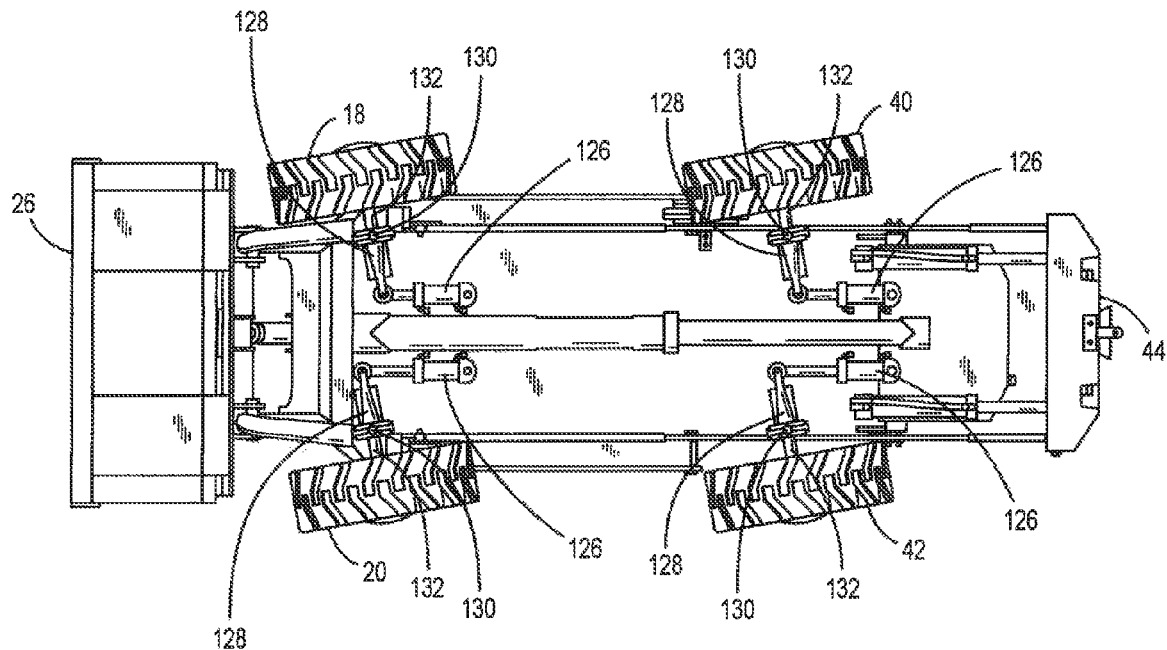
FIG. 30 is a bottom view of the steering system layout of the work vehicle illustrating crab steering and the wheelbase extended.

FIG. 30 is a bottom view of the work vehicle illustrating crab wheel steering. All the wheels are turned in the same direction to permit the vehicle to maneuver. Such maneuvering is effectuated by coordinating the operation of all four of the actuators 126 governing all four wheels. Directional steering is sometimes also referred to as sidle or crab steering, which allows the vehicle to move sideways. This type of steering may sometimes be useful to maneuver in buildings or in tight corners in fields. The rear wheels 40 and 42 are electronically monitored and positioned to synchronize with the front wheels 18 and 20. Such steering might also be useful when the vehicle is operating on finished grades and turf or newly poured concrete or asphalt so that the vehicle does not damage the surface on which it is operating.

Figure 31:
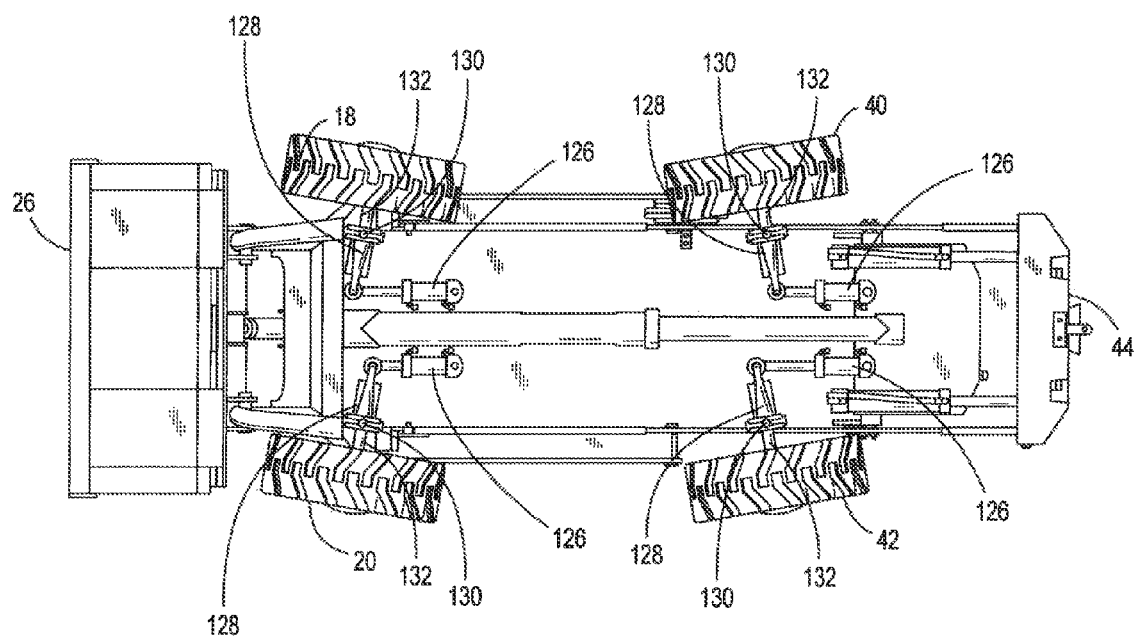
FIG. 31 is a bottom view of the steering system layout of the work vehicle using Bi Directional steering and the wheelbase extended.

FIG. 31 shows the work vehicle in a fifth steering mode, Bi Directional steering. In this mode, the front wheels are able to turn one way while the rear wheels turn the other way. As in crab steering, turning of the wheels is effectuated by coordinating the operation of all four actuators governing the movement of the four wheels. In Bi Directional steering mode (also referred to as all-wheel steering mode) the rear wheels will follow the front ones to provide the tightest turning circle possible. A method of controller/sensor recognition and easy push button adjustment between steering modes allows the wheels to align themselves automatically regardless of their current position. Because of the smooth turning of the four steerable axles 132, damage to turf or other surfaces is minimized, spillage of loose materials is reduced, and tire wear is lessened. These advantages can lower or even eliminate ground rework while extending tire life.

The controls for the Bi Directional steering mode synchronize the axles 132 of the front wheels 18 and 20 with the axles 132 of the rear wheels 40 and 42 to achieve the same steering angle when in Bi Directional steering mode. Further, the controller 142 coordinates the wheel axles to the center position and locks them in place when switching to this mode. In order to achieve synchronized steering by the actuators 126 at each wheel, electronic position feedback is provided at each wheel or actuator. Bi Directional steering is often useful in cases where heavy loads are being carried and the vehicle must be maneuvered in a tight location.

In general, the operation of the work vehicle of the present invention is governed by an elaborate hydraulic-electric assembly. The hydraulic-electric assembly includes a sensor-responsive microprocessor controller, a plurality of sensors, one or more hydraulic pumps, one or more hydraulic drive motors, and a valve network consisting of a plurality of hydraulic hoses, valves, and valve and pump sensors. The hydraulic-electric assembly combines a steering control system, drive control system, lift mechanism system, among other systems and components to provide a vehicle with extensive coordinated, sensor-responsive, and software driven capabilities.

Figure 32:
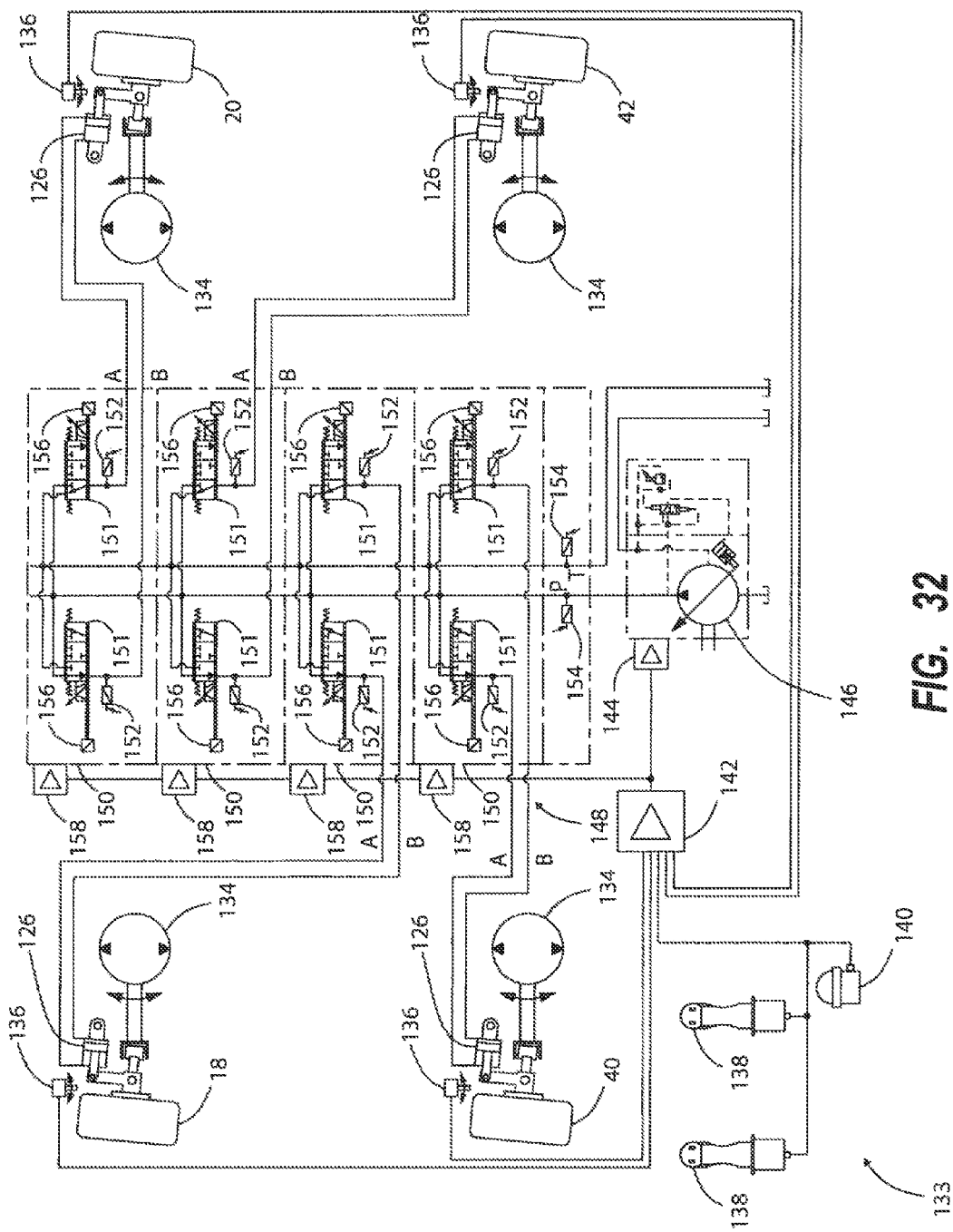
FIG. 32 is a schematic control diagram of a steering system for the work vehicle.

An overview of the steering control system 133 can be understood from the steering control diagram found in FIG. 32. In general, this system allows for independent steering of each wheel based on actuators controlled by electro-hydraulic control valves. In FIG. 32, wheels 18, 20, 40 and 42 are shown at four spaced locations. Each wheel is connected to a drive motor 134 and a hydraulic steering actuator 126, where the individual actuators are positioned to govern the steering of the individual wheels. A steering angle sensor 136 may be found adjacent to each wheel for detecting the position of each wheel.

Steering of the wheels is thereby implemented when signal inputs from the joysticks/manual controls 138 in the operator's cab, the steering angle sensors 136, and the GPS system 140 are sent to the sensor-responsive microprocessor controller 142. Software contained in controller 142 is able to determine the hydraulic pressure needed to coordinate the desired steering movement based upon the inputs. Controller 142 is connected to a pump pressure controller 144 governing the operation of the pump 146. The controller 142 is also connected to a CAN (Control Area Network) twin-spool valve assembly 148. This CAN twin-spool valve assembly 148 is part of the vehicle's overall valve network and is made up of a plurality of valve sections 150 each containing two spool valves 151. Each valve section 150 has a pressure transducer 152 at each working port and common P and T transducers 154. An LVDT transducer 156 provides position feedback for each spool. The spools are pilot operated and double acting. The pilot valve is a 40 HZ voice coil, low power, 3-position, 4-way proportional valve. An embedded high speed processor 158 is provided for each valve section 150. The spool position can be controlled to maintain flow or pressure within a closed-loop algorithm as the processors 158 know the spool position and the pressure differential across the spool.

Consequently, the steering system design utilizing the CAN twin-spool valve assembly as shown in FIG. 32 allows a user to independently and intelligently steer each of the four work vehicle wheels 18, 20, 40, and 42. The technology provided by such a design, when combined with the highly maneuverable work vehicle structure discussed thus far, enables a work vehicle with enormous potential and versatility for accomplishing construction and industrial tasks.

Figure 33:
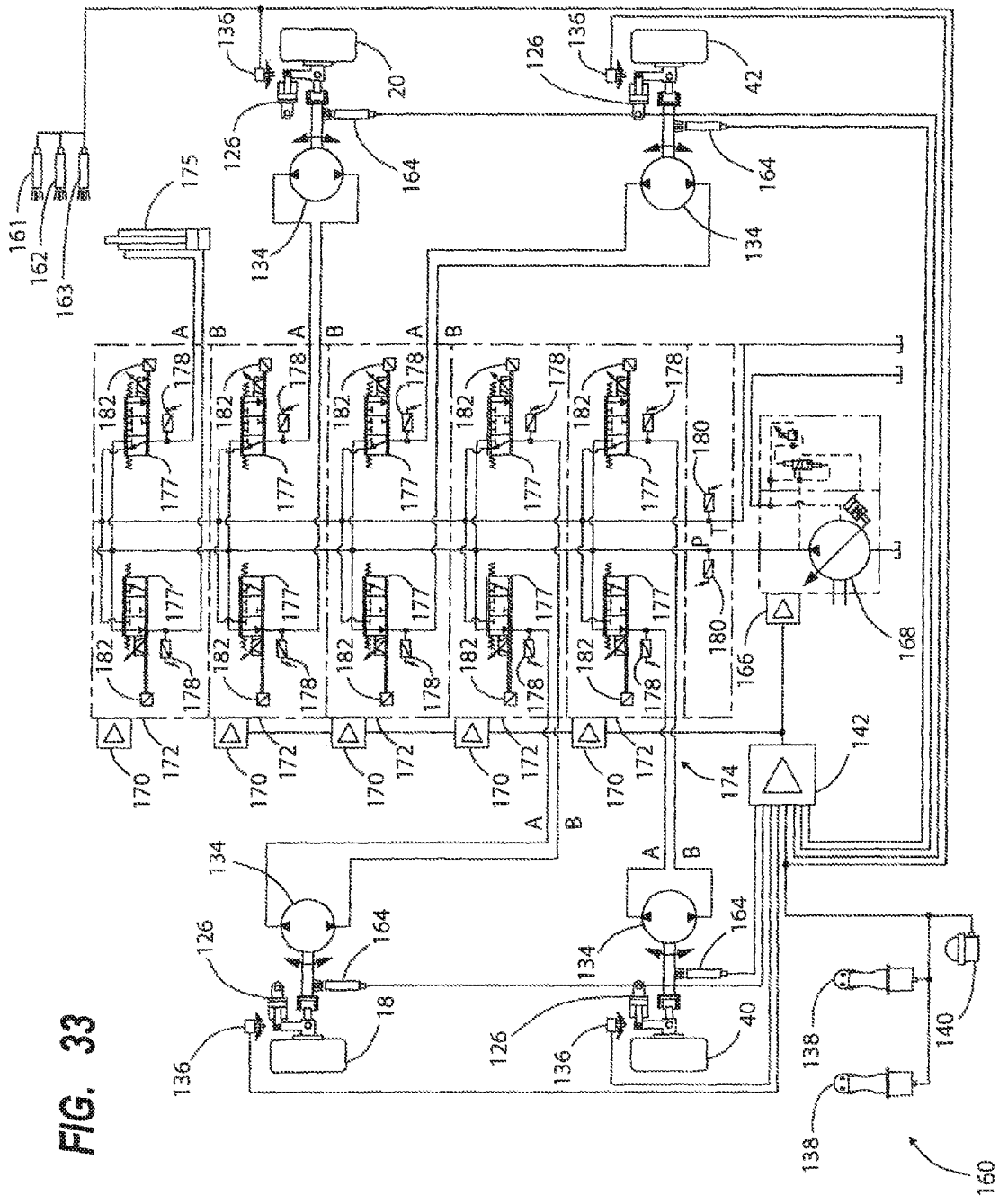
FIG. 33 is a schematic control diagram of a drive system and a frame extension system of the work vehicle.

A suitable motor drive system 160 for the work vehicle is set forth in FIG. 33. This system relies on mechanical valve devices with integral sensors, electronic controllers, and advanced software. The resulting design is a completely software driven electro-hydraulic system for controlling the vehicle drive.

The independent 4-wheel drive design includes four hydraulic drive motors 134 which control the corresponding respective wheels 18, 20, 40 and 42. For example, the motors may have a 12-15 cu.in./rev displacement size range and a two-speed motor option which allows the motor to be switched via an external operator command to a lower displacement. Ratios of 1.5:1 or 2:1 are typical. The two-speed design allows the machine to have high torque during its working mode and high speed during certain driving modes. The drive motors 134 are wheel motors where the tire hub or drive hub is mounted directly to the tapered shaft of the motor. As set forth in the schematic diagram of FIG. 33, these drive motors are hydraulically powered by a twin spool valve drive system.

A variety of input devices are present in the system for providing vehicle data to the sensor-responsive microprocessor controller 142. Motor speed sensors 164 are located adjacent to each of the drive motors 134 for measuring the speed of each wheel 18, 20, 40 and 42. Found adjacent to each wheel 18, 20, 40 and 42 are steering angle sensors 136 for detecting the wheel position. A GPS system 140 mounted to the vehicle cab 22 monitors overall vehicle position. Joysticks/manual controls 138 found in the operator's cab 22 dictate the desired steering mode, speed and direction of the motor drive. Additionally, frame proximity sensors 161, 162, and 163 send data verifying the location of the frame extension members.

Therefore, the drive system operates the drive motors 134 when input signals are sent to the drive system microprocessor controller 142 from joysticks/manual controls 138 in the operator cab 22, from the GPS system 140 on the vehicle, from the motor speed motion sensors 164 mounted adjacent each drive motor 134, from frame proximity sensors 161, 162, and 163 located on the frame extension cylinders, and from the steering position angle sensors 136 mounted adjacent each wheel. In doing this, the controller 142 monitors the speed, steering angle, and other factors present at each wheel. Once the operator selects the steering mode (skid-steer, Bi Directional drive, crab steer, front wheel, or rear wheel) and drive mode (all-wheel drive, front wheel drive, rear wheel drive) the controller 142 will load the appropriate software algorithm to perform the desired function.

The controller 122 next provides signals to both a pump pressure controller 166 that governs the function of pump 168 and the processors 170 contained on each valve section 172 of the CAN twin spool valve assembly 174 of the drive system. The controller 142 and its software also governs the movement of the primary and secondary extension cylinders 175. The extension cylinders 175 have their own valve sections 172 of the twin spool valve 174. It should also be noted that the pump 168 may preferably be the same pump for the vehicle pump 146 of the steering system.

As in the steering drive system 133, the CAN twin spool valve assembly 174 is made up of a plurality of valve sections 174 containing spool valves 177, a pressure transducer 178 at each working port, and common P and T transducers 180. Generally, the valve assembly 174 is part of the larger valve network for the work vehicle. An LVDT transducer 182 provides position feedback for each pilot operated and double acting spool of the valve assembly. The spool position can them be controlled to maintain flow or pressure within a closed-loop algorithm as the processors 170 know the spool position and pressure differential across the spool. Accordingly, the drive system design 160 uses the twin spool valve assembly 174 to provide intelligent drive for the four wheels of the work vehicle.

Each wheel controlled by the drive system 160 is independently driven and the hydraulic flow is accurately controlled. The vehicle can be programmed to steer through an arc with the outside wheels driving faster then the inside wheels in proportion to the turn radius. Even though each wheel is plumbed in parallel to each other, the closed loop control provides excellent traction control and will not allow one wheel to spin and rob power from the other wheels. In all-wheel drive mode, positive traction is maintained at all times. If a wheel is not in contact with the ground, the system will be able to sense this because the differential pressure across the drive motor 134 will approach zero. Because the twin spool valve can maintain constant closed loop flow, the motor will continue to rotate at the same speed as the other motors.

The frame extension feature is an important aspect of the work vehicle design of the present invention. As indicated, by extending the wheelbase via deployment of the primary extension member 70 and/or secondary extension member or counterweight 52, the operator can realize additional machine stability and lifting capacity. This frame may be extended when the vehicle is standing still, driving forward, or driving in reverse. Importantly, the software governing the frame extension features may preferably be written to recognize conditions in which it is undesirable or unsafe to execute the frame extension. Consequently, safety and machine integrity are maintained in frame extension/retraction operations.

When primary frame extension is selected and the vehicle is stationary, the microprocessor controller 142 delivers flow to the rear wheel drive motors and the rear wheel drive speed matches the cylinder driven frame extension speed. When the vehicle is traveling forward during frame extension, the controller 142 will reduce rear wheel drive speed to match the cylinder driven frame extension speed. When the vehicle is traveling in reverse, the controller will reduce front wheel drive speed to match the cylinder driven frame extension speed.

These operations are assisted by the cylinder position sensors 161, 162, and 163 which send cylinder position information to the controller 142. Sensor 161 is responsible for detecting the completely retracted position of the frame, sensor 162 senses the position of the secondary extension assembly 52, and sensor 163 senses the position of the primary extension 70.

In some embodiments, the frame extension telescoping actuator member 50 may be eliminated with the valve drive system. In such an embodiment, a hydraulically actuated frame lock mechanism can be used to keep the frame in the desired retracted or extended position. When extension or retraction is required, the lock can be released and the drive wheels driven as previously described.

Lift arms 24 of the extendable frame work vehicle also utilize electro-hydraulic valve technology and a sensor-responsive microprocessor controller 142. Generally, proportional type mobile directional control valves and low-effort electronic joysticks are used to control the lift arm and implement functions. The electro-hydraulic system controls leveling features such as bucket leveling devices using self level valves common in the industry. Other features governed by the system include extendable lift arms containing either a single stage extendable boom or a multiple stage extendable boom. (See FIG. 11)

Embodiments containing extendable boom devices contain at least one double acting cylinder installed in each of the right and left side lift arm structures 84. A valve system provides flow to each cylinder that is not only variable but also is equal in flow for synchronized movement. Upon joystick input command from the operator, each valve section is commanded in closed loop flow control mode to provide proportional flow to the joystick position. Valve performance defines the lead/lag of the cylinder travel.

Another embodiment utilizes a telescoping boom design. Telescopic cylinders used in these designs are constructed of consecutive sections of steel tubing with successively smaller diameter that nest inside one another. The largest diameter section is the main or barrel and the smaller-diameter sections that move are called stages. In the telescoping design shown in FIG. 11, section 90 is the barrel and sections 92 and 94 represent successive stages.

Generally the telescopic cylinders will extend from largest stage to the smallest. The largest stage, with the smaller stages nested inside, will move first and complete its stroke before movement of the next stage. This procedure repeats until the smallest diameter stage is fully extended. Conversely, the smallest diameter stage will retract fully before the next stage starts to move. This continues until all stages are nested back into the main.

The telescoping cylinders used in this design may be either single acting cylinders or double acting cylinders. Single-acting cylinders extend under hydraulic pressure and rely on gravity or some external mechanical force for retraction. Double acting telescopic cylinders are powered hydraulically in both directions.

Normally, extension of a double-acting telescoping cylinder occurs in the same manner as with the single-acting type. Retraction of double acting telescopic cylinders is made possible by sealing each moving stage's piston area outside diameter with the next larger stage's inside diameter and building internal oil-transfer holes into each moving stage. The retraction port normally is located in the top of the smallest stage. A double acting telescopic cylinder design might alternatively locate both fluid ports in the smallest stage or plunger.

Piston seals on double-acting telescopic cylinders are manufactured from a hard substance such as cast iron, ductile iron, or glass-reinforced nylon to limit abrasion between the oil transfer holes and ports over which they must pass. A telescoping cylinder of the type known as a constant-thrust/constant speed cylinder may be used as well. Typically, the double-acting cylinder will normally extend sequentially with the first stage extending fully and then the second stage extending. However, at low pressures (low loads), the telescopic cylinder may not extend in sequenced fashion.

Safety and automation features are an important aspect of the work vehicle design. Greater operator safety and vehicle stability are realized by the frame extension and the sensing capabilities. This vehicle continually sends a variety of feedback items about operating and loading conditions to the sensor-responsive microprocessor controller 142. Inputs include the bucket load, fork lift load, attachment weight, boom angle, boom extension, bucket/fork angle, vehicle angle (front to rear), vehicle angle (side to side), and attachment horsepower consumption. Therefore, automation is possible to control features such as auto bucket shake, load moment indication and movement limitation, fork lift horizontal movement, and line following.

The vehicle is enabled to sense a payload in the boom by measuring the pressure on the blind or barrel end port and rod port of the cylinder and to calculate the net force based upon the areas under pressure. The twin-spool proportional valve used in the work vehicle has pressure transducers built into each port. The transducers are available during actuation of the cylinders. A counterbalancing function is inherent in the programming of the valve, although a safety load holding valve and/or velocity fuse will be required for emergency. These valves do not interfere with normal cylinder operation and therefore, the boom lifting pressure is sensed by the valve's integral pressure transducer.

Figure 34:
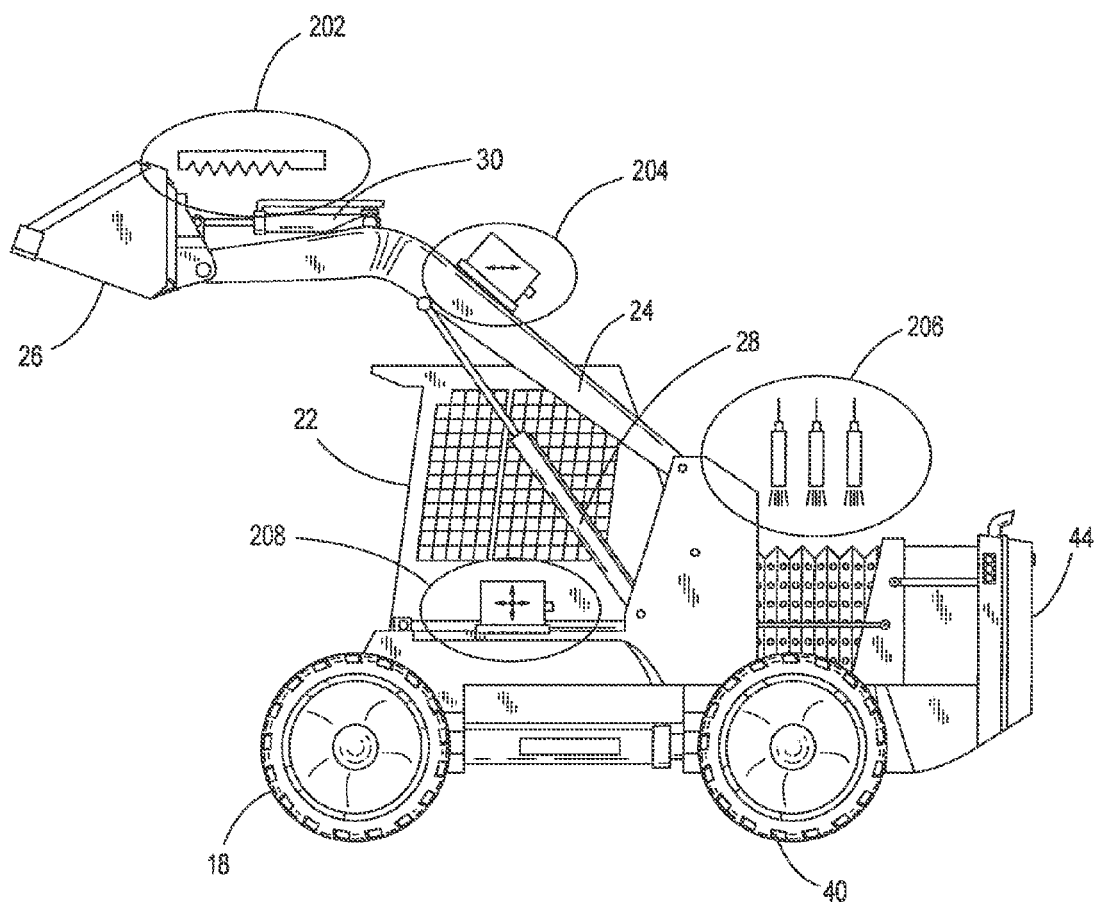
FIG. 34 is a schematic side view setting forth various sensors of the work vehicle.

As set forth in FIG. 34, a variety of sensors are available to measure angle, slope, and position related to lift arm operation. Locations for these sensors are selected to prevent damage or failure. Shown in FIG. 34 is a bucket cylinder position transducer 202 and a I-Axis boom inclinometer 204 which mount to the lift arms 24. Frame extension position sensors 206 are noted at the extendable portion of the vehicle, and a two-Axis chassis inclinometer 208 is shown adjacent the operator's cab 22.

Figure 35:
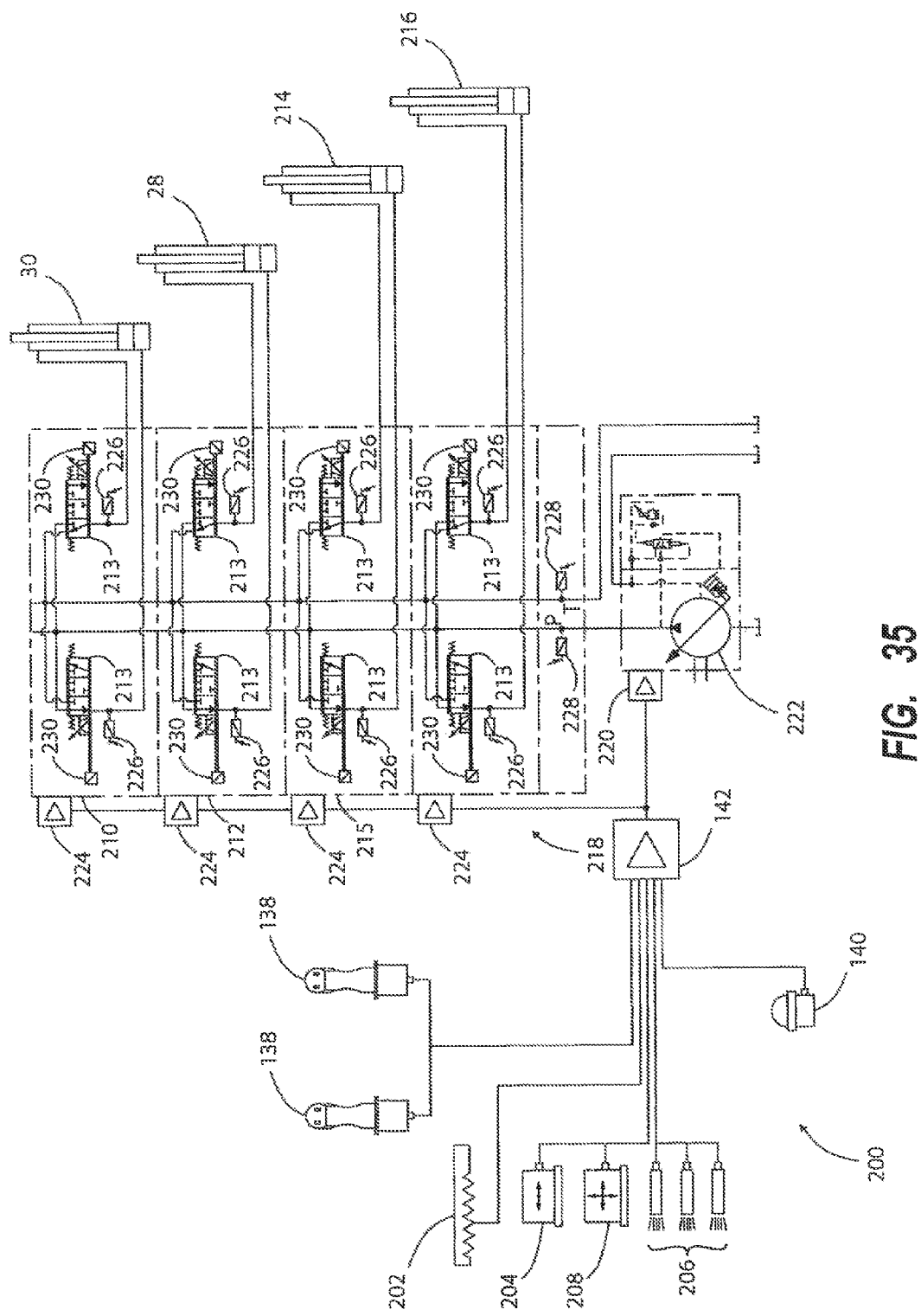
FIG. 35 is a schematic control diagram of a lift mechanism system of the work vehicle.

The overall operation of the lift arm system 200 can be understood from the schematic control diagram of FIG. 35. This lift arm system is part of the larger overall electro-hydraulic assembly of the vehicle. In this system, an actuator 30 controlling the implement tilt is connected to a first valve section 210. A second set of actuator cylinders 28 for raising the lift arms 24 is connected to a second valve section 212. Both valve sections 210 and 212 having a pair of spool valves 213. The remaining two actuator cylinders shown in the diagram, left boom cylinder 214 and right boom cylinder 216, control the extension of the extendable boom members. These cylinders are connected to a third valve portion 215 and are part of a closed loop flow control with matched flows for the right and left cylinders.

The lift arm system 200 therefore operates when inputs from the joystick/manual controls 138, bucket cylinder position transducer 202, single axis inclinometer boom mount 204, two-axis inclinometer chassis mount 208, frame extension position sensors 206, and GPS system 140 are sent to the sensor-responsive microprocessor controller 142. The controller 142 executes a software algorithm which provides the desired output signals to the twin spool valve assembly 218 and the rest of the vehicle's valve network. More specifically, the signals are sent to the pump pressure controller 220 that controls the pump 222 and the valve controllers 224 that control the function of the valve portions 210, 212, and 215. As in the previous drive and steering systems, the pump 222 may optionally represent the same pump or an additional pump to pumps 146 and 168.

Each valve has a pressure transducer 226 at each working port and common P and T pressure transducers 228. An LVDT linear transducer 230 provides position feedback for each pilot operated and double acting spool. The spool position can be controlled to maintain flow or pressure within a closed-loop algorithm since the valve controllers 224 know the spool position and the pressure across the spool. The independent meter-in and meter-out capability leverages integrated pressure and spool position sensor and on-board electronics. The on-board processing and deterministic control firmware facilitates high speed closed loop control. Closed loop flow meter-in or meter-out, close loop pressure, and a combination of pressure and override control can be used. Software driven hydraulic functions which are possible include electronic load sensing, electronic counterbalancing, flow sharing, electronic HP limiting and electronic pulsing (i.e. bucket shaking, etc).

To operate the new work vehicle in the various steering modes discussed in this application, right and left hand joysticks are provided. The operator's control panel in cab 22 is equipped with switches or "soft switches" on the interface screen. These soft switches allow for selection of the desired steering mode and allow for customized control modes for the right and left joysticks and pushbuttons.

Various joystick controls for the work vehicle systems are possible. For example, in an "H" pattern mode, the left joystick controls left side drive functions and lift functions, the right joystick controls right side drive functions and tilt functions. When the operator pushes forward on the left-hand joystick, all four wheels start to spin. If the joystick continues to be pushed forward and moved to the left, the work vehicle turns left. The vehicle does this by slowing down or stopping the two left wheels. The farther left the operator pushes the joystick, the slower the left wheels will move. The opposite is true when moving in reverse. If the operator pulls the stick all the way back, the work vehicle goes straight backwards, but it the operator then moves the joystick to the left, the right wheels or right track will slow down, causing the work vehicle to turn right. If the operator centers the joystick and then pushes it to the left, the left wheels will move backward and the right wheels or right track will move forward. This allows the work vehicle to turn around in the smallest possible area. The right hand joystick controls the loader arms and bucket. Pulling the joystick back raises the arms and pushing it forward lowers them. Moving the joystick to the left tilts the bucket up, and moving it to the right causes the bucket to dump. Auxiliary functions can be handled by joystick switches typically located on the right joystick.

An optional joystick "S" pattern can be selected. When in skid steer mode, the operator pushes the left joystick forward and the work vehicle will drive forward. When the operator pulls the joystick back the work vehicle will drive backwards. To turn left while driving forward, the operator pushes the joystick forward and to the left. To turn to the right, the joystick is pushed forward and to the right. To turn left while driving in reverse, the joystick is pulled back and to the left. To turn right in reverse, the joystick is pulled back and to the right.

Figure 36:
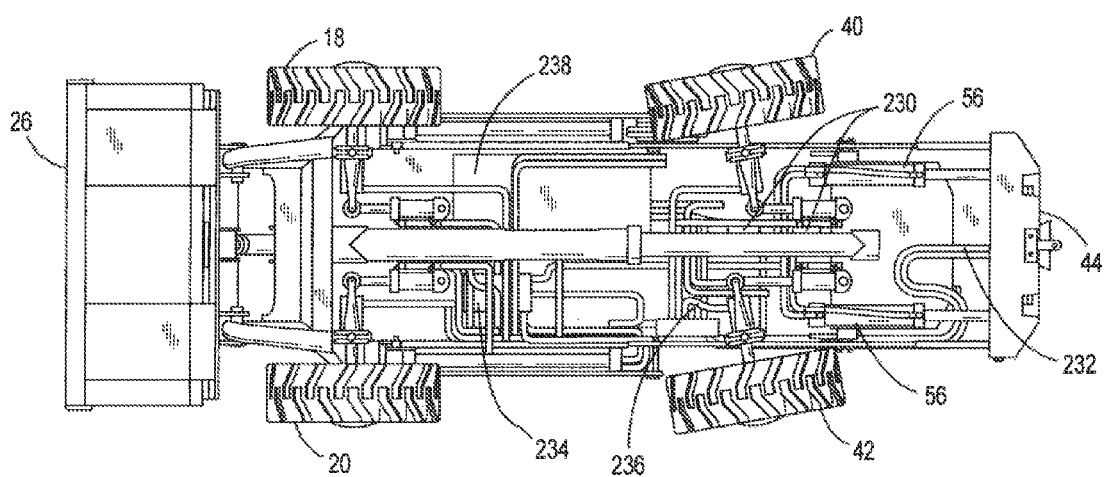
FIG. 36 is a bottom view showing parts of the electro-hydraulic layout of the work vehicle.
Figure 37:
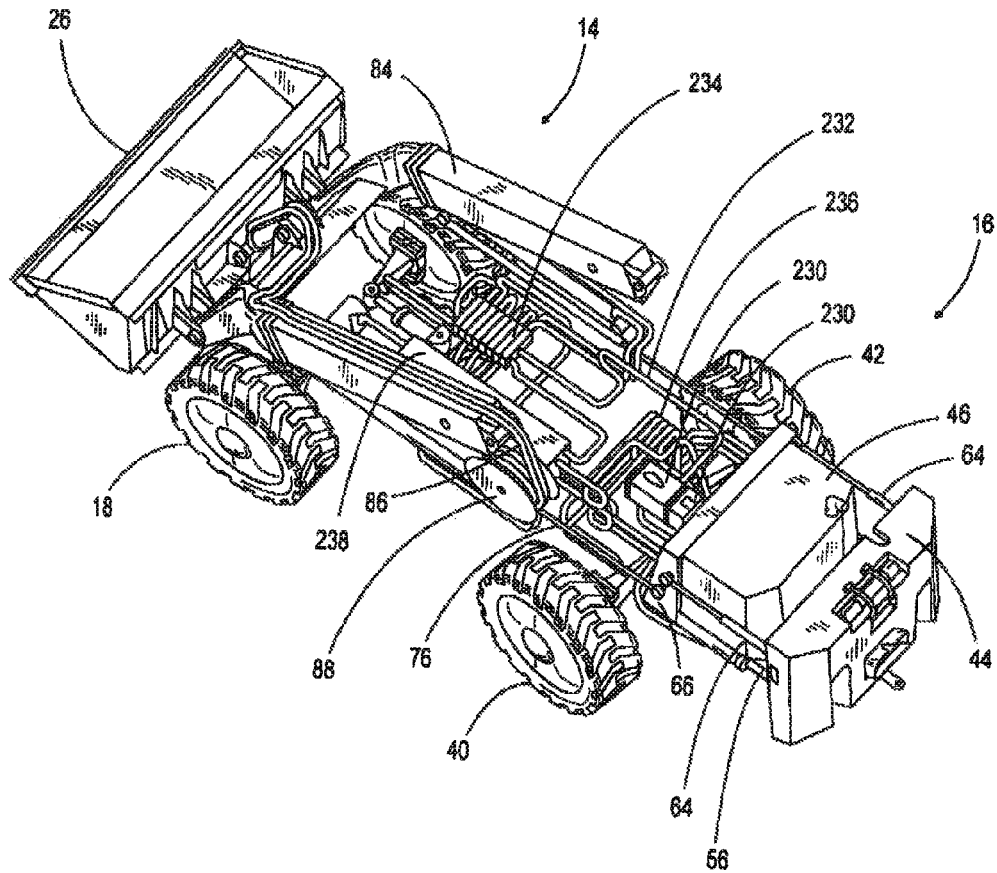
FIG. 37 is a perspective view illustrating parts of the electro-hydraulic layout of the work vehicle.

FIGS. 36-37 set forth partial views of the work vehicle which demonstrate one possible hydraulic layout of the work vehicle. Hydraulic pumps 230 are centrally shown located within the vehicle's rear portion 16, generally between the rear wheels 40 and 42. Pumps 230 collectively represent all the hydraulic pumps used in the various systems of the vehicle including pumps labeled 146, 168, 222, 532, and 590. These and potentially other hydraulic pumps referred to in this disclosure may comprise one single system pump or a plurality of pumps as the system requires. A network of hoses 232 connect these pumps to either a forward valve bank 234 or a rear valve bank 236. A series of hoses 232 also connect these valve banks to various hydraulic powered components throughout the vehicle. Some of these hoses are specially looped with plenty of additional length so as to accommodate primary and secondary extensions of the frame, lift arms, etc. A hydraulic reservoir 238 is located in the front portion of the vehicle and is responsible for providing fluid to run throughout the system.

Some components seen in FIG. 36 include the drum shaped mechanism 88 for supplying hydraulic lines 86 to extendable lift arms such as triple length lift arms 84. Also, one of the lower hydraulically extendable support members is partially shown. The connecting cylinders 64 and 76, which make extension possible, are shown on both sides of the vehicle.

FIGS. 38-45 disclose an embodiment with a leveling arrangement 400 and related capabilities of the work vehicle of the present invention. The work vehicle described in this application will often be required to operate in environments where rough terrain is present or where excavation and construction equipment have left behind ground surfaces having significant undulations. In a typical vehicle, this terrain would substantially undermine the stability and maneuverability of the vehicle because the vehicle's center of gravity may be drastically shifted when the vehicle wheels pass over the uneven ground. Operations involving the lift arms 24 and implements 26 mounted on the vehicle would not be possible in many instances. Further, a vehicle operator could not comfortably sit in an upright manner when traversing uneven ground.

The present invention overcomes the problem of uneven ground surfaces by providing the option of a leveling arrangement 400. In this leveling arrangement, the work vehicle utilizes an adjustable frame assembly consistent with the work vehicle disclosed thus far. Therefore, such an assembly can be described as generally including a first portion such as front portion 14 and a second portion such as rear portion 16 that extend and retract with respect to each other. Each of the first portion 14 and second portion 16 include a mounting member 402 in the leveling arrangement.

Associated with each the front and rear portions are support assemblies 404 and 406. Each support assembly 404 includes a transverse shaft member 408 pivotally coupled to the mounting member 402 of the respective portion at approximately the center of the transverse shaft member 408. In FIGS. 38-45 the transverse shaft member 408 can be seen extending across the width of the base of the vehicle. Further, at least one wheel is operatively coupled to each end of the transverse shaft member 408. Such operative coupling is generally a pivotal engagement between an individual axle 410 associated with each wheel and the transverse shaft member 408.

In addition to a hydraulic actuator, such as telescoping actuator member 50, that extends and retracts the first portion 14 and the second portion 16 of said frame, additional actuators are also associated with each support assembly 404 and 406. At least one hydraulic actuator 412 pivots the first portion with respect to the support assembly 404 associated with the first portion. Also, at least one actuator 412 also is responsible for pivoting the second portion with respect to the support assembly 406 associated with the rear portion.

Therefore, each of the transverse shaft members 408 is pivotally mounted to the work vehicle so that the ends of the transverse shaft members 408 and corresponding wheels may vary their height utilizing hydraulic actuators 412. An operator can accordingly manipulate the height of the transverse shaft members 408 to level the vehicle's cab and frame irrespective of the slope of the ground.

The vehicle's entire cab 22 and main body section is thereby enabled to remain upright and level throughout operation. This system accomplishes the leveling function with a two-axis frame mounted inclinometer 414 (not shown) and one or more hydraulic actuators 412. More specifically, the sensor-responsive microprocessor controller 142 is programmed to provide the closed loop position of the actuators so that the machine can be leveled using inclinometer feedback.

Figure 38:
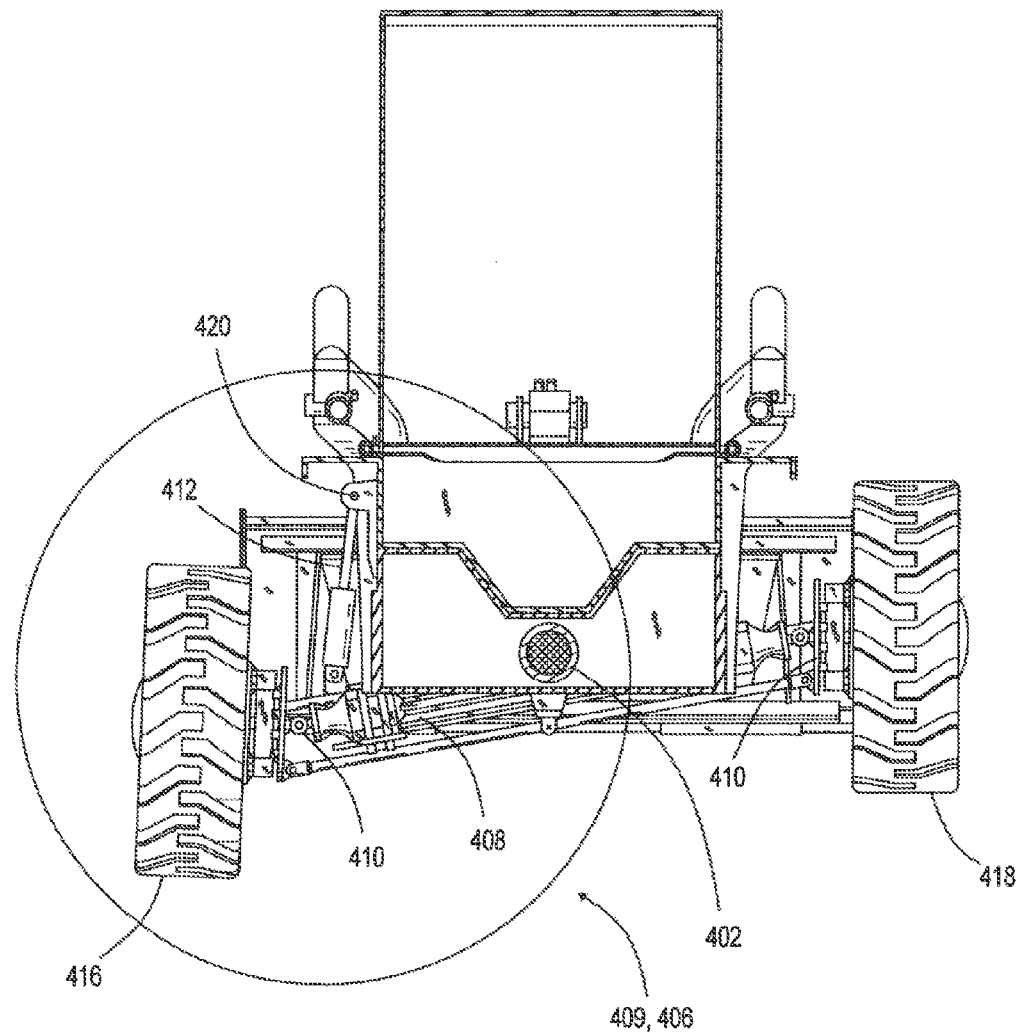
FIG. 38 is a view partly in section of a work vehicle load leveling apparatus.

FIG. 38 discloses a cross-sectional view through the vehicle where the rear wheels 416 and 418 and surrounding leveling apparatus is shown. The vehicle's left rear wheel 416 is significantly lower than the height of the right rear wheel 418. A slanted transverse shaft member 408 can be seen between the two wheels. The transverse shaft member 408 pivots around a center pivot point of the mounting member 402 at a lower center location. A single hydraulic actuator 412 is shown mounted to the side of the vehicle in a vertical orientation. The hydraulic actuator 412 extends from a fixed pivot location 420 on the side of the vehicle to a location on the side of the transverse shaft member 408 between the vehicle housing and the inside the wheel 416. While only one hydraulic actuator 412 is shown on this transverse shaft member 408, it is contemplated that the load leveling feature of this invention may also include a second hydraulic actuator mounted on the opposite side of the vehicle just inside wheel 418. In the case of multiple hydraulic actuators 412, these actuators would operate in a coordinated fashion to maximize vehicle stability and smooth movement of the wheels.

Figure 39:
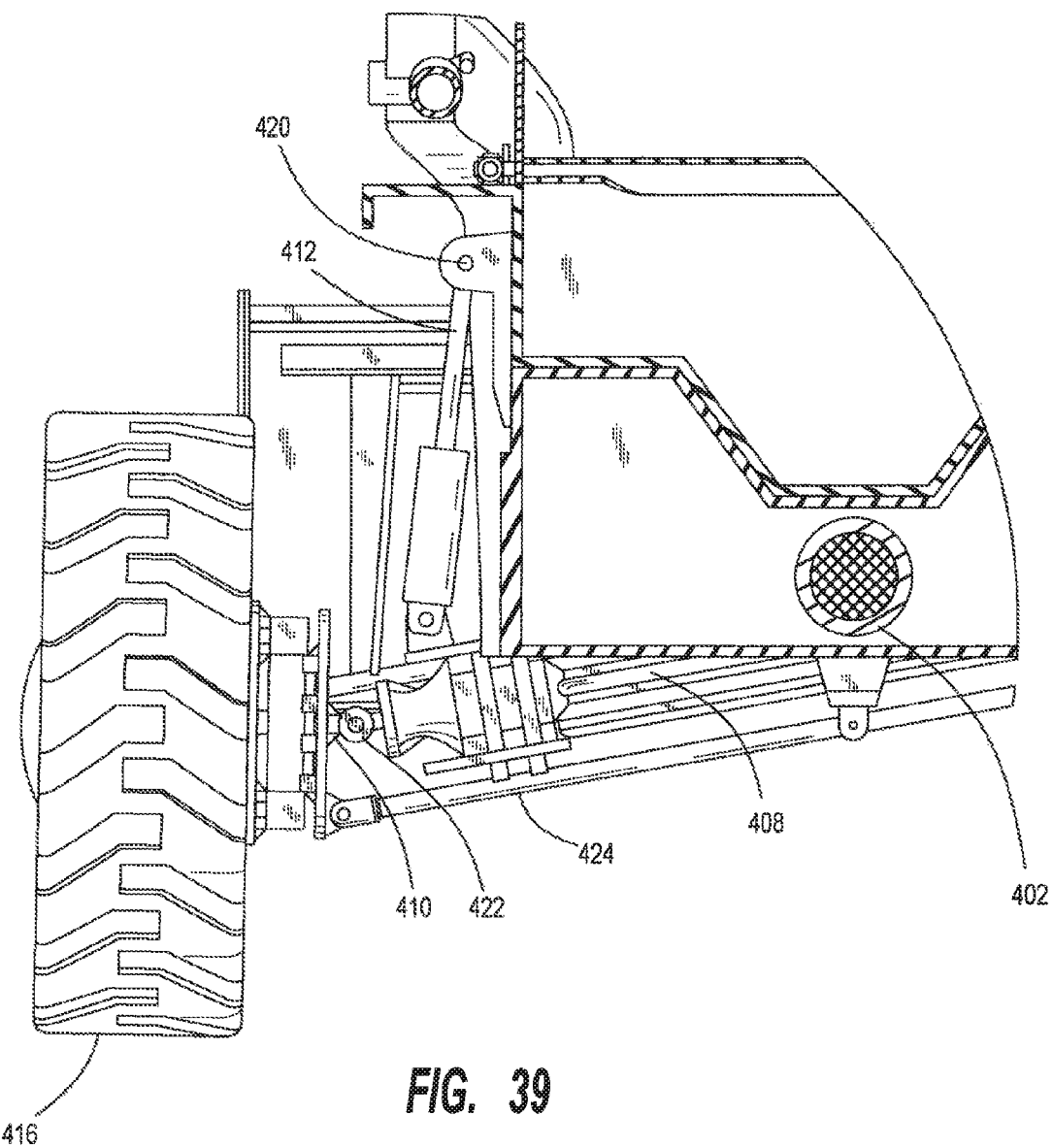
FIG. 39 is an enlarged fragmentary view of the circled, highlighted section of FIG. 38 showing parts of the work vehicle load leveling apparatus.

FIG. 39 shows a more detailed view of the load leveling arrangement surrounding wheel 416. Again, the hydraulic actuator 412 is in an extended configuration which pivots the transverse shaft member 408 around a center pivot point of the mounting member 402 of the vehicle. It can be seen that the wheel 416 is not rigidly mounted to the transverse shaft member 408 but rather the wheel axle 410 is pivotally engaged to the transverse shaft member 408 at pivot 422. This pivotal engagement not only allows for adjustment of the wheel for steering as mentioned previously, but also enables adjustment of the camber angle of the wheel. Adjustment of the camber angle of the vehicle wheel 416 is made possible by a camber link 424 and the rest of the associated linkage. The camber link 424 is found below the transverse shaft member 408 and enables camber angle adjustment by the vehicle operator. Similar arrangements can be found at each of the four vehicle wheels 416, 418, 426, and 428.

Figure 40:
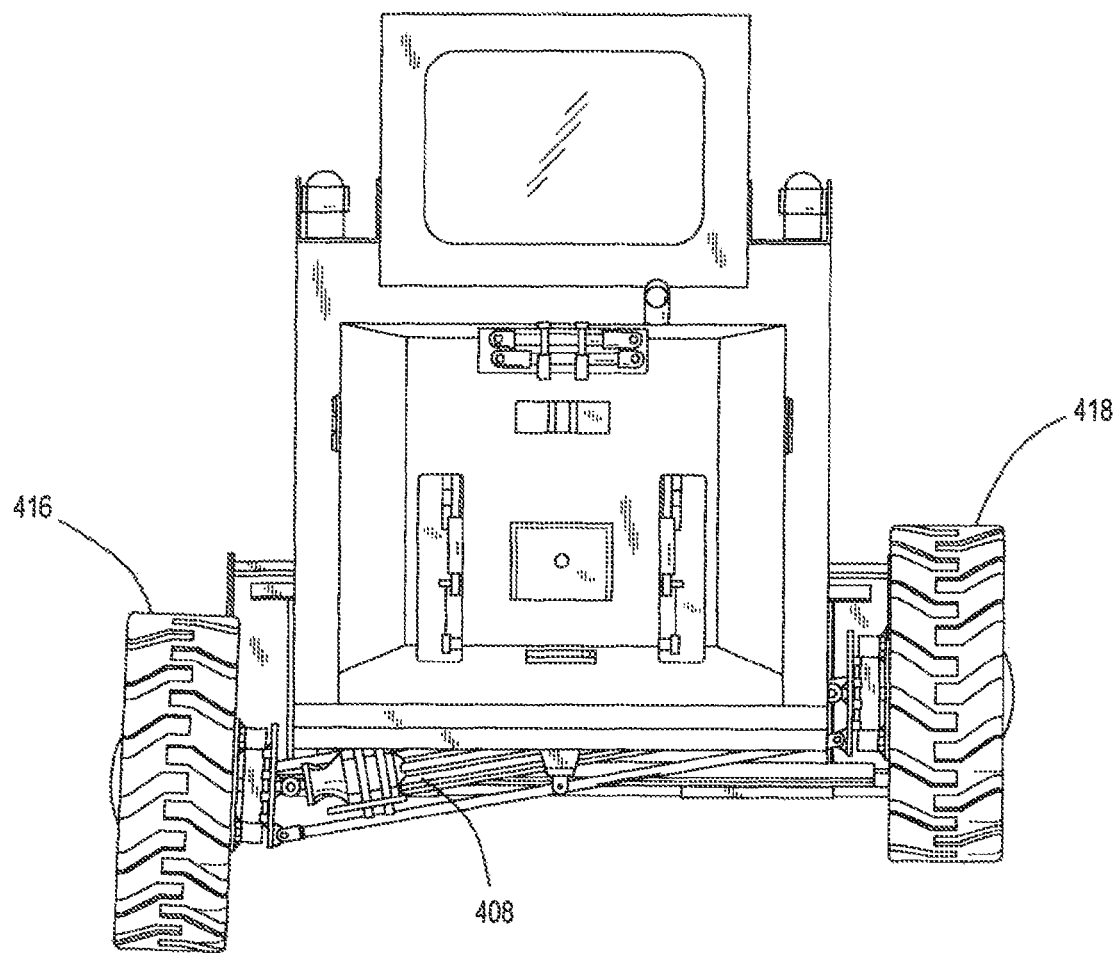
FIG. 40 is a rear view of the work vehicle showing the load leveling apparatus and terrain.
Figure 41:
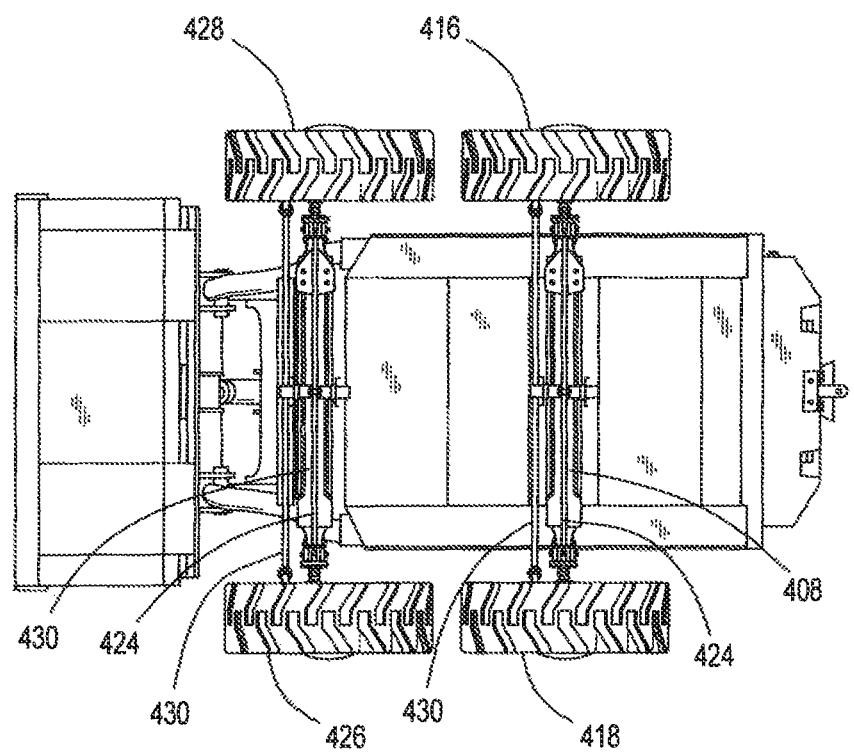
FIG. 41 is a bottom view of the work vehicle showing the load leveling apparatus.

FIG. 40 discloses a rear view of the work vehicle where the vehicle is making use of the load leveling features of the vehicle. The hydraulic actuator 412 is largely hidden in this view. FIG. 41 shows a bottom view of the work vehicle having a load leveling configuration. The general layout, transverse shaft member 408, mounting members 402, steering links 430 and camber links 424 are disclosed.

Figure 42:
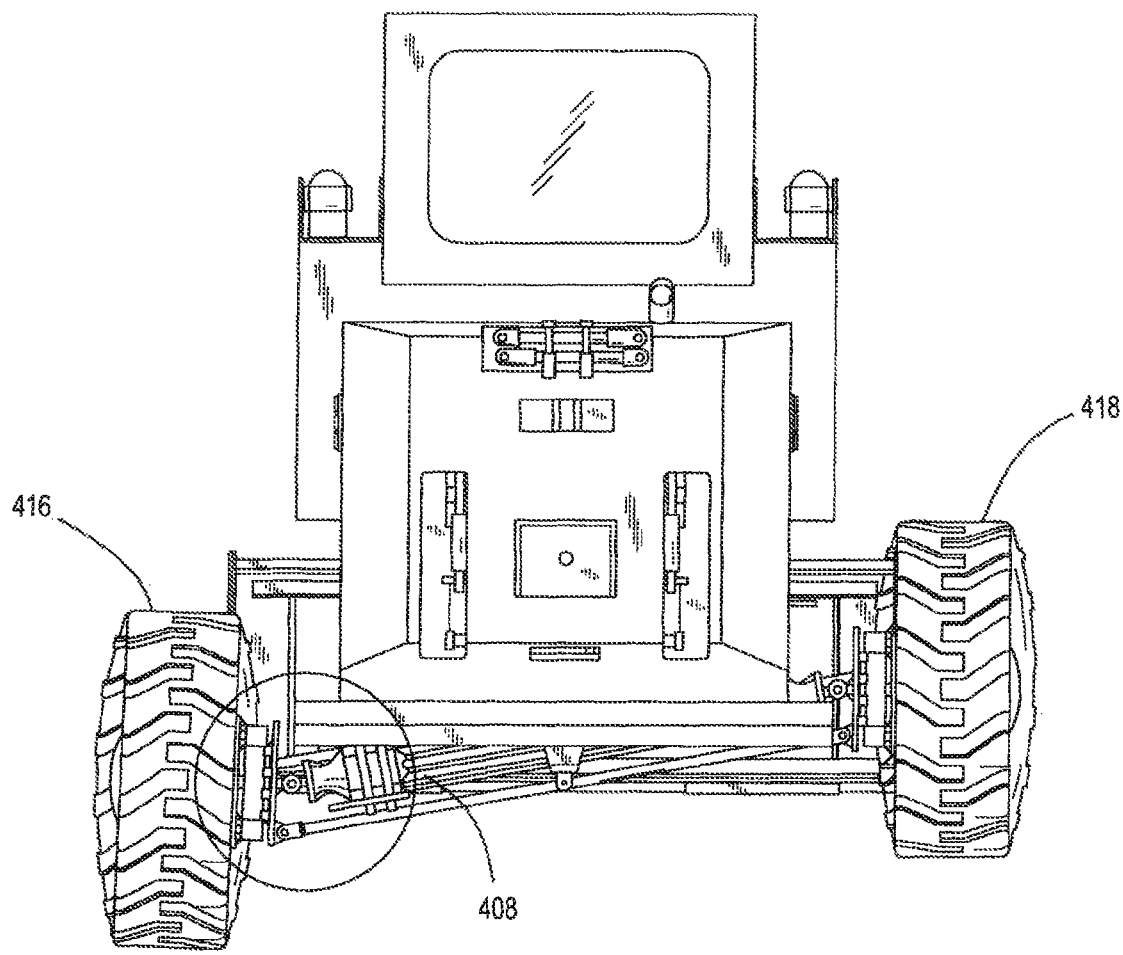
FIG. 42 is a rear view similar to FIG. 40 showing a highlighted, circled section of the work vehicle load leveling apparatus.
Figure 43:
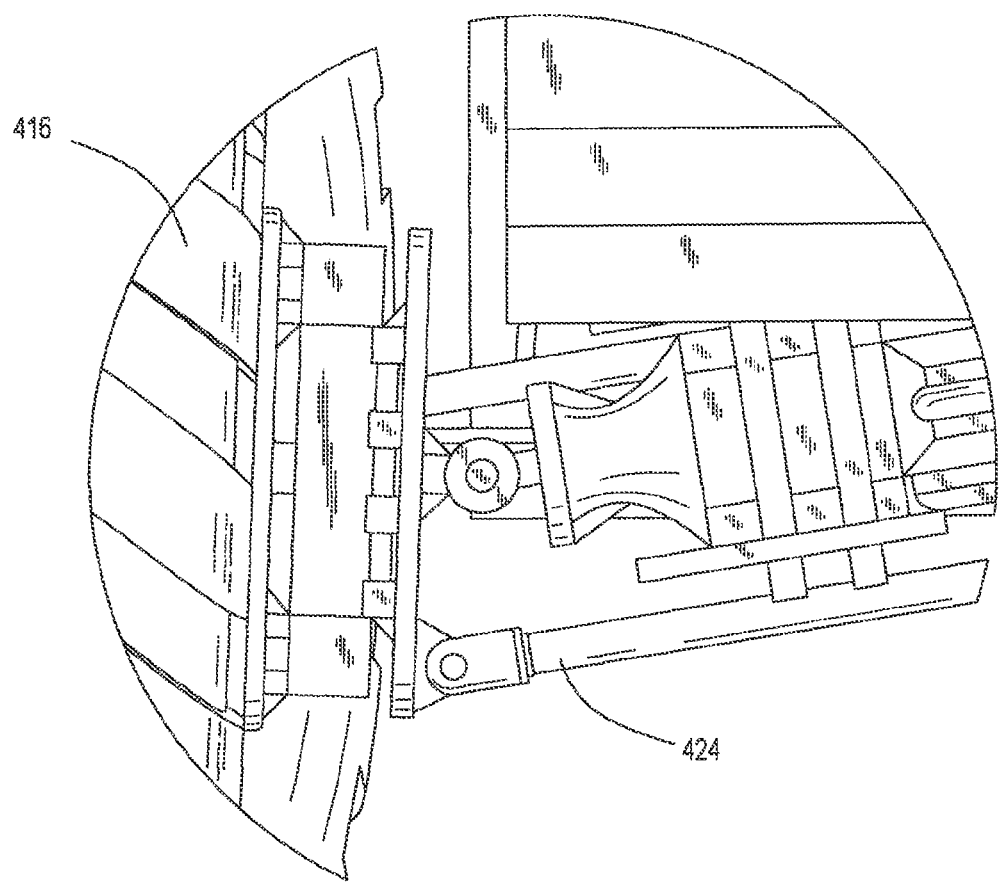
FIG. 43 is an enlarged fragmentary view of the highlighted section of FIG. 42.
Figure 44:
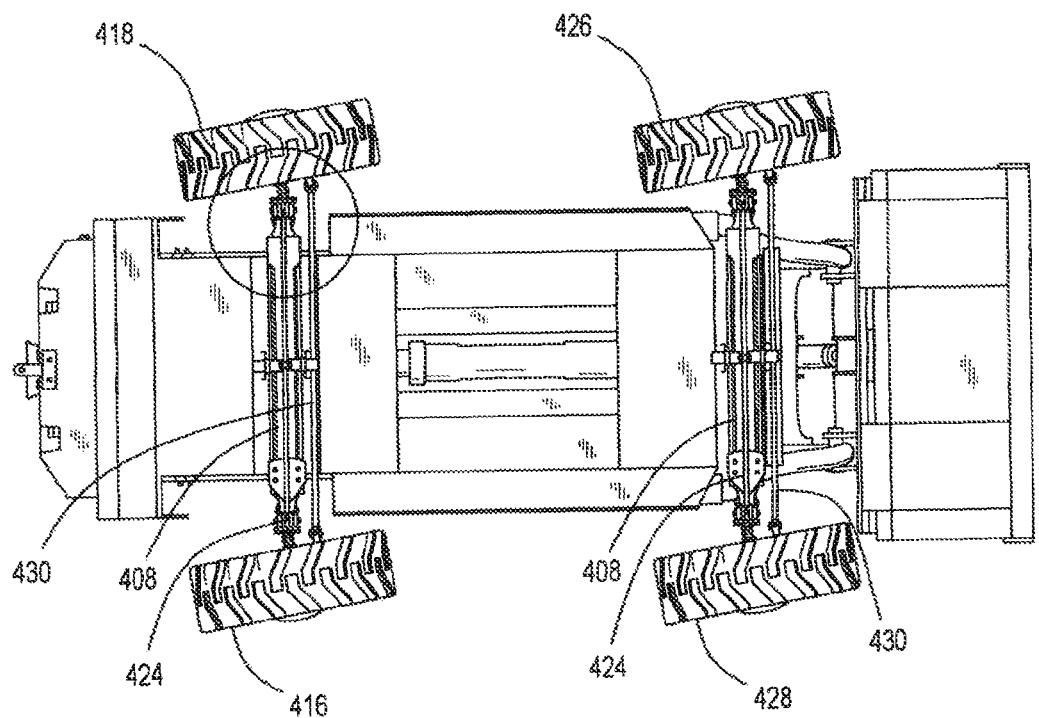
FIG. 44 is a bottom view of the work vehicle load leveling apparatus on a vehicle showing the frame extended.
Figure 45:
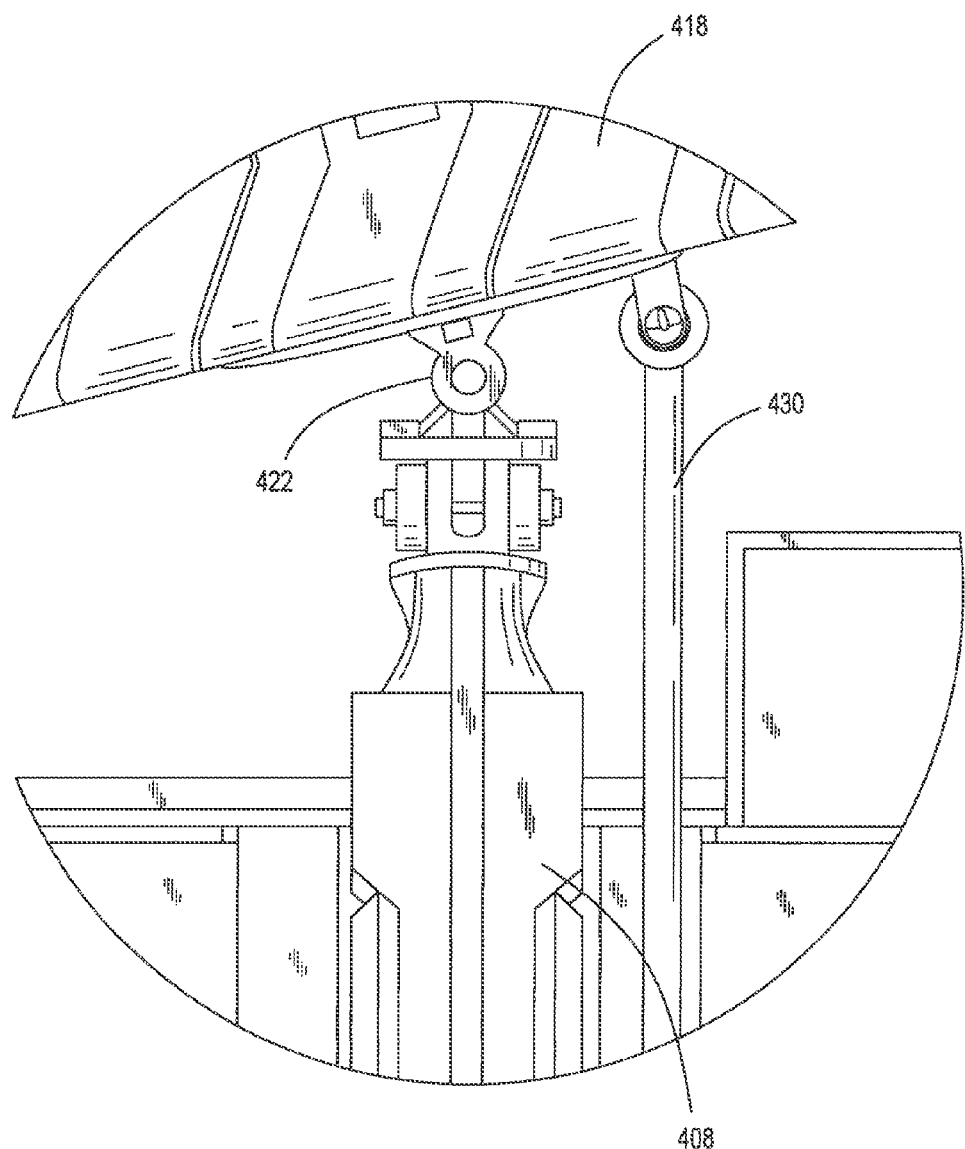
FIG. 45 is a greatly enlarged fragmentary view of the parts highlighted in FIG. 44.
Figure 46:
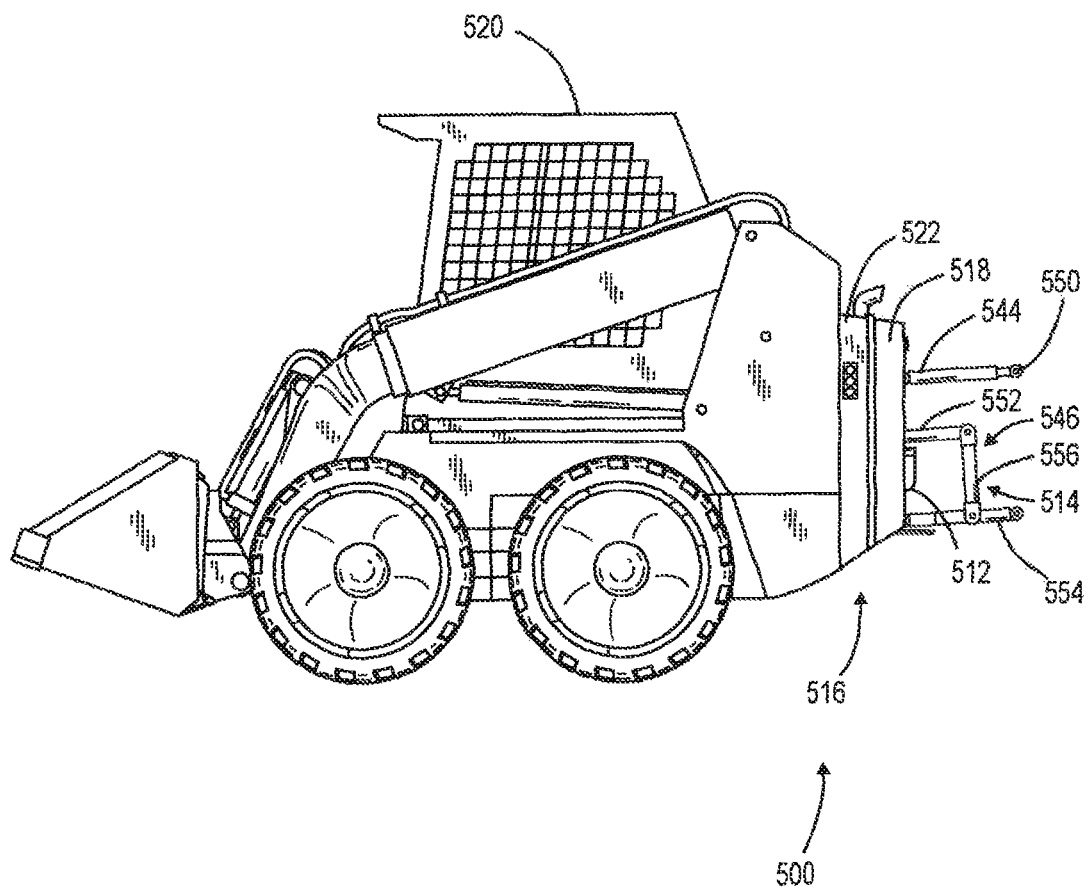
FIG. 46 is a side view of a three-point hitch and power take-off (PTO) on an extendable frame work vehicle of the present invention shown in a retracted configuration.
Figure 47:
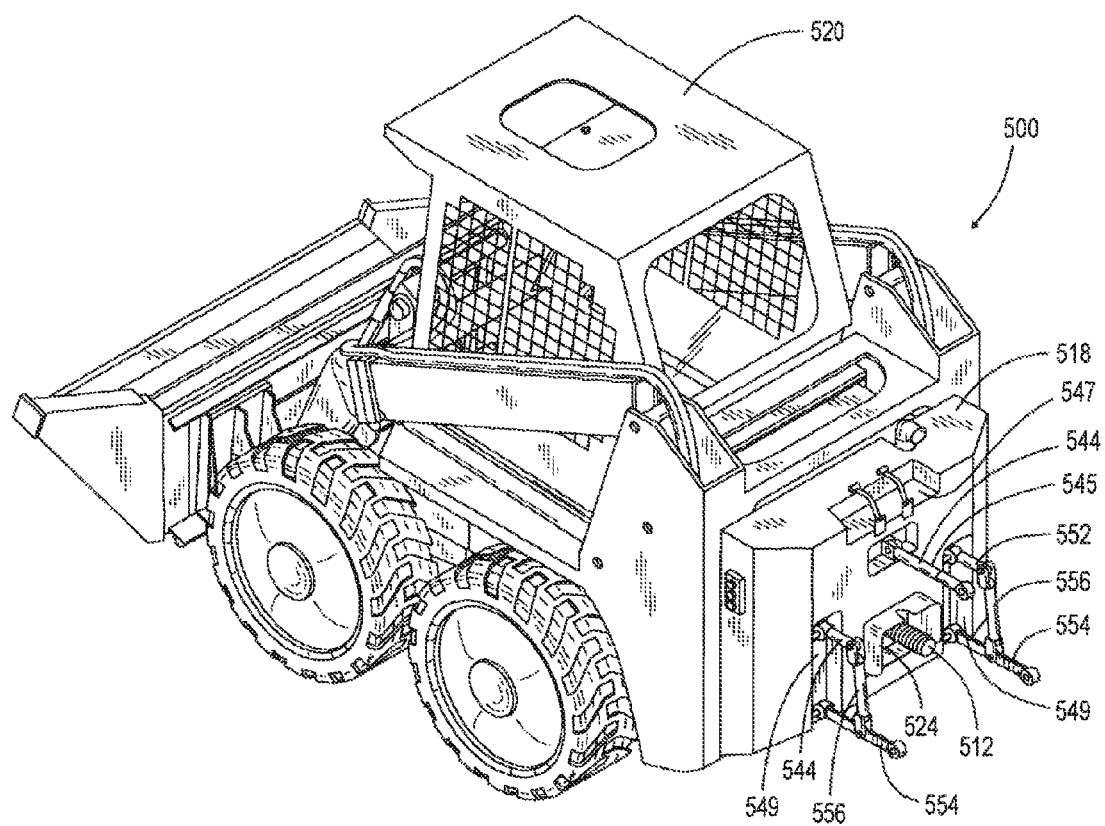
FIG. 47 is a perspective view showing the PTO and three-point hitch of the work vehicle.
Figure 48:
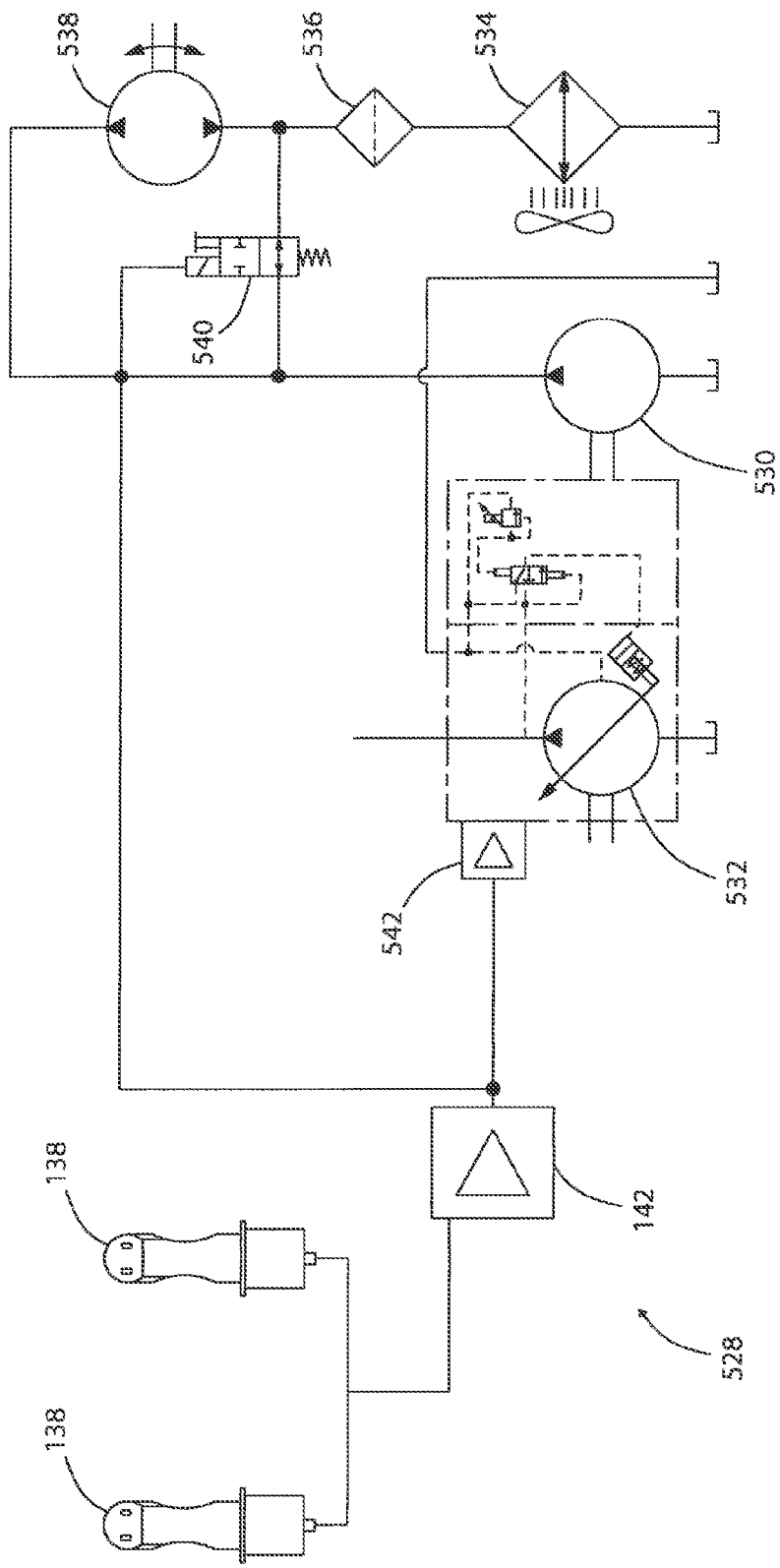
FIG. 48 is a schematic control diagram of a PTO system for the work vehicle.
Figure 49A:
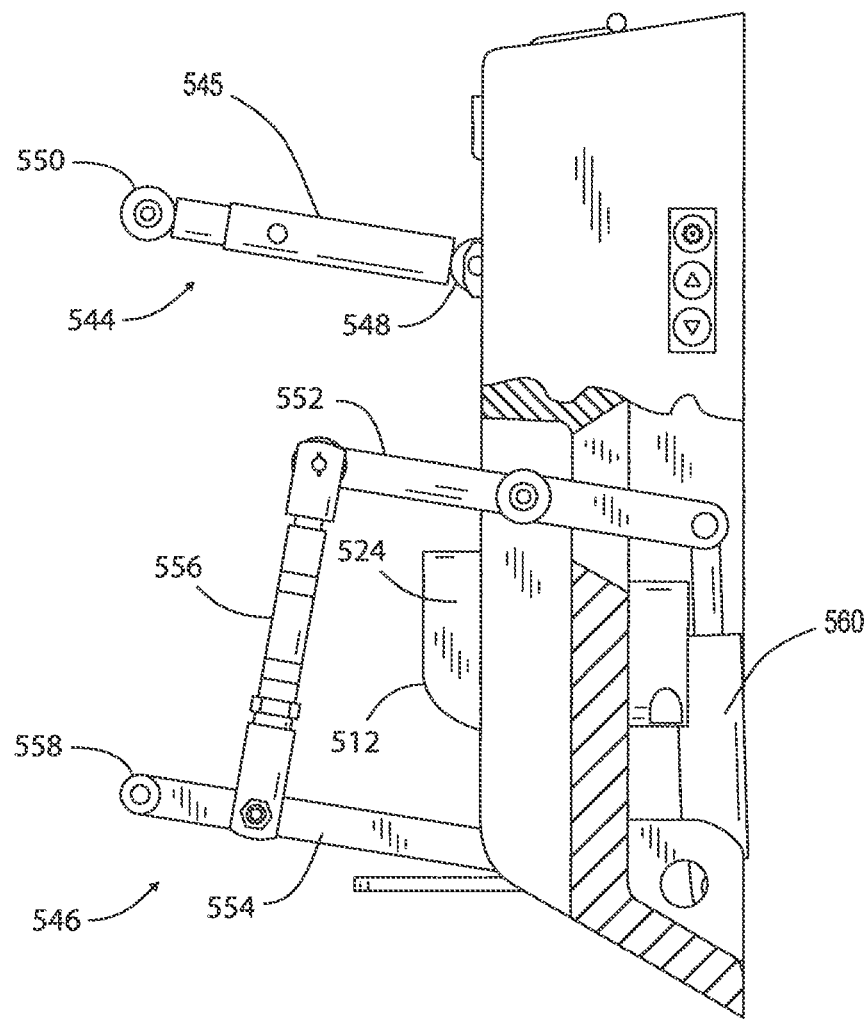
FIG. 49a is a partial cut-away side view of the three-point hitch and PTO of the work vehicle.
Figure 49B:
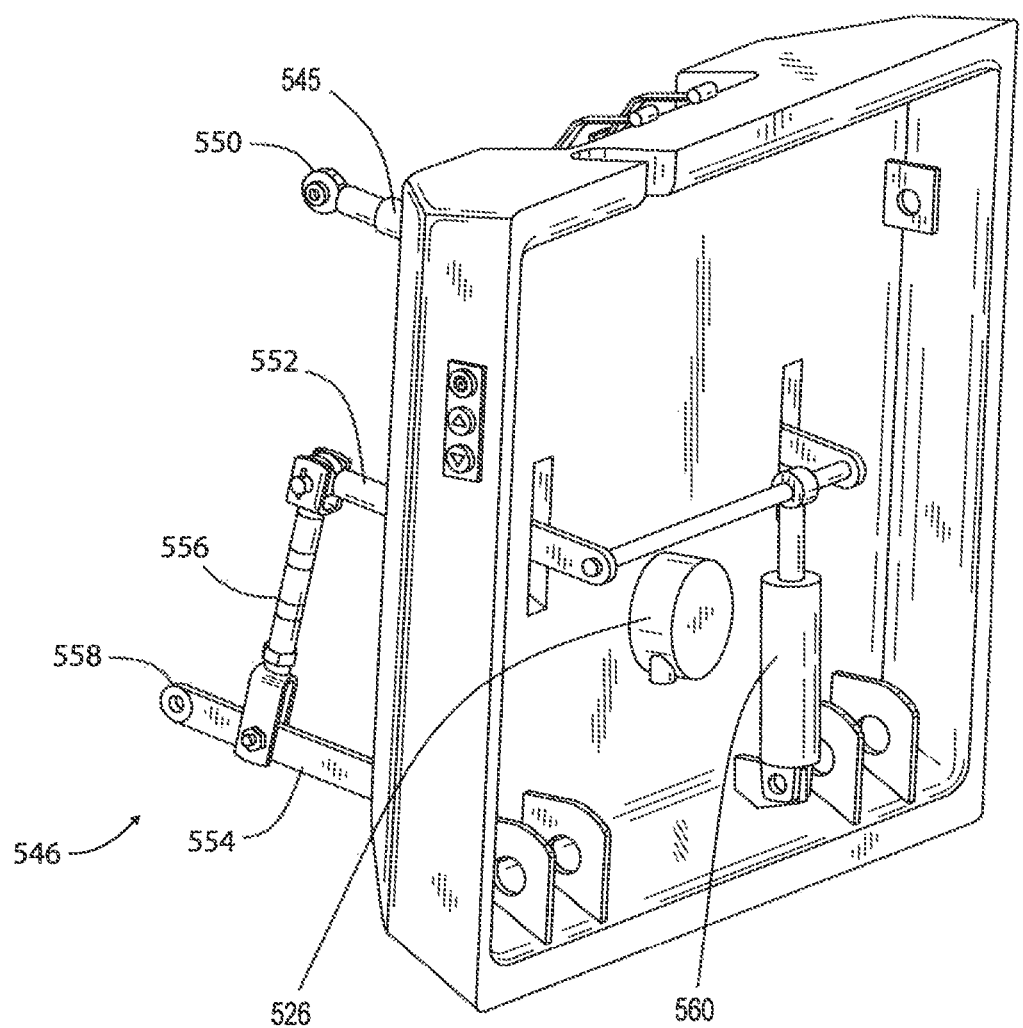
FIG. 49b is an isolated interior view of the three-point hitch and PTO assembly of the work vehicle.

FIGS. 42-45 set forth views of the work vehicle where its primary extension has been extended and wheels are being turned. FIG. 42 is a rear view of the work vehicle. A close up view of the features surrounding wheel 416 are shown in FIG. 43 and a bottom view is shown in FIG. 44. A bottom view close up view of the attachment arrangement of wheel 418 is shown in FIG. 45 as well.

FIGS. 46-57 disclose an embodiment that features a three-point hitch and power take-off (PTO) assembly 500. By providing a PTO shaft 512 and three-point hitch 514, this arrangement supplies additional utility and versatility to the extendable frame work vehicle.

In general, many vehicles such as tractors and other construction equipment may make use of a PTO or three-point hitch. In fact, three-point hitches may be the most common mechanism for connecting hydraulically actuated mechanical linkages in farm and power equipment. Moreover, there are a wide variety of attachments designed to adapt to this type of hitch and/or draw power from a PTO.

A PTO is typically a mechanical device that uses a driveshaft containing ridges (or splines) to draw power from a work vehicle engine and provide that power to an attachment, second machine, or other auxiliary equipment. PTOs can be mounted on either a main or auxiliary transmission. PTOs can also be transmission mounted or engine mounted. For transmission mounted PTOs the PTO is located on the side, bottom, or rear of the transmission. For manual transmissions the PTO is driven from a countershaft gear or reverse idler gear. For automatic transmissions the PTO is driven before the torque converter and is subjected to torque converter slip. An engine mounted PTO is located at the rear of the engine and can be driven from timing gears or a special gear train. A hydraulic drive PTO is preferred in the present invention.

The present invention provides a number of challenges to the effective implementation of a three-point hitch and/or PTO. This is primarily due to the movement of the vehicle's secondary extension 516 which includes the multifaced housing 518 at the back of the vehicle where one might typically expect PTO and three-point hitch features to be located.

If an extendable frame vehicle is used with a PTO and hitch arrangement, a secondary extension as at 516 must be able to support the weight required by a three-point hitch, and that the arrangement must not interfere with the ability to access and run the PTO shaft. Further, the many outwardly projecting features of these devices must not be able to disrupt vehicle operation. Therefore, it is desirable to have an attachment device offering the advantages of a three-point hitch and PTO arrangement yet which can be used with an extendable frame vehicle offering greater versatility, effectiveness and safety to the operator and those around the vehicle.

The present invention can be more readily understood with reference to FIGS. 46-57. The attachment arrangement 500 generally includes a PTO shaft 512 and three-point hitch 514.

Both of these features are integrated into the rear multifaced housing 518 of the extendable work vehicle 518.

First, with respect to the PTO shaft 512, there are a number of important design features. The PTO shaft 512 is located at the end of a driveshaft located beneath the housing of the work vehicle 520. A portion of the PTO shaft 512 can be seen protruding slightly from the vehicle. The PTO shaft 512 is a splined shaft protruding from the lower, center, back of the vehicle. The PTO shaft 512 is surrounded by an outwardly projecting rectangular shaped shield 524 to guard the shaft from its surroundings. This shield 524 is important to keeping the shaft safe from damage.

Because of the present invention's dual frame extension, a PTO shaft driven off the engine 522 may not be suitable. Therefore, a hydraulic motor 526 may be used to power the PTO drive instead. This PTO system arrangement 528 can be seen in FIG. 48. This configuration is accomplished by using a dedicated pump/motor combination. A piggy back fixed displacement pump 530 is driven off the main pump 532. This pump serves both the cooler 534 and filter 536 loop and the optional hydraulic drive PTO 538. If an optional hydraulic drive PTO 538 is used, a solenoid operated diverter valve 540 may be added to the circuit that, when energized, results in driving the PTO motor.

In general, the PTO operation is made possible when joysticks/manual controls 138 are manipulated to send movement input data to the controller 142. After running the algorithm programmed in the controller 142, output commands are sent to both the solenoid operated diverter valve 540 and the pump pressure controller 542 which governs the operation of the main pump 532. Consequently, the system set forth in FIG. 48 can operate to readily produce PTO shaft rotation and power to implements attached to the vehicle. This is true even when the vehicle has its secondary extension member in use.

Surrounding the PTO is another important feature of this invention's design, a three-point hitch 514. This three-point hitch 514 helps to transfer the weight and stress of an implement to the rear wheels of the work vehicle. The three-point hitch is generally comprised of three moveable arms. These include a hydraulic cylinder arm called the top link 544 and two separate lift arm assemblies 546 comprising four-bar linkages. Each of these arms has its own attachment point for connecting implements to the three-point hitch 514.

An advantageous aspect of the design of the present invention is the way that the three arms may be stored. When not in use, these arms may be retracted or detached and stored in compartments that are inset within the multifaced housing 518. One such storage feature is an upper compartment 547 located along the upper edge of the housing 518 in which top link 544 may be detached and place. Also, two vertical compartments 549 extend the length of the lift arm assemblies 546 and allow for retraction and storage of the lift arm assemblies 546.

The adjustable top link 544 (sometimes referred to as the "center link" or "top arm") is a hydraulic cylinder coupled at one end to the extendable frame portion in pivotal engagement to a bracket 548. In proximity to the other outwardly extending end of the top link 536 is an attachment point 550 consisting of a hole for attachment to an implement. Implements typically have posts that fit through the attachment point 550. Such an implement will generally be secured by placing a pin on the ends of the post. The top link 544 is the pivoting point of the linkage and is typically an important part of making implement adjustments. The top link 544 may be optionally powered by the work vehicle's hydraulic system.

The two lift arm assemblies 546 are also critical components of the three-point hitch. These lift arm assemblies each comprise a four-bar linkage coupled to an actuator and includes an attachment point 558. More specifically, three of the bars of the four-bar linkage include three link members that are pivotally joined for useful attachment. These link members of the four-bar linkages include an upper horizontal link 552, a lower horizontal link 554, and a vertical link 556. Links 552 and 554 project rearward in a generally horizontal direction from points of pivotal attachment to the vehicle's rear multifaced housing 518. The outwardly extending ends of each of the links 552 and 554 have holes 558 that serve as attachment points for an implement attachment. Vertical links 556 pivotally join the horizontal links 552 and 554 to provide further support. As previously stated, lower links 552 are pivotally attached to the rear multifaced housing 518. However, this pivotal attachment is generally not at the end of a lower link 552, but rather along its length. The ends of lower links 554 are found within the multifaced housing 518, where they are pivotally mounted to right and left hydraulic actuators 560 and 561. Actuators 560 and 561 are hydraulically moved up and down as directed by a vehicle operator and provide convenient vertical adjustment of the three-point hitch assembly. Using this arrangement provides lift arm assemblies 546 ample swing flexibility for easy alignment and attachment of an implement.

Although the top link 544 is typically a simple turnbuckle in many three-point hitches, the present invention contemplates use of a hydraulic cylinder 545 as the top link. This is useful as turnbuckles are often hard to turn under load and are even more difficult to move if the arm or threads are rusty, dirty, or bent. The hydraulic cylinder 545 connects to the tractor hydraulics with short, small-diameter hoses and allows the operator to change the angle of the hitch effortlessly from the control cab. Changing the hitch angle can make it much easier to hitch and unhitch implements and makes a quick hitch even easier to use. It is also useful to adjust the implement angle in the field. While the implement angle is very important for many applications, drivers often do not want to get out of the tractor to attempt to adjust the upper link. With the hydraulic cylinder 545 of the present invention, adjustment is simply accomplished by the push of a button and is more likely to be done due to the small amount of effort such adjustment requires.

Figure 50:
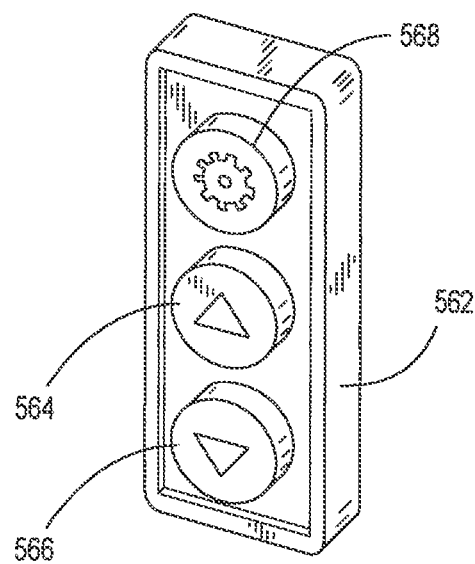
FIG. 50 is a perspective view of a remote control device for the three-point hitch and power take-off (PTO) of the work vehicle.

FIG. 50 is a perspective view of a remote control device 562 for the three-point hitch and power take-off (PTO) of the present invention. At times when a vehicle operator is outside the cab, such a remote control device 562 is especially useful. In some cases, this will be the preferred location for an operator performing attachment of a rear implement or executing PTO operations. Also, operating the PTO by remote control allows an operator to remain a safe distance from moving parts during use and needing to get into an out of the cab to engage or disengage the PTO. The remote 562 has buttons 564 and 566 for raising and lowering the three-point hitch assembly members respectively. A button 568 is also provided for activating the PTO. Remote controls provided for executing the PTO and three-point hitch may contain further buttons or controls. Moreover, such remote controls might be possible for use in performing extension and retraction of the frame itself. The manlift 102 may also make use of such a remote control for example.

Figure 51:
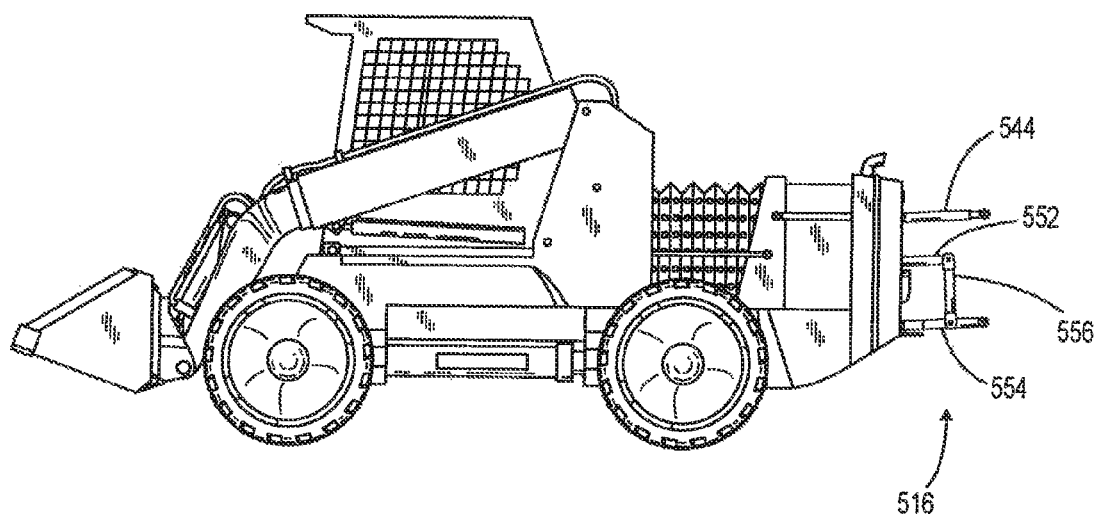
FIG. 51 is a side view showing the three-point hitch and PTO on the work vehicle with a primary extension deployed.
Figure 52:
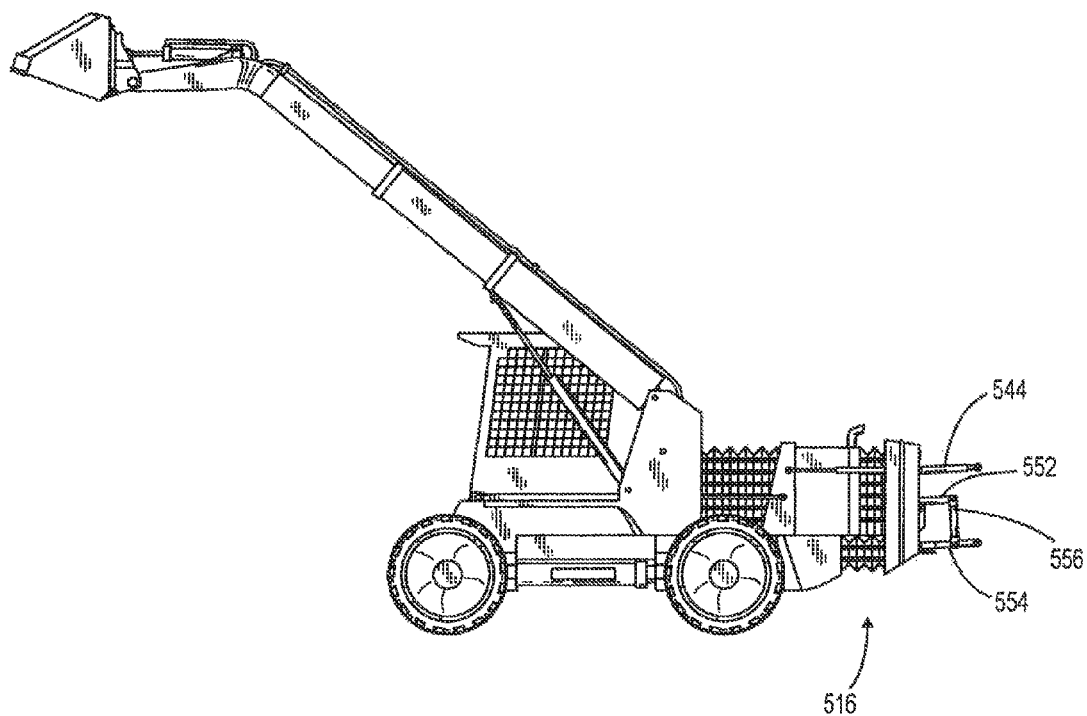
FIG. 52 is a side view showing the three-point hitch and PTO on the work vehicle with bucket raised and partially extended and both the primary and secondary extensions deployed.

FIG. 51 is a side view of the three-point hitch and PTO attachment arrangement on an extendable frame work vehicle where the primary extension is deployed. FIG. 52 is a side view of the attachment arrangement where both the primary and secondary extensions are deployed. These arrangements allow confined use of the PTO and three-point hitch features when the primary or secondary extensions are deployed. This capability enables numerous previously unavailable configurations of various implement attachment arrangements.

Figure 53:
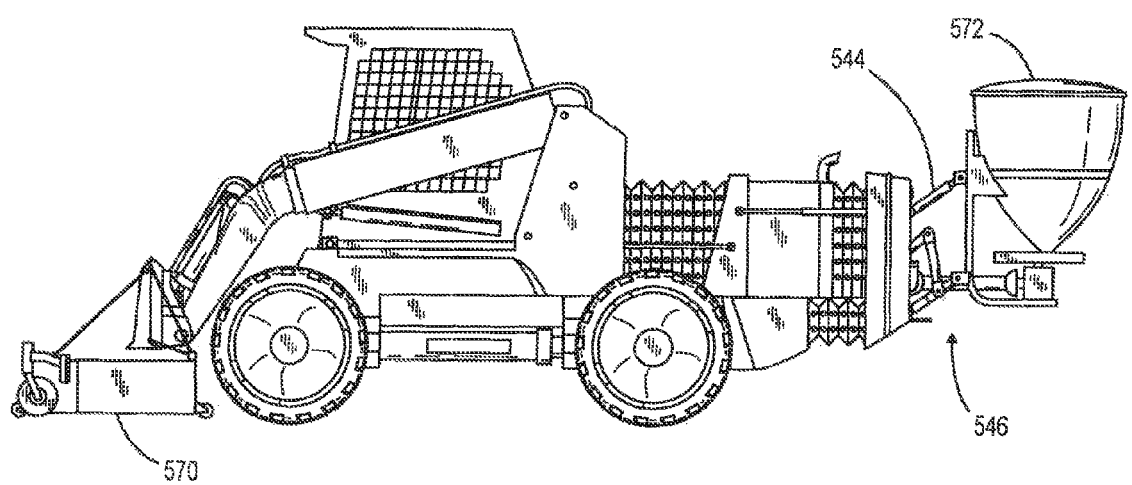
FIG. 53 is a side view of the three-point hitch and PTO on the work vehicle with the PTO and hitch connected to a spreader attachment.
Figure 54:
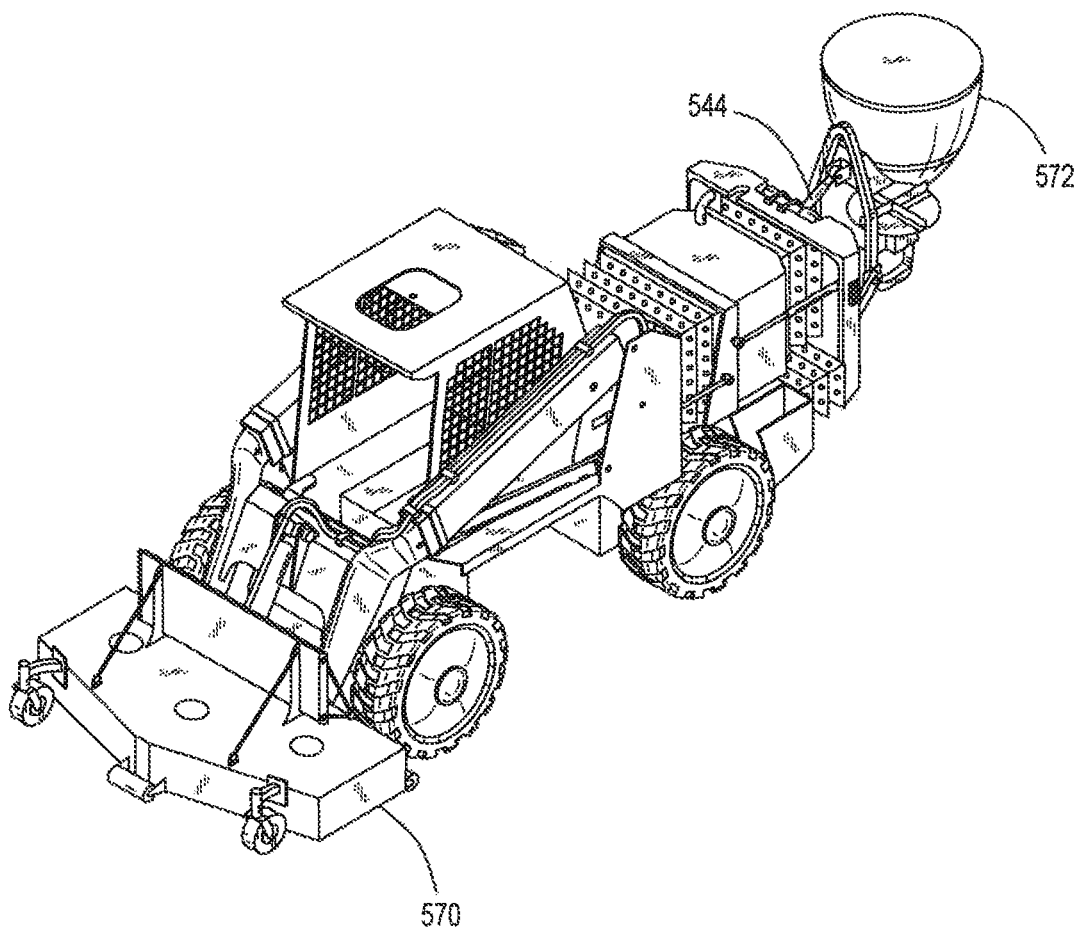
FIG. 54 is a perspective view of the three-point hitch and PTO on the work vehicle with the PTO and hitch connected to a spreader attachment.
Figure 55:
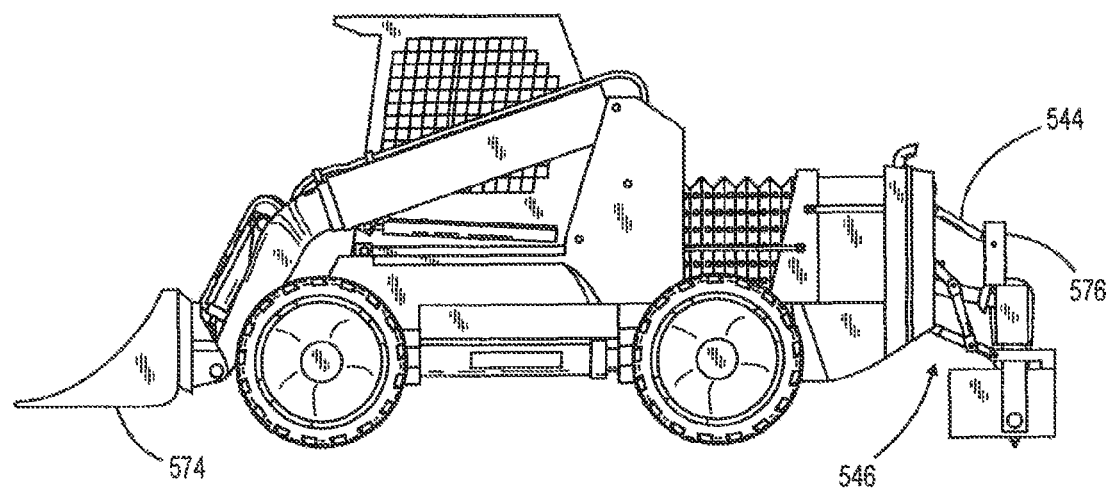
FIG. 55 is a side view of the three-point hitch and PTO on the work vehicle with the PTO and hitch connected to a harley rake type attachment.
Figure 56:
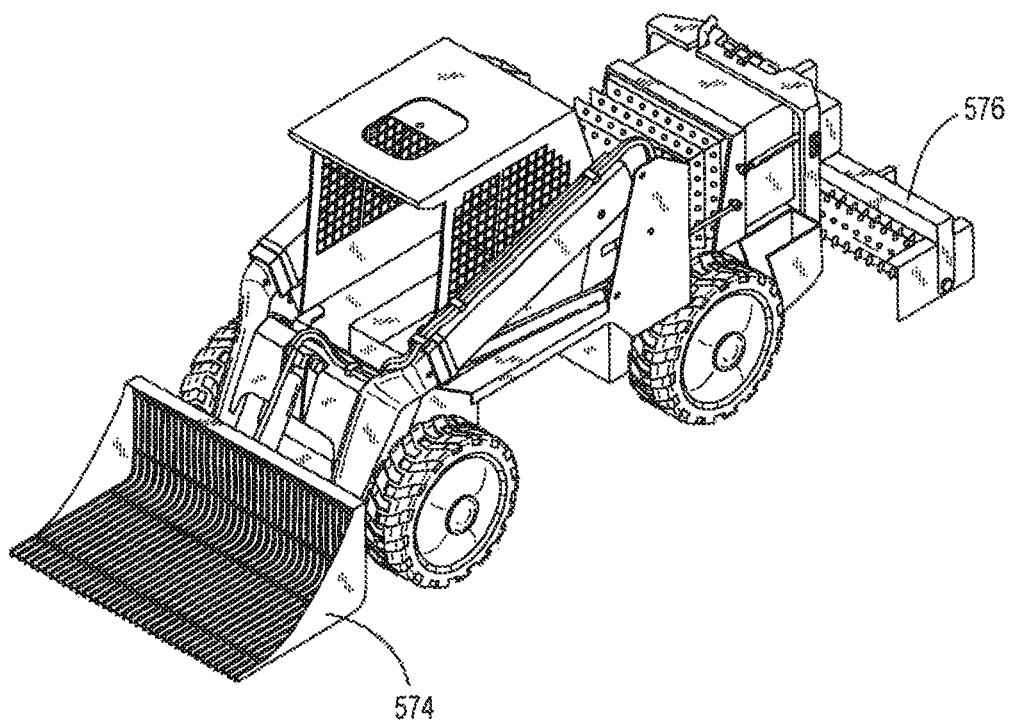
FIG. 56 is a perspective view of the configuration of FIG. 55 where the PTO and hitch are connected to a harley rake type attachment.

FIGS. 53-56 disclose more possible attachment configurations using the three-point hitch and PTO assembly 500. Specifically, FIGS. 53-54 show side and perspective views of the attachment arrangement where in addition to the front attachment of the lawn mower 570, the PTO and hitch are being used by a fertilizer spreader attachment 572. FIGS. 55-56 show side and perspective views of the attachment arrangement where in addition to rock picker 574 the PTO and hitch are being used by a harley rake type attachment 576. Such figures make up a small sampling of the wide range of attachment configurations that may be used by the three-point hitch and PTO assembly 500.

Figure 57:
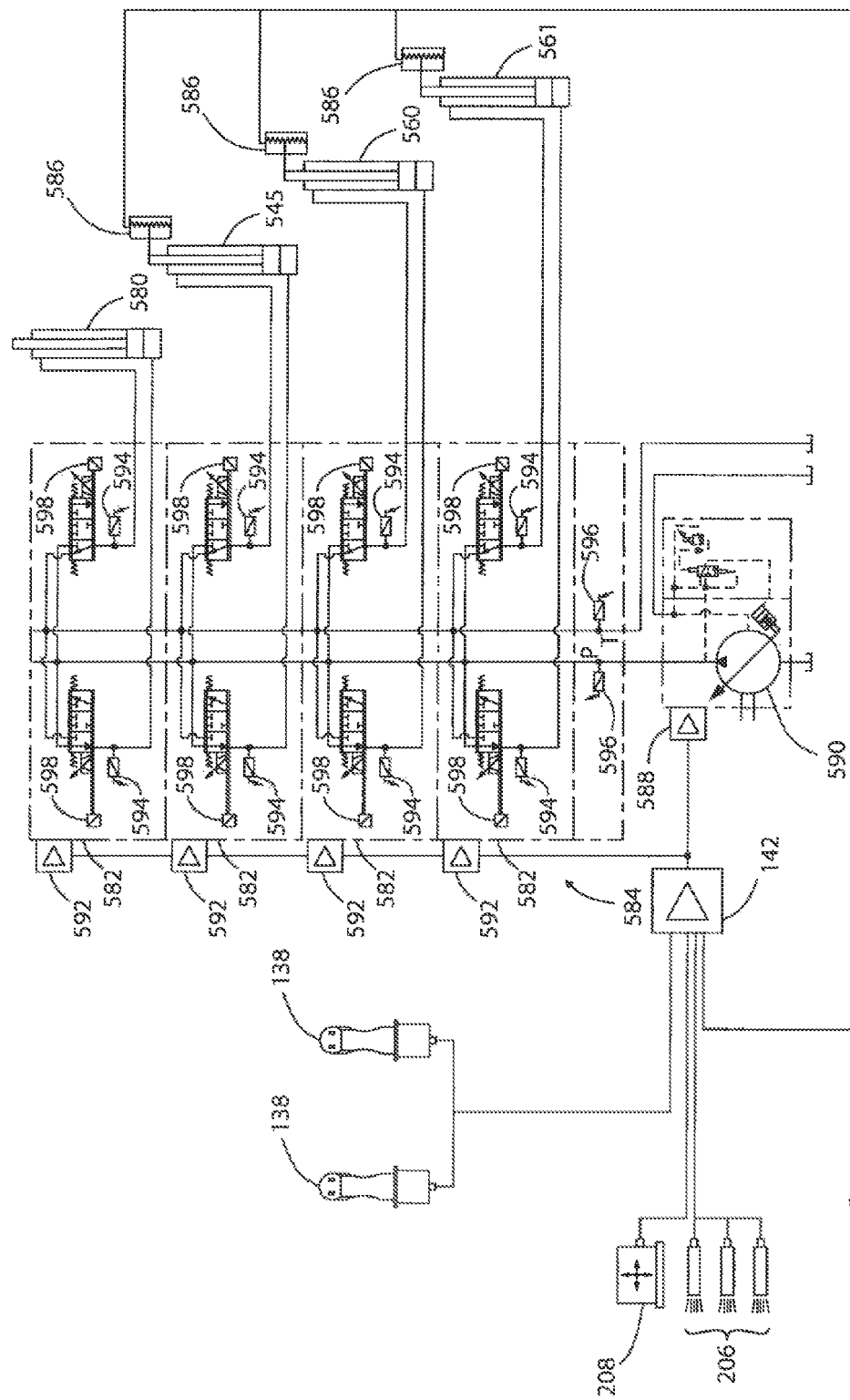
FIG. 57 is a schematic control diagram of a three-point hitch system of the work vehicle.

Operation of the three-point hitch control system 578 may be more fully understood from the diagram of FIG. 57. Four cylinders used by the three-point hitch are shown. They include the cab tilt cylinder 580, the top link cylinder 545, right actuator 560, and left actuator 561.

Each of the cylinders is separately connected to its own valve section 582 of the of the twin spool valve 584. Also, integral linear position sensors 586 are separately connected to top link hydraulic cylinder 545, right actuator 560 and left actuator 561.

The three-point hitch control system 578 therefore operates when inputs from the joystick/manual controls 138 (including pushbuttons on the joystick or on the operator interface screen), two-axis inclinometer chassis mount 208, frame extension position sensors 206, and GPS system 140 are sent to the controller 142. The controller 142 executes a software algorithm which provides the desired output signals to the CAN twin spool valve 584. More specifically, the signals are sent to the pump pressure controller 588 that controls the pump 590 and the valve controllers 592 that control the function of the valve sections 582.

Each valve has a thin film pressure transducer 594 at each working port and common P and T pressure transducers 596. An LVDT linear transducer 598 provides position feedback for each pilot operated and double acting spool.

Automation of the three-point hitch is therefore also possible. The thin film pressure transducers 594 monitor the pressure in the three-point hitch rod port and cap port. This data can be calculated to achieve load and lifting force. The operator will have the ability to command the three-point hitch to "float" at a pre-determined load. By commanding a rod port pressure control to the CAN twin spool valve 584 that controls the three-point hitch, the cylinder can extend or retract while maintaining a constant load transmitted to the turf below the vehicle.

Therefore, the cylinders are controlled by electronic control valves with command received via a CAN bus from the machine controller 142. This results in rapid and precise control of all attached implements conveniently guide, adjusted and secured from the operator's cab 22.

By controlling the top link hydraulic cylinder, the operator has multiple operational type selections. The operator can select position control, change the length as a function of lift height or use different characteristics for lifting, lowering or float. This permits automatic steep and parallel lifting of the implement. Finally, the control lifting cylinder can provide precise implement position even receiving control commands straight from the implement and the lift can assume a counterbalance or float position.

FIGS. 58-70 relate to an embodiment of the present invention utilizing an alternative to a wheeled vehicle in the form of a track arrangement 600. The work vehicle includes an adjustable frame having front and rear portions that may extend or retract with respect to each other, a variable base length track assembly with first and second tracks located on opposite sides of the vehicle, and an adjustable arm carrying an idler located within each of the first and second adjustable length tracks to modify the path of the tracks based on the extension or retraction of the frame. The work vehicle also includes a set of lower track wheels located within each of the first and second tracks, an engine mounted on the rear portion of the frame, and a controller which receives vehicle data and responds by actuating extension and retraction of the adjustable frame.

Figure 58:
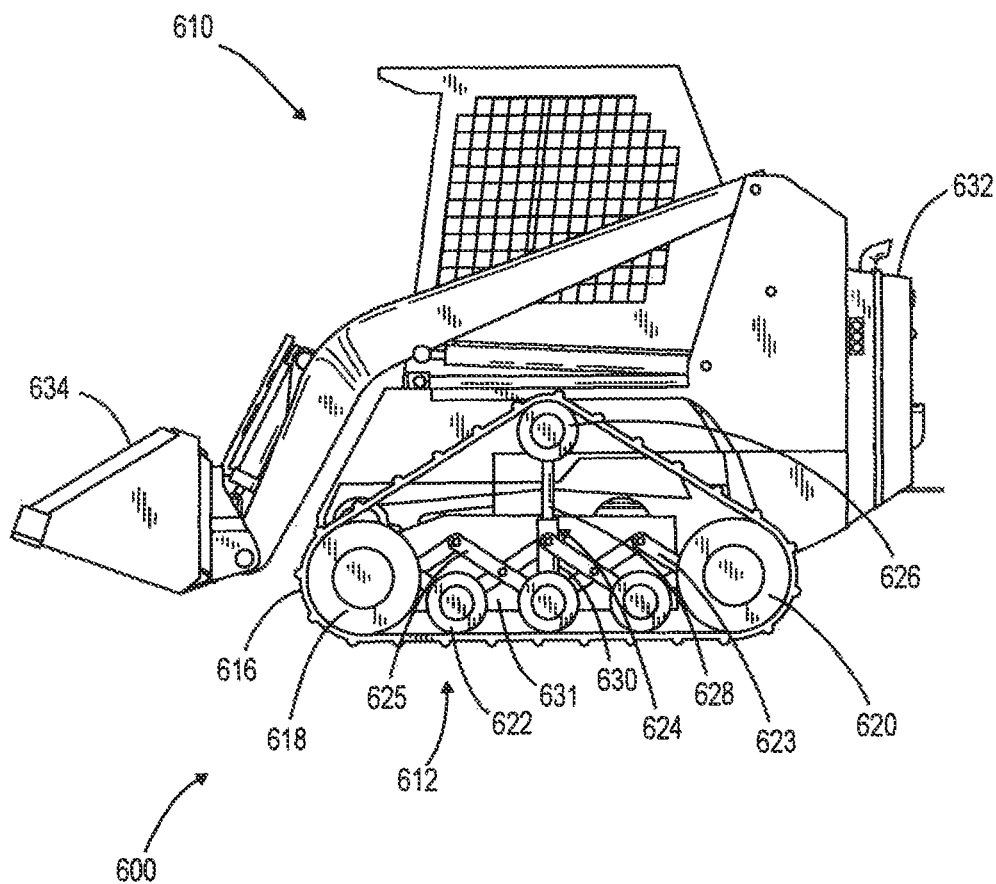
FIG. 58 is a side view of an embodiment of a work vehicle equipped with a vertical idler track arrangement in a retracted configuration.
Figure 59:
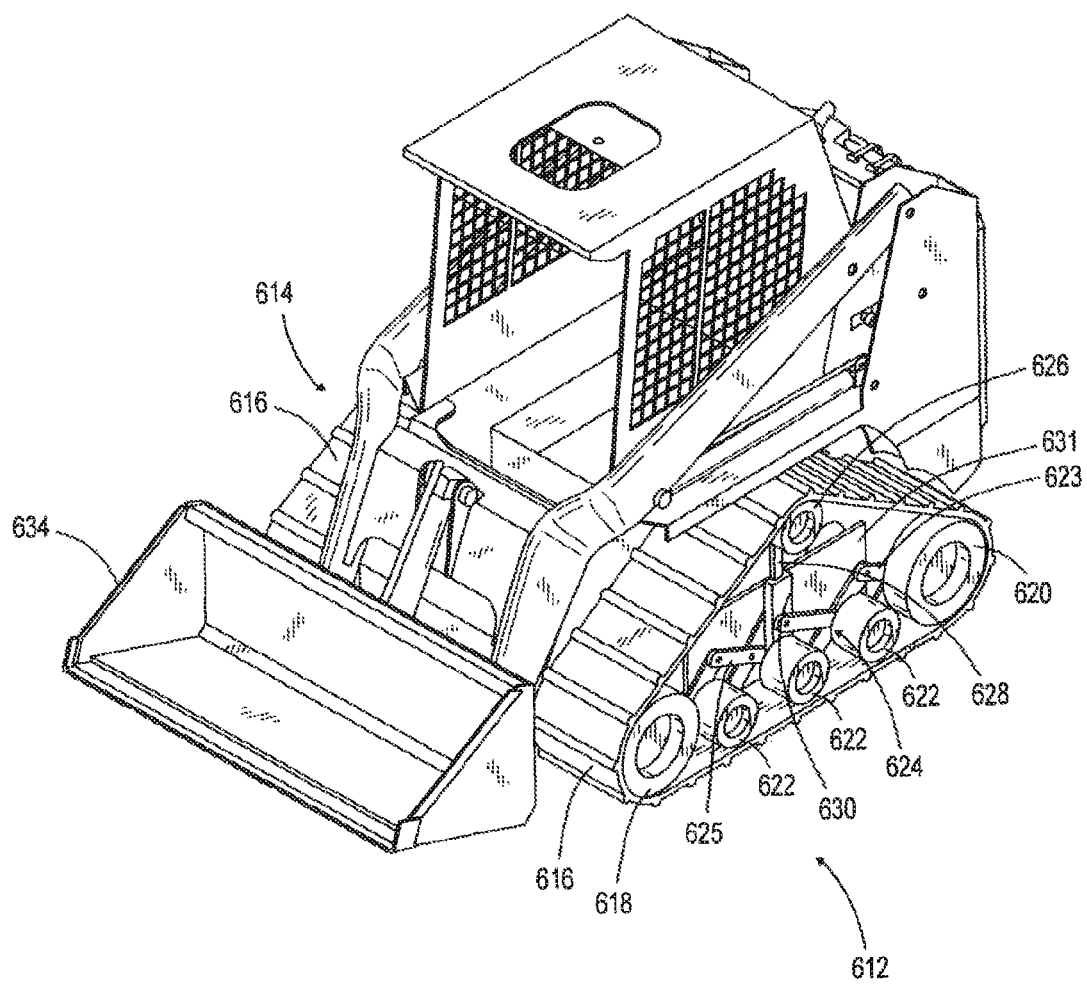
FIG. 59 is a perspective view of a work vehicle with a vertical idler track arrangement in a retracted configuration as in FIG. 58.

Specifically, FIGS. 58-61 show a vertical idler arm configuration 600. In FIGS. 58-59 the work vehicle is in the retracted configuration. In keeping with the basic work vehicle structure of this invention, the work vehicle 602 generally includes a first front portion 604 that is extendable and retractable with respect to a second rear portion 606. The work vehicle has a variable base length track assembly 610 that includes first and second track members 612 and 614 on the right and left sides of the work vehicle body. Each respective track member 612 and 614 includes a track 616, a front drive wheel 618, and a rear drive wheel 620. The drive wheels 618 and 620 are driven by hydraulic drive motors (not shown) found at each interior axle of the vehicle. These drive motors are driven at uniform speed and direction with one another to provide smooth rotation. The speed of the track 616 is thereby governed by the speed of the drive wheels. Separate drive wheels and drive motors are found within the second track member 614. Therefore, manipulation of the direction and speed of rotation of the two track members 612 and 614 allows the vehicle to rotate and maneuver as desired.

Spaced between these driven wheels 618 and 620 are a plurality of lower track wheels 622. The lower track wheels 622 are mounted on an expandable assembly 623 made up of short metal links 625 pivoted with one another at their ends and midpoints. By linking the lower track wheels 622 in this way, the wheels are enabled to extend and elongate the track or retract along the base of the track member 616 in an equally spaced-apart manner.

An adjustable arm which carries an idler 626 is located within each of the track members 612 to govern the path of the track members. In FIGS. 58-61 the adjustable arm is part of a vertical idler arm assembly 624. A vertical idler arm assembly 624 is centrally located above the lower track wheels 622. The vertical idler arm assembly 624 includes an upper track tension wheel or idler 626 and an adjustable vertical idler arm 628. The vertical idler arm 628 is capable of being moved in and out of a base 630 in a sliding fashion. The base 630 is affixed to the support frame 631 centrally located within the track member 612. The track member 616 accordingly encircles the driven wheels 618 and 620, the lower track wheels 622, and the upper track tension wheel 626.

Figure 60:
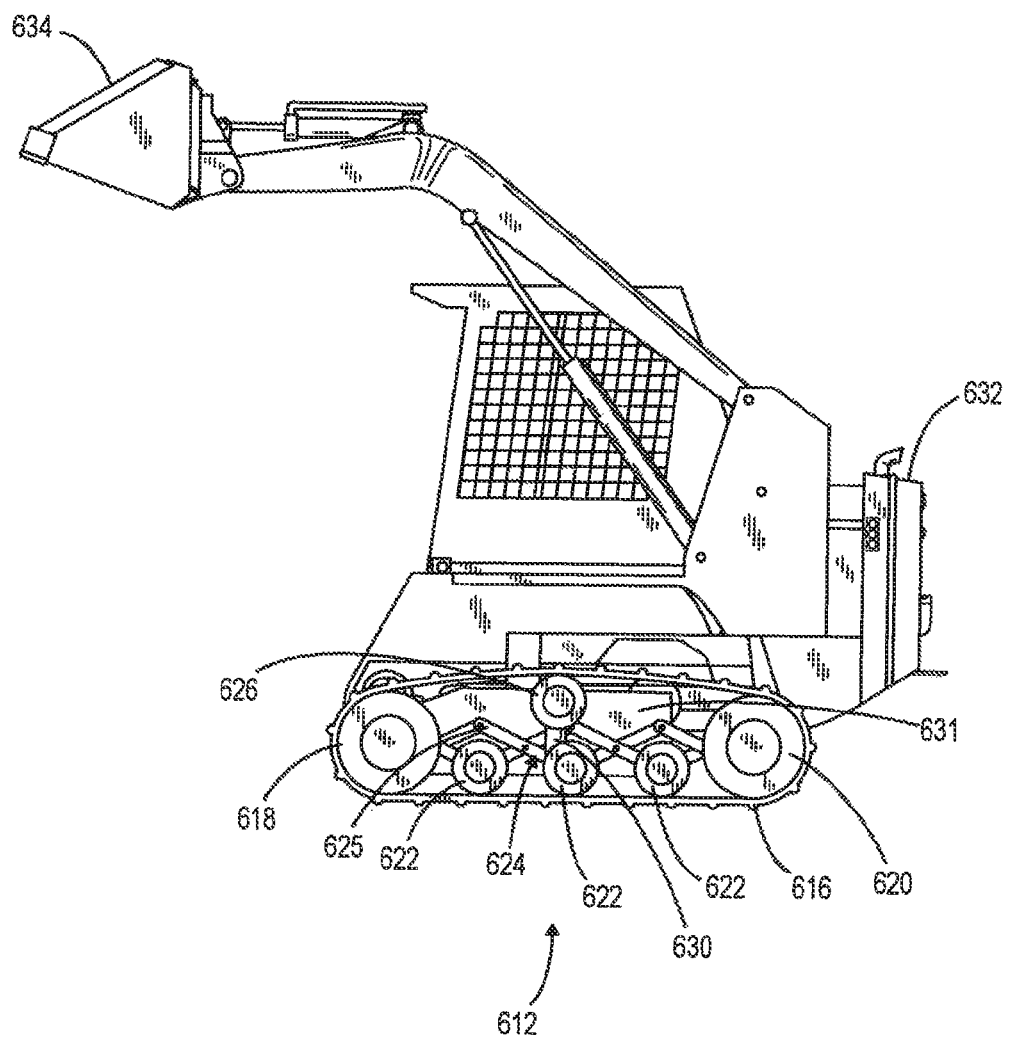
FIG. 60 is a side view of the work vehicle of FIG. 58 with a vertical idler track arrangement shown in an extended configuration.
Figure 61:
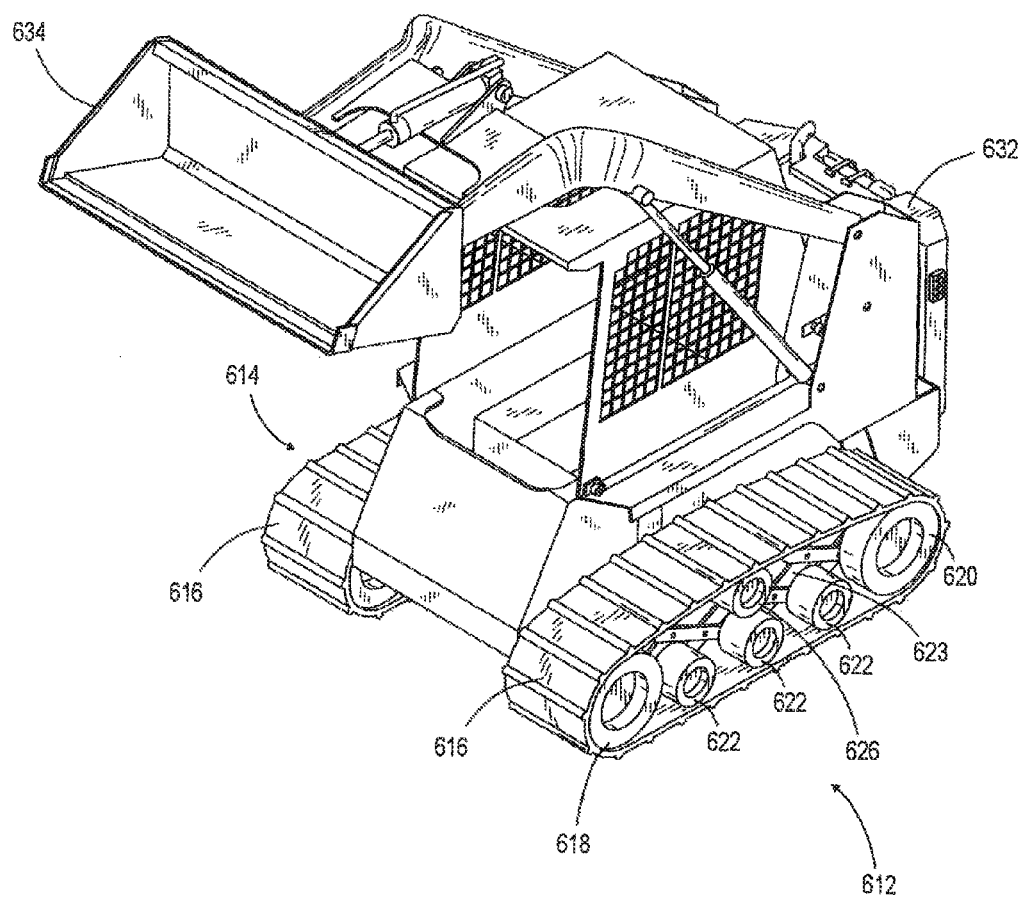
FIG. 61 is a perspective view of the work vehicle with a vertical idler track arrangement in an extended configuration.

FIGS. 60 and 61 disclose a vertical idler arm configuration 600 where the vehicle has deployed a multifaced housing extension 632 in a rearward manner. Deploying this extension is somewhat analogous to the deployment of the secondary extension member or counterweight 52 discussed above. Moving the housing member 632 in this way enables more weight to be shifted to the rear of the work vehicle for counterbalancing loads lifted by a bucket or implement 634 at the front of the vehicle. Additionally, this extension includes an expansion of the track base on which the vehicle sits. The driven wheel 620 is shifted rearward with the housing member 632 and a longer track base results. The lower track wheels 622 are spread apart with the help of expandable assembly 623. The vertical idler arm 628 of the vertical idler arm assembly 624 has been lowered down into base 630. This modifies the track path to provide the necessary slack in the track member 616 to accommodate the rearward movement of the rear drive wheel 620. An adjustable arm such as the vertical idler arm is responsible for carrying an idler and is located within each set of tracks. The idler arm may have its position adjusted using several different means. In some embodiments, the adjustable arm may be spring biased so that the extension and retraction of the front and rear portions of the frame use the track to force the idler and adjustable arm downward. Alternatively, the adjustable arm may be hydraulically actuated and controlled in correspondence to the frame extension and retraction. Whatever mechanism is used, the result is a vehicle having an extended track base that enables greater loads to be lifted at the front of a more stable vehicle.

Figure 62:
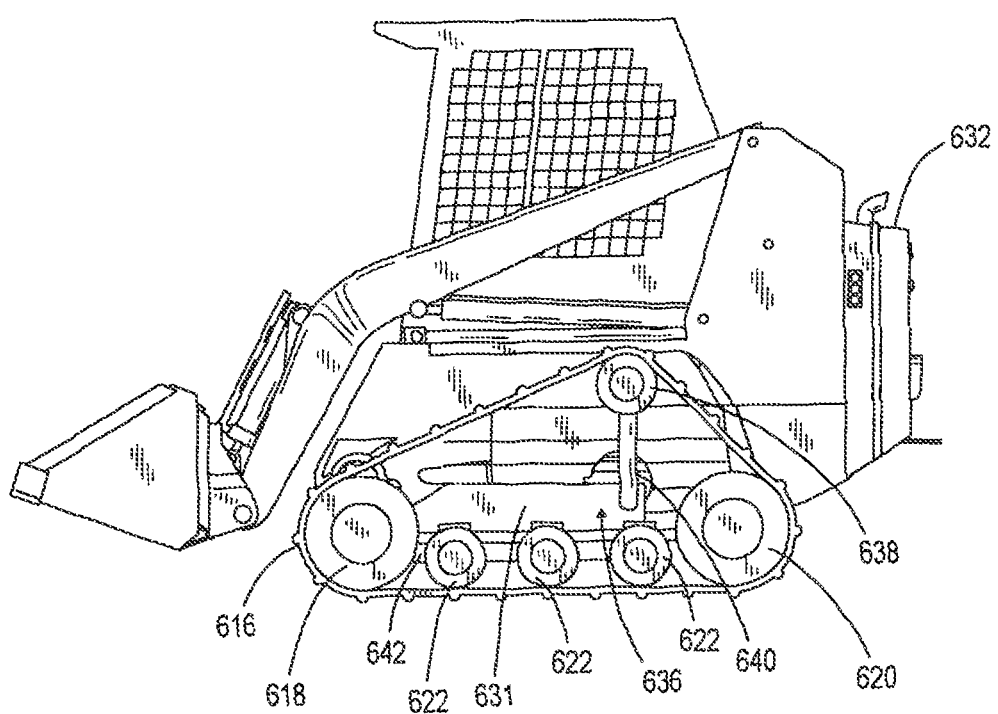
FIG. 62 is a side view of an embodiment of the work vehicle with a torsion idler arm track arrangement in a retracted configuration.
Figure 63:
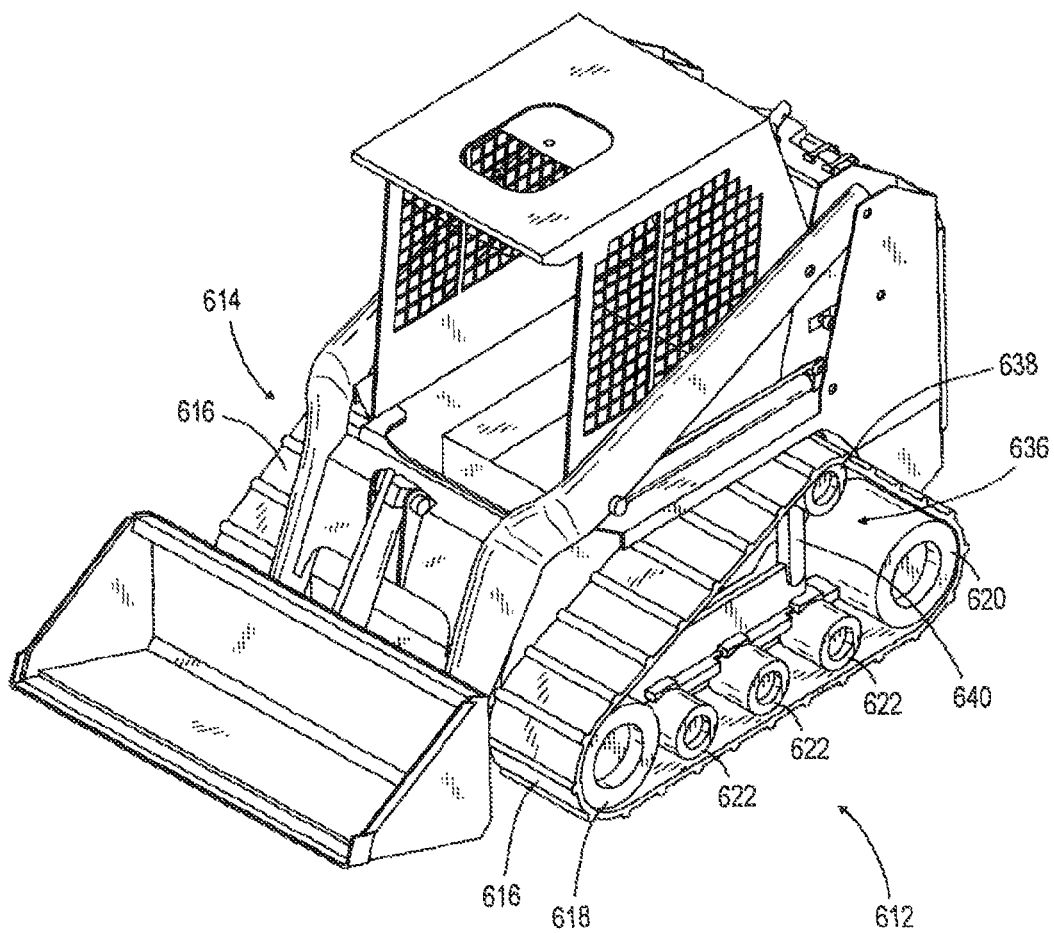
FIG. 63 is a perspective view of the work vehicle with a torsion idler arm track arrangement of FIG. 62 in a retracted configuration.
Figure 64:
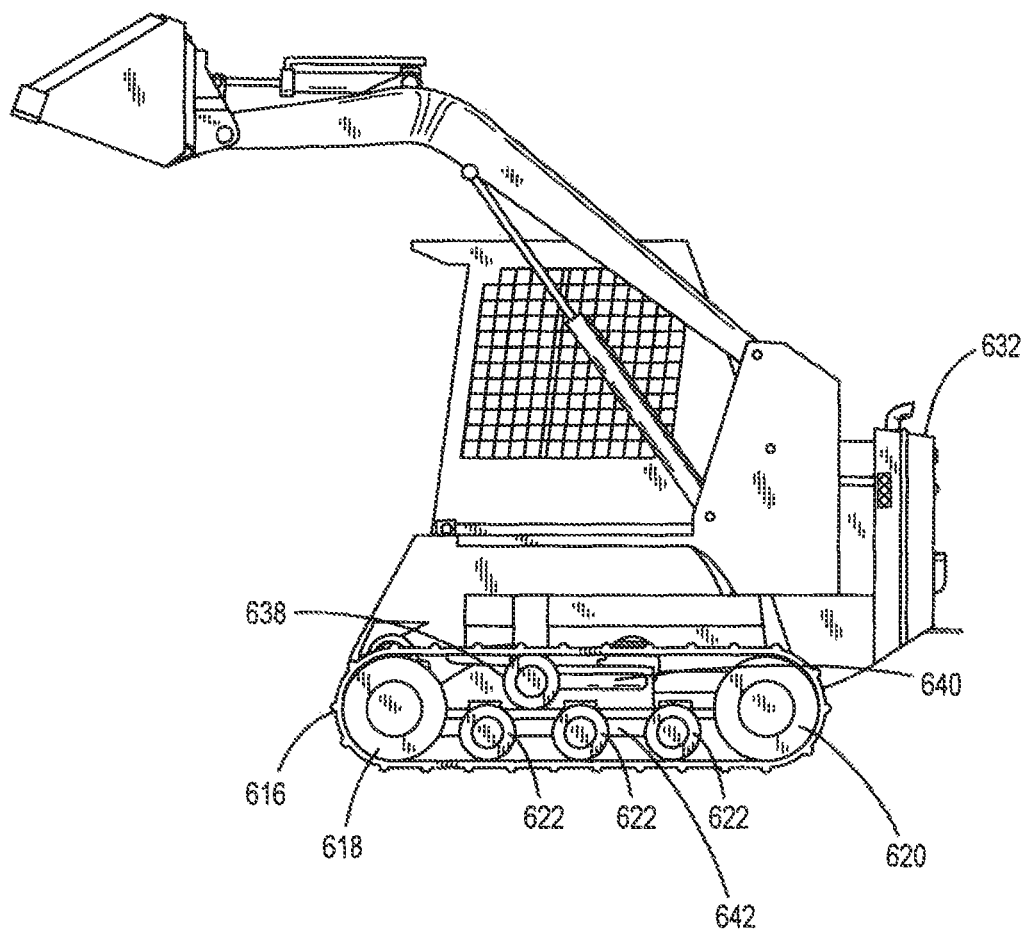
FIG. 64 is a side view of the work vehicle with a torsion idler arm track arrangement of FIG. 62 in an extended configuration.
Figure 65:
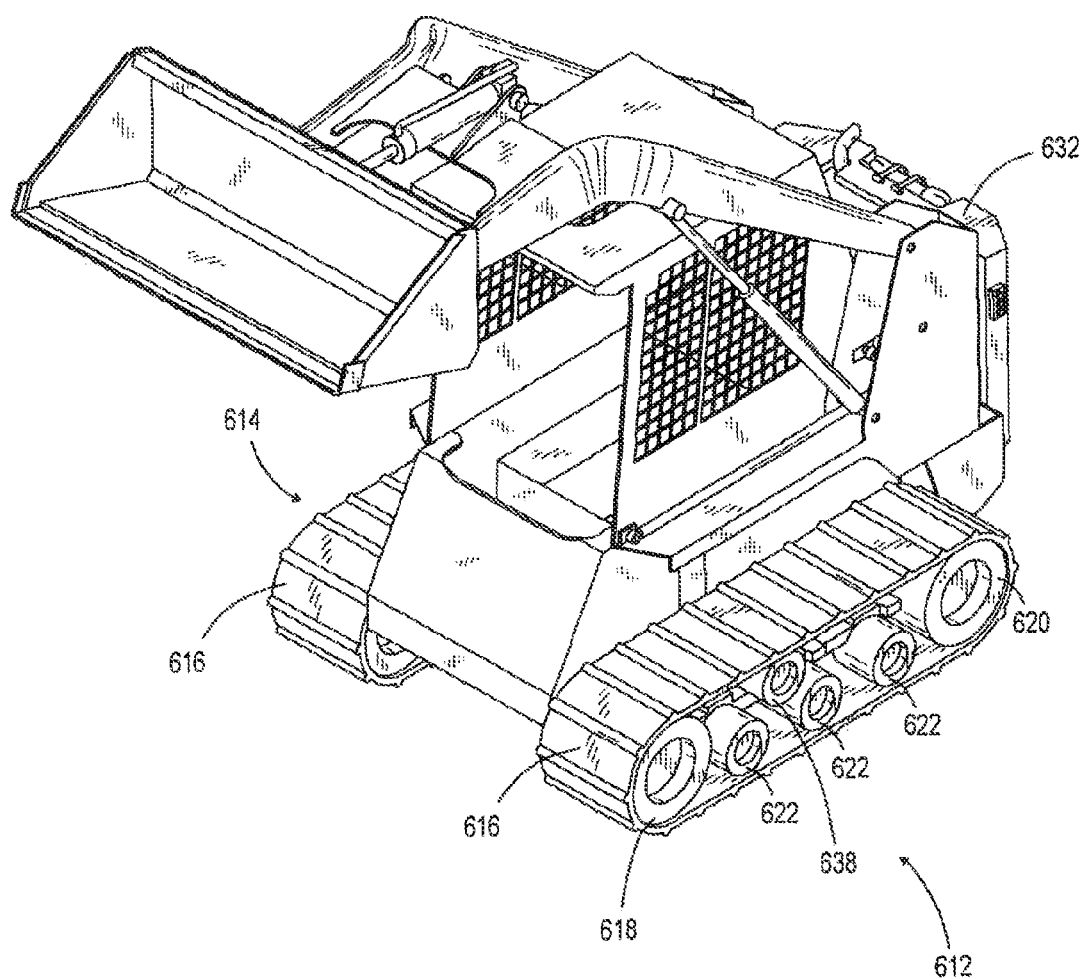
FIG. 65 is a perspective view of the work vehicle with a torsion idler arm track arrangement of FIG. 62 in an extended configuration.

FIGS. 62-65 disclose a number of views of the present invention where a torsion idler arm assembly 636 is used in place the vertical idler arm assembly 624. Such a torsion idler arm assembly 624 includes a track tension wheel 638 joined to an adjustable arm referred to as torsion idler arm 640. The torsion idler arm 640 is pivotally joined to the support frame 631 such that the idler arm 636 can rotationally pivot with track tension wheel 638 from a vertical position, as shown in FIGS. 62 and 63, to a horizontal position, as shown in FIGS. 64 and 65. As before, this may be done under track pressure against a biased spring or it may be done based upon hydraulic actuation. This operation is performed when the multi-faced housing 632 is moved rearward. Track length is therefore extended and a more stable vehicle results. Lower track wheels 622 help to support the track 616 between the drive wheels 618 and 620. The lower track wheels 622 are kept in parallel spaced relation along a grooved member 642.

Figure 66:
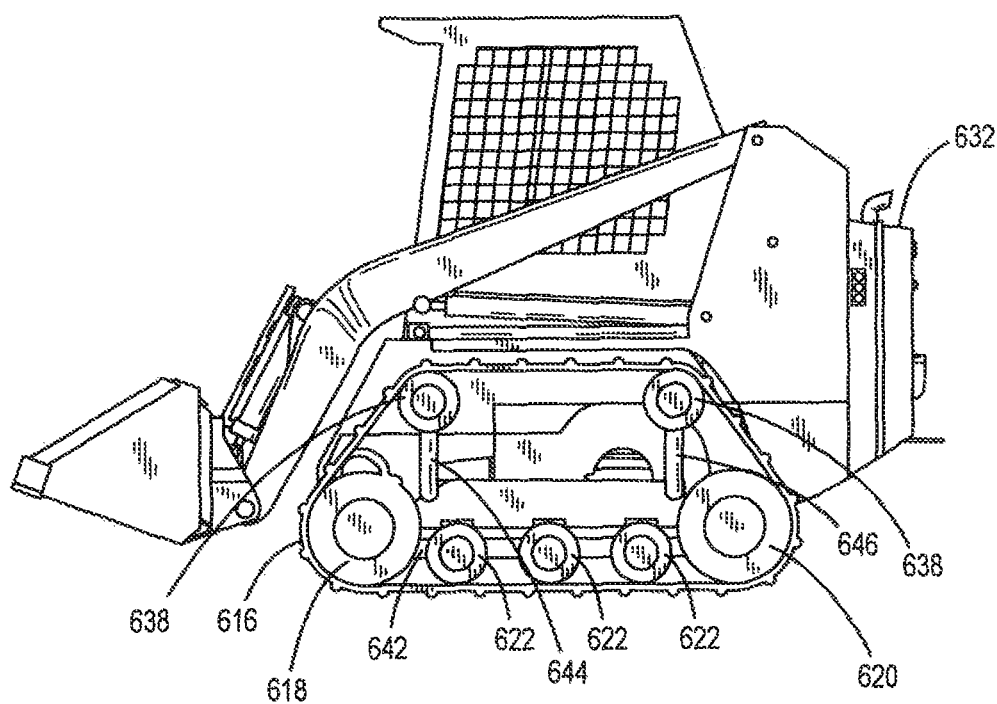
FIG. 66 is a side view of an embodiment of the work vehicle with a double torsion idler arm track arrangement in a retracted configuration.
Figure 67:
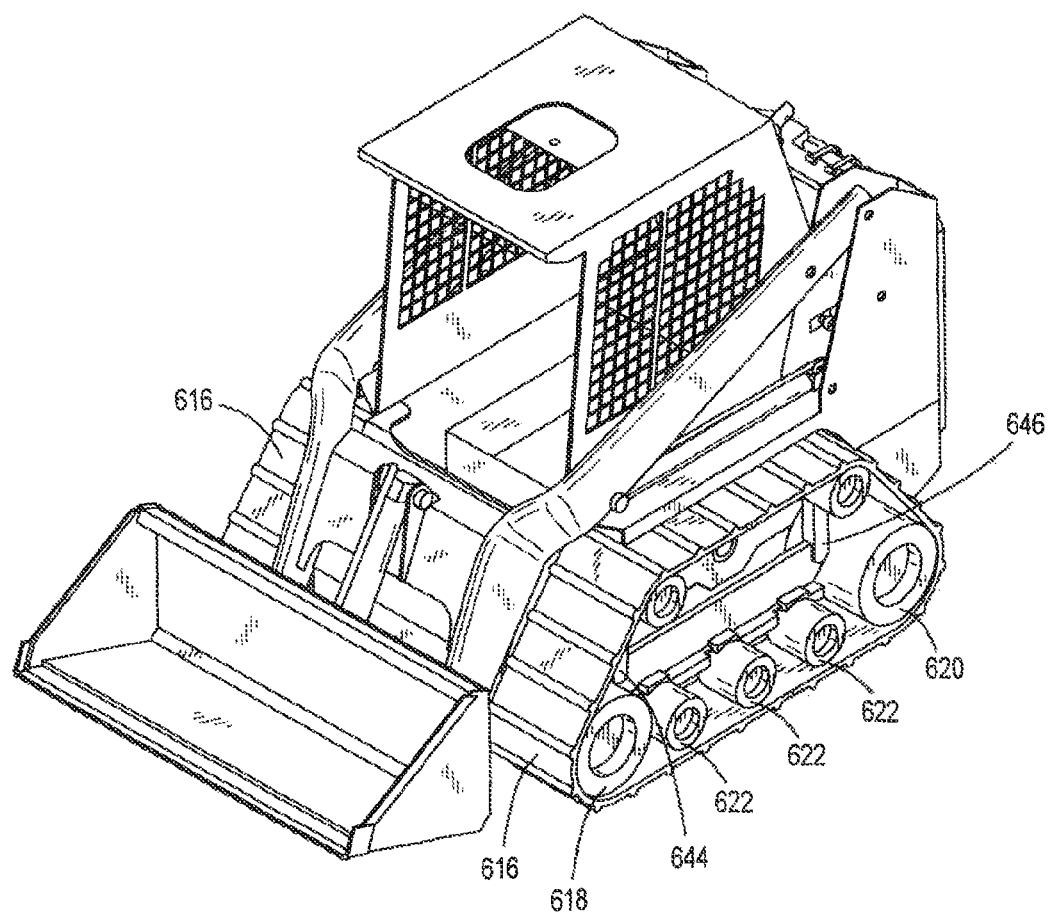
FIG. 67 is a perspective view of the work vehicle with a double torsion idler arm track arrangement of FIG. 66 in a retracted configuration.
Figure 68:
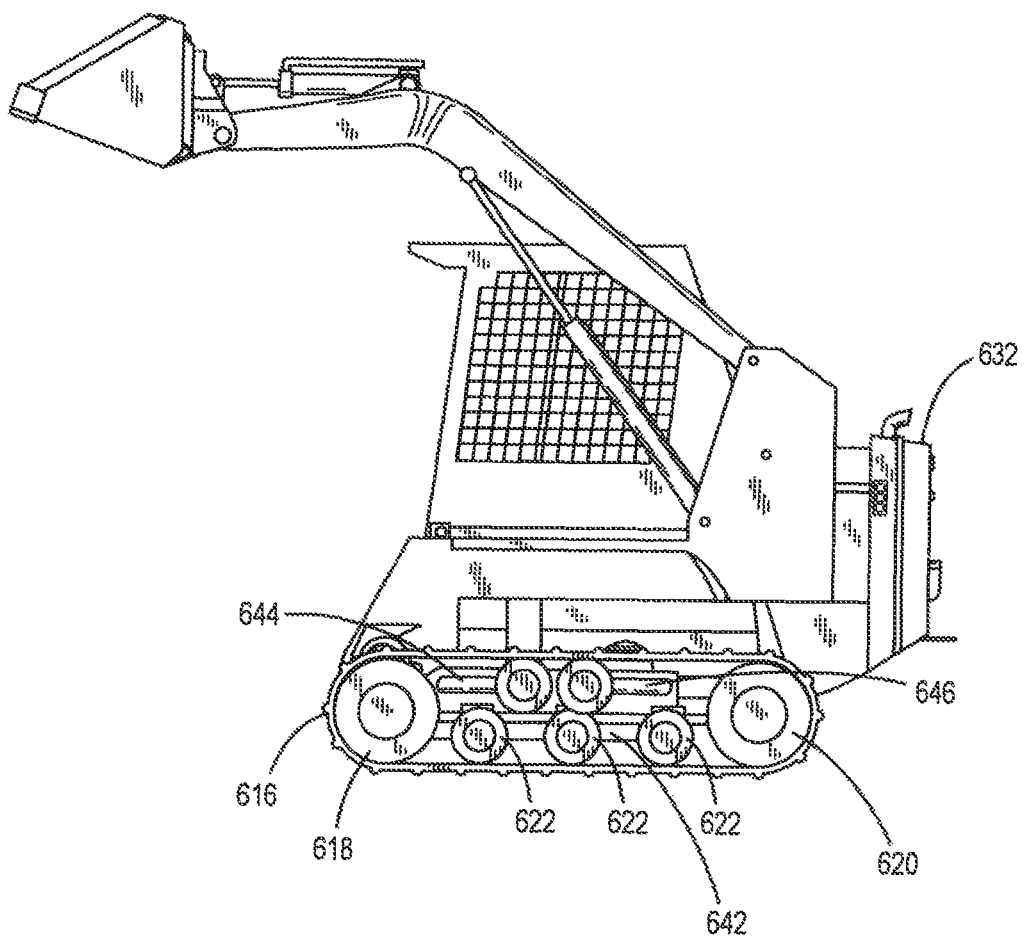
FIG. 68 is a side view of the work vehicle with a double torsion idler arm track arrangement of FIG. 66 in an extended configuration.
Figure 69:
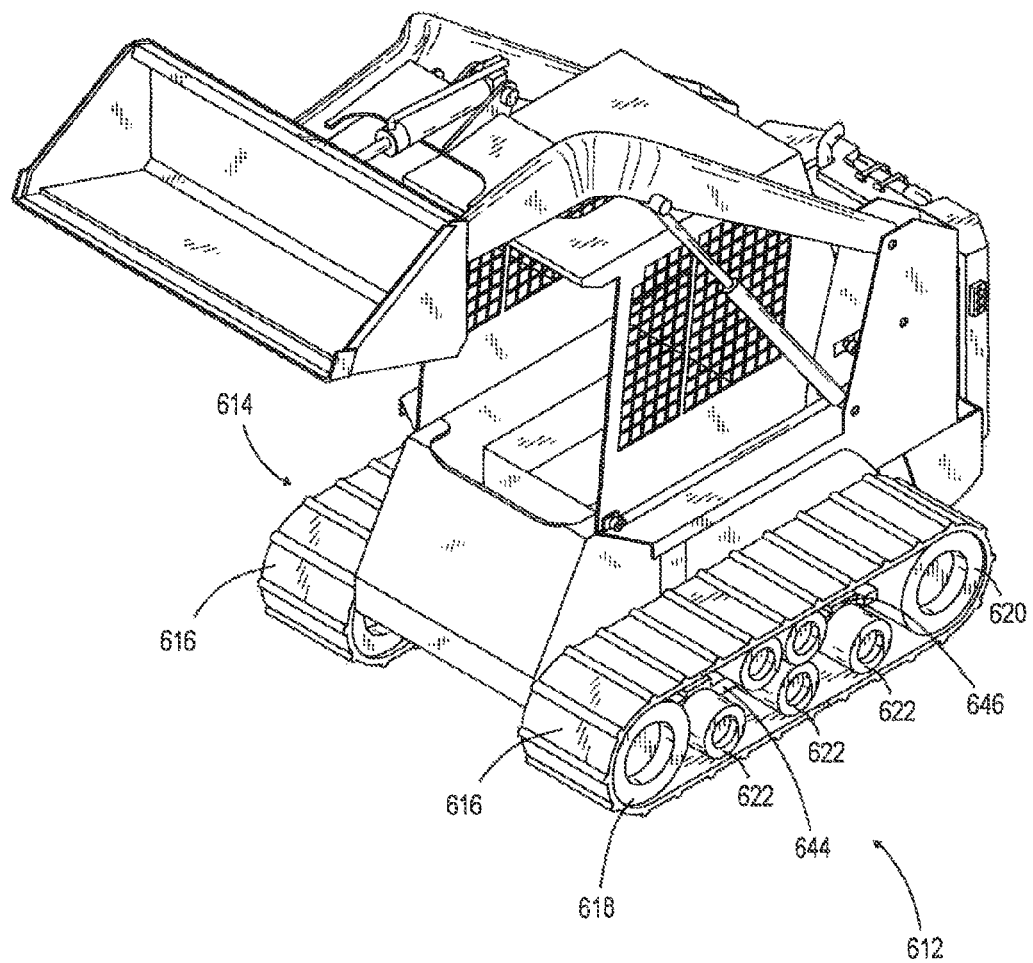
FIG. 69 is a perspective view of the work vehicle with a double torsion idler arm track arrangement of FIG. 66 in an extended configuration.

FIGS. 66-69 disclose a number of side and perspective views of the work vehicle of the present invention which utilizes a pair of double torsion idler arms 644 and 646. FIGS. 66 and 67 show the torsion idler arms in the upright position and FIGS. 68-69 show the torsion idler arms in the horizontal position with the track 616 having maximum extension. The torsion idler arms operate by pivotal movement similar to the movement of torsion idler arm 640 in FIGS. 62-65. By using two idler arms, a greater amount of track can be used. This enables a still longer track base to be realized when the vehicle is in the extended configuration.

Figure 70:
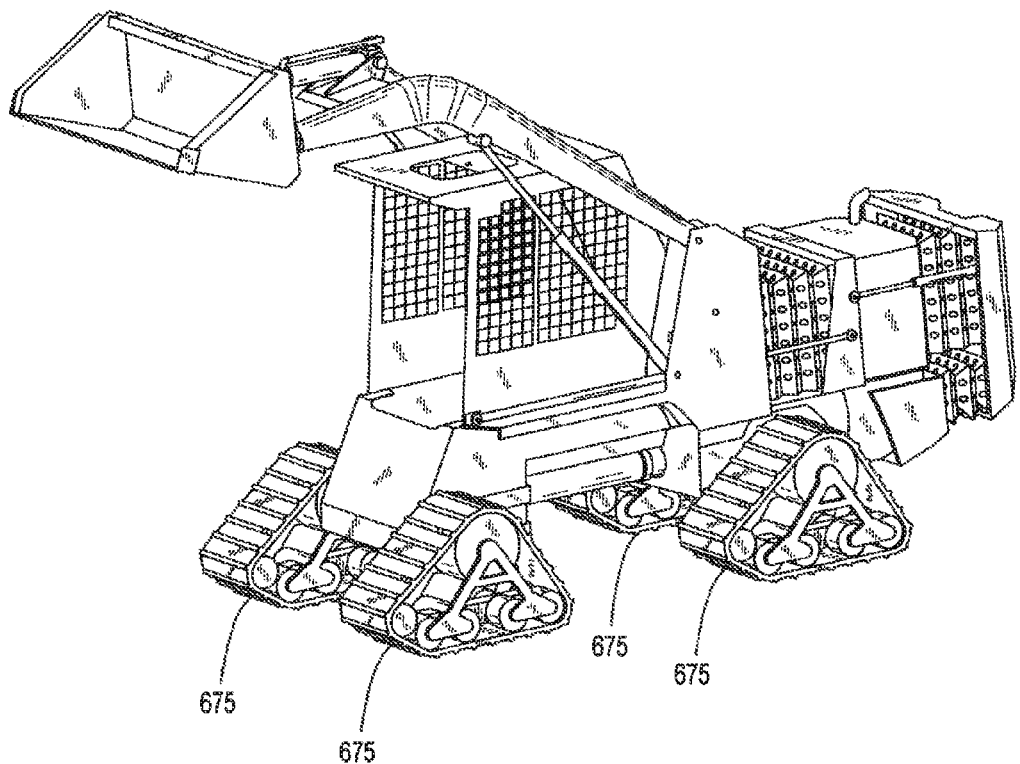
FIG. 70 is a perspective view of the work vehicle utilizing individual rubber track wheel members.

FIG. 70 sets forth a view of the work vehicle of the present invention utilizing rubber track members 675. These track wheel members may be of the type made by Track Division of National Transmission under the trademark MATTRACKS® or a similar product of another manufacturer. Such tracked wheels may be adapted to engage with existing work vehicle wheel mounting components. In doing this, the tracked wheels may substitute for the driven wheels, of the type shown throughout this application. Using such rubber track members 675 provides the work vehicle of the present invention with additional capabilities for maneuvering over various worksite surfaces. Utilizing these individual track wheel members provides the vehicle with some of the surface engaging advantages of track members while still allowing some of the maneuverability advantages of individual wheels.

Figure 71:
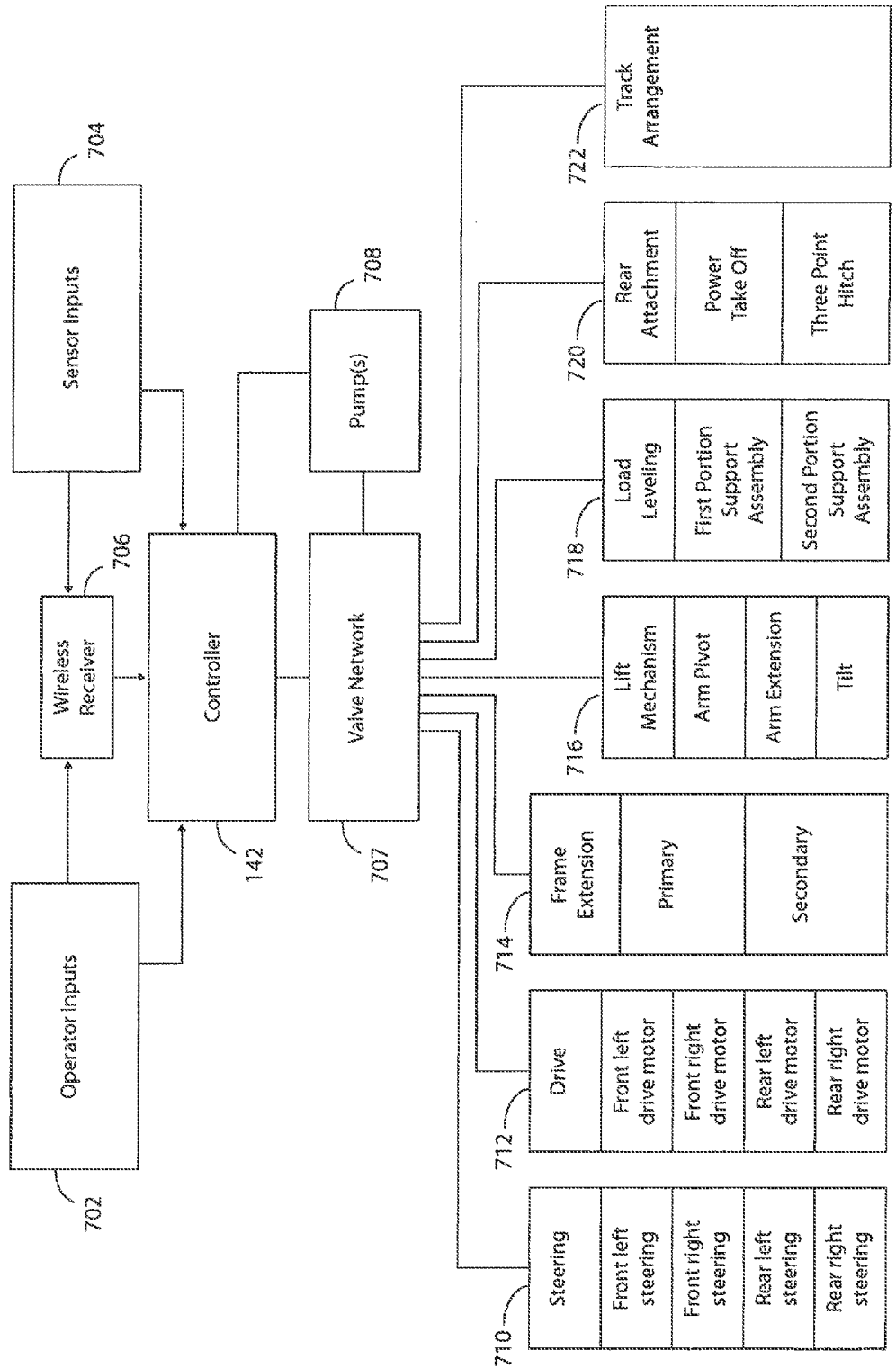
FIG. 71 is an overall schematic block control diagram of work vehicle systems.

The overall operation and functionality of the work vehicle can be understood from the diagram of FIG. 71. A basic overview of the work vehicle system 700 is shown. As disclosed in this figure, a central controller 142 is responsible for governing the overall tasks of the work vehicle. Such a controller may constitute a sensor-responsive microprocessor with related control circuitry secured within the vehicle. The controller 142 is able to operate the vehicle by receiving data in the form of various operator inputs 702 and sensor inputs 704. Some of these inputs being directed relayed to the controller and some being relayed via a wireless receiver 706.

The microprocessor controller 142 is loaded with extensive and advanced software which enables the controller 142 to run a valve network 707 connected with one or more hydraulic pumps 708. The valve network is made up of an extensive assembly of valves, hoses, sub-controllers, sensors, and other electro-hydraulic componentry. Valves of most embodiments will comprise a variety of twin spool valves which run off a variable displacement pump.

The pump 708 may represent one or more of the pumps. In most embodiments, all of the hydraulic pumps called out by numbers 146, 168, 222, 532, and 590 in this patent application are embodied in one or two main pumps. Those numbered pumps may represent one single pump or any number of additional pumps necessary to carry out the pump functions for each system. The primary systems operated for the work vehicle may include the steering system 710, the drive system 712, the frame extension system 714, the lift mechanism system 716, the load leveling system 718, the rear attachment systems 720, and the track system 722.

Those skilled in the art will appreciate that the work vehicle of the present invention may be manufactured in a variety of shapes and sizes to accommodate various sizes and types of tasks including various construction projects, etc. The components can be composed of any number of suitable materials. Also, the design of the present invention should not be construed to limit its application to only construction, industrial, or residential applications.

It will be appreciated that any of the hydraulic systems of the present invention, particularly parts that are subject to be connected, disconnected or changed, may also be equipped with specialized, easy-to-connect or quick connect adaptors, fittings and hoses. These components enable many hydraulic connections to be quickly and easily achieved with one touch connections. They are especially useful for various embodiments of the vehicles of the present invention which may have a large number of hydraulic components confined in a small amount of space or in changing or attaching auxiliary systems to the hydraulics. An example of such a product is the Aeroquip STC (snap-to-connect) hydraulic hose and fitting connection system available from Eaton Corporation of Eden Prairie, Minn. Hydraulic components and hoses throughout the work vehicle can thereby be connected with these special fittings which use specially shaped male and female connection components.

The invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A work vehicle comprising:
    (a) a frame having a first portion, a second portion and a third portion moveable relative to each other between an extended position and a retracted position;
    (b) a power take-off shaft located on and moveable with said third portion of said frame;
    (c) a hitch located on and moveable with said third portion of said frame, said hitch comprising a first four-bar linkage including a first attachment point, a second four-bar linkage including a second attachment point, at least one actuator coupled to said four-bar linkages for adjusting the position of the attachment points of the four-bar linkages, and a hydraulic cylinder coupled between said second portion of said frame and a third attachment point wherein said first, second, and third attachment points provide three points for attachment of a device to the vehicle; and
- (d) a dedicated hydraulic pump/motor combination that includes a main pump and an auxiliary pump for driving the power take-off shaft.

2. A work vehicle as in claim 1 further including a safety shield surrounding the power take-off shaft.

3. A work vehicle as in claim 1 further including a remote control for controlling the rotation of the power take-off shaft.

4. A work vehicle as in claim 3 wherein the remote control controls the position of said first and second four-bar linkages.

5. A work vehicle as in claim 1 further including and outer housing and a panel on the outer housing of the work vehicle for controlling the PTO power take off shaft and first and second four-bar linkages.

6. A work vehicle comprising:
- (a) a frame having a first portion and a second portion moveable relative to each other between an extended position and a retracted position;
- (b) a power take-off shaft located on and moveable with said second portion of said frame; and
- (c) a hitch located on and moveable with said second portion of said frame, said hitch comprising a pivotally mounted first lift arm assembly, a pivotally mounted second lift arm assembly, and a pivotally mounted top link member wherein the first lift arm assembly, second lift arm assembly, and top link each contain an attachment point;
- (d) a plurality of hydraulic actuators permitting an operator to raise and lower the first lift arm assembly, second lift arm assembly, and the top link; and
- (e) wherein the power take-off shaft is driven by a dedicated hydraulic pump/motor combination that includes a main pump and an auxiliary pump.

7. A work vehicle as in claim 6 further including a remote control for controlling the power take-off shaft and the first and second lift arm assemblies.

8. A work vehicle comprising:
- (a) a frame having a first portion, a second portion and a third portion moveable relative to each other between an extended position and a retracted position;
- (b) a power take-off shaft located on and moveable with said third portion of said frame wherein said power take-off shaft is driven by a dedicated hydraulic pump/motor combination;
- (c) a hitch located on and moveable with said third portion of said frame, said hitch comprising a pivotally mounted first lift arm assembly, a pivotally mounted second lift arm assembly, and a pivotally mounted top link member wherein the first lift arm assembly, second lift arm assembly, and top link each contain an attachment point for mounting to a work implement; and
- (d) at least one hydraulic actuator mounted within said second portion for controlling the movement of the first lift arm assembly and the second lift arm assembly.

9. A work vehicle comprising:
- (a) a frame having a first portion and a second portion moveable relative to each other between an extended position and a retracted position;
- (b) a power take-off shaft located on and moveable with said second portion of said frame;
- (c) a hitch located on and moveable with said second portion of said frame, said hitch comprising a first four-bar linkage including a first attachment point, a second four-bar linkage including a second attachment point, at least one actuator coupled to said four-bar linkages for adjusting the position of the attachment points of the four-bar linkages, and a hydraulic cylinder coupled between said second portion of said frame and a third attachment point wherein said first, second, and third attachment points provide three points for attachment of a device to the vehicle; and
- (d) wherein said second portion of said frame of said work vehicle comprises a plurality of storage compartments and wherein said first and second four-bar linkages and hydraulic cylinder may be retracted into the storage compartments when they are not in use.

10. A work vehicle comprising:
- (a) a frame having a first portion and a second portion moveable relative to each other between an extended position and a retracted position;
- (b) a power take-off shaft located on and moveable with said second portion of said frame; and
- (c) a hitch located on and moveable with said second portion of said frame, said hitch comprising a pivotally mounted first lift arm assembly, a pivotally mounted second lift arm assembly, and a pivotally mounted top link member wherein the first lift arm assembly, second lift arm assembly, and top link each contain an attachment point;
- (d) a plurality of hydraulic actuators permitting an operator to raise and lower the first lift arm assembly, second lift arm assembly, and the top link; and
- (e) wherein the vehicle further includes a plurality of compartments for storage of the first and second lift arm assemblies and the top link in the second portion of the frame.

\* \* \* \* \*